US008326910B2

(12) United States Patent
Bobak et al.

(10) Patent No.: US 8,326,910 B2
(45) Date of Patent: Dec. 4, 2012

(54) PROGRAMMATIC VALIDATION IN AN INFORMATION TECHNOLOGY ENVIRONMENT

(75) Inventors: Mythili K. Bobak, Lagrangeville, NY (US); Chun-Shi Chang, Poughkeepsie, NY (US); Tim A. McConnell, Lexington, KY (US); Michael D. Swanson, Springfield, OR (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 11/966,619

(22) Filed: Dec. 28, 2007

(65) Prior Publication Data

US 2009/0172769 A1 Jul. 2, 2009

(51) Int. Cl.
*G06F 21/00* (2006.01)
(52) U.S. Cl. .................... 709/200; 709/203; 713/169
(58) Field of Classification Search .................. 709/200, 709/203
See application file for complete search history.

(56) References Cited

U.S. PATENT DOCUMENTS

| | | | |
|---|---|---|---|
| 5,023,873 A | 6/1991 | Stevenson et al. | 371/8.2 |
| 5,481,694 A | 1/1996 | Chao et al. | 395/439 |
| 5,537,542 A | 7/1996 | Eilert et al. | |
| 5,604,863 A | 2/1997 | Allen et al. | |
| 5,631,831 A | 5/1997 | Bird et al. | |
| 5,652,908 A | 7/1997 | Douglas et al. | |
| 5,734,837 A | 3/1998 | Flores et al. | |
| 5,790,780 A | 8/1998 | Brichta et al. | |
| 5,797,005 A | 8/1998 | Bahls et al. | |
| 5,797,129 A | 8/1998 | Rohan | |
| 5,887,168 A | 3/1999 | Bahls et al. | |
| 6,012,044 A | 1/2000 | Maggioncalda et al. | |
| 6,041,306 A | 3/2000 | Du et al. | |
| 6,336,138 B1 | 1/2002 | Caswell et al. | |
| 6,385,613 B1 | 5/2002 | Grewell et al. | 707/8 |
| 6,393,386 B1 | 5/2002 | Zager et al. | |
| 6,393,485 B1 | 5/2002 | Chao et al. | 709/231 |
| 6,449,688 B1 | 9/2002 | Peters et al. | 711/112 |
| 6,480,944 B2 | 11/2002 | Bradshaw et al. | |
| 6,625,751 B1 | 9/2003 | Starovic et al. | |
| 6,732,118 B2 | 5/2004 | Hermann et al. | |
| 6,785,768 B2 | 8/2004 | Peters et al. | 711/112 |
| 6,862,696 B1 | 3/2005 | Voas et al. | |
| 6,874,010 B1 * | 3/2005 | Sargent | 709/203 |
| 6,934,247 B2 | 8/2005 | Bhattal et al. | 370/216 |
| 6,954,786 B1 | 10/2005 | Vered et al. | |

(Continued)

FOREIGN PATENT DOCUMENTS

WO WO 99/10814 3/1999

OTHER PUBLICATIONS

Final Office Action for U.S. Appl. No. 11/965,930 dated Sep. 29, 2010.
Final Office Action for U.S. Appl. No. 11/965,874 dated Oct. 14, 2010.
Office Action for U.S. Appl. No. 11/965,862 dated Dec. 7, 2010.
Final Office Action for U.S. Appl. No. 11/965,855 dated Dec. 22, 2010.

(Continued)

*Primary Examiner* — Tesfay Yohannes
(74) *Attorney, Agent, or Firm* — Dennis Jung, Esq.; Blanche E. Schiller, Esq.; Heslin Rothenberg Farley & Mesiti P.C.

(57) ABSTRACT

Programmatically validating service level policies established for business applications of an Information Technology environment. The programmatic validation predicts whether the policies are achievable within the environment. Examples of service level policies include quantitative goals, redundancy levels and resource use.

19 Claims, 44 Drawing Sheets

U.S. PATENT DOCUMENTS

| | | |
|---|---|---|
| 6,983,321 B2 | 1/2006 | Trinon et al. |
| 6,983,362 B1 | 1/2006 | Kidder et al. |
| 7,032,186 B1 | 4/2006 | Gasser et al. |
| 7,058,947 B1 | 6/2006 | Raja et al. |
| 7,111,297 B1 | 9/2006 | Sankaranarayan et al. |
| 7,313,573 B2 | 12/2007 | Leung et al. |
| 7,325,161 B1* | 1/2008 | Rakic et al. ................ 714/15 |
| 7,409,356 B1 | 8/2008 | Geddes et al. |
| 7,437,611 B2 | 10/2008 | Agarwal et al. |
| 7,490,265 B2 | 2/2009 | Baskey et al. |
| 7,499,954 B2 | 3/2009 | Cherkauer et al. |
| 7,509,529 B2 | 3/2009 | Colucci et al. |
| 7,529,981 B2 | 5/2009 | Childress et al. |
| 7,536,585 B1* | 5/2009 | Keeton et al. ................ 714/47.2 |
| 7,568,019 B1 | 7/2009 | Bhargava et al. |
| 7,610,512 B2 | 10/2009 | Gerber |
| 7,627,728 B1 | 12/2009 | Roeck et al. |
| 7,707,173 B2 | 4/2010 | Nanavati et al. |
| 7,730,363 B2 | 6/2010 | Takezawa et al. |
| 7,743,001 B1 | 6/2010 | Vermeulen et al. |
| 7,747,730 B1 | 6/2010 | Harlow |
| 7,752,310 B2 | 7/2010 | Kageyama |
| 7,774,458 B2 | 8/2010 | Trinon et al. |
| 7,818,421 B2 | 10/2010 | Machida |
| 7,865,582 B2 | 1/2011 | Santos et al. |
| 7,958,393 B2 | 6/2011 | Bobak et al. |
| 7,962,590 B1 | 6/2011 | Or et al. |
| 8,051,106 B2 | 11/2011 | Bird |
| 2001/0056398 A1* | 12/2001 | Scheirer ................ 705/38 |
| 2002/0022952 A1 | 2/2002 | Zager et al. |
| 2002/0049749 A1 | 4/2002 | Helgeson et al. |
| 2002/0059512 A1 | 5/2002 | Desjardins |
| 2002/0069102 A1 | 6/2002 | Vellante et al. |
| 2002/0078381 A1 | 6/2002 | Farley et al. |
| 2002/0091991 A1* | 7/2002 | Castro ................ 717/106 |
| 2002/0194045 A1 | 12/2002 | Shay et al. |
| 2002/0198727 A1 | 12/2002 | Ann et al. |
| 2003/0051186 A1 | 3/2003 | Boudnik et al. |
| 2003/0056013 A1 | 3/2003 | Laschkewitsch et al. |
| 2003/0078823 A1 | 4/2003 | Yoshioka et al. |
| 2003/0084100 A1 | 5/2003 | Gahan et al. |
| 2003/0093672 A1 | 5/2003 | Cichowlas |
| 2003/0135384 A1 | 7/2003 | Nguyen |
| 2003/0139956 A1 | 7/2003 | Guenther et al. |
| 2003/0200482 A1 | 10/2003 | Sullivan |
| 2003/0212580 A1* | 11/2003 | Shen ................ 705/2 |
| 2003/0225602 A1 | 12/2003 | Hagmann et al. |
| 2003/0236677 A1 | 12/2003 | Casati et al. |
| 2004/0034553 A1 | 2/2004 | Cole et al. |
| 2004/0054690 A1 | 3/2004 | Hillerbrand et al. |
| 2004/0078373 A1 | 4/2004 | Ghoneimy et al. |
| 2004/0119752 A1 | 6/2004 | Beringer et al. |
| 2004/0143470 A1 | 7/2004 | Myrick et al. |
| 2004/0158777 A1 | 8/2004 | Bae et al. ................ 714/47 |
| 2004/0162741 A1 | 8/2004 | Flaxer et al. |
| 2004/0181476 A1 | 9/2004 | Smith et al. |
| 2004/0186905 A1 | 9/2004 | Young et al. |
| 2004/0193476 A1 | 9/2004 | Aerdts |
| 2004/0199768 A1* | 10/2004 | Nail ................ 713/169 |
| 2004/0243699 A1 | 12/2004 | Koclanes et al. |
| 2005/0015641 A1 | 1/2005 | Alur et al. |
| 2005/0033600 A1 | 2/2005 | Geddes et al. |
| 2005/0043977 A1 | 2/2005 | Ahern et al. |
| 2005/0049906 A1 | 3/2005 | Leymann et al. |
| 2005/0060662 A1 | 3/2005 | Soares et al. |
| 2005/0086091 A1 | 4/2005 | Trumbly et al. |
| 2005/0096949 A1 | 5/2005 | Aiber et al. |
| 2005/0119905 A1 | 6/2005 | Wong et al. |
| 2005/0125768 A1 | 6/2005 | Wong et al. |
| 2005/0172306 A1 | 8/2005 | Agarwal et al. |
| 2005/0177406 A1 | 8/2005 | Facciorusso et al. |
| 2005/0198244 A1 | 9/2005 | Eilam et al. |
| 2005/0228852 A1 | 10/2005 | Santos et al. |
| 2005/0235248 A1 | 10/2005 | Victoria et al. |
| 2005/0262242 A1 | 11/2005 | Byers et al. |
| 2006/0004265 A1* | 1/2006 | Pulkkinen et al. ............ 600/300 |
| 2006/0020866 A1 | 1/2006 | Lo et al. |
| 2006/0037022 A1 | 2/2006 | Byrd et al. |
| 2006/0041505 A1* | 2/2006 | Enyart ................ 705/40 |
| 2006/0064335 A1 | 3/2006 | Goldszmidt et al. |
| 2006/0074731 A1 | 4/2006 | Green et al. |
| 2006/0074736 A1 | 4/2006 | Shukla et al. |
| 2006/0074993 A1 | 4/2006 | Pulamarasetti et al. |
| 2006/0106626 A1 | 5/2006 | Jeng et al. |
| 2006/0111921 A1 | 5/2006 | Chang et al. |
| 2006/0112383 A1 | 5/2006 | Chang et al. |
| 2006/0117221 A1* | 6/2006 | Fisher et al. ................ 714/21 |
| 2006/0123022 A1 | 6/2006 | Bird |
| 2006/0129562 A1 | 6/2006 | Pulamarasetti et al. |
| 2006/0149842 A1 | 7/2006 | Dawson et al. |
| 2006/0161444 A1 | 7/2006 | Lubrecht et al. |
| 2006/0161466 A1 | 7/2006 | Trinon et al. |
| 2006/0179136 A1 | 8/2006 | Loboz et al. |
| 2006/0190368 A1 | 8/2006 | Kesterman |
| 2006/0190583 A1 | 8/2006 | Whalen |
| 2006/0218558 A1 | 9/2006 | Torii et al. |
| 2006/0224702 A1 | 10/2006 | Schmidt et al. |
| 2006/0245354 A1 | 11/2006 | Gao et al. |
| 2006/0245369 A1 | 11/2006 | Schimmelpfeng et al. |
| 2006/0248546 A1 | 11/2006 | Andreev et al. |
| 2006/0287875 A1 | 12/2006 | Reddy et al. |
| 2006/0293942 A1 | 12/2006 | Chaddha et al. |
| 2007/0011331 A1 | 1/2007 | Morimoto et al. |
| 2007/0027734 A1 | 2/2007 | Hughes |
| 2007/0038490 A1 | 2/2007 | Joodi |
| 2007/0038492 A1 | 2/2007 | Ryan et al. |
| 2007/0047296 A1 | 3/2007 | Malloy et al. |
| 2007/0079097 A1* | 4/2007 | Karnowski et al. ........... 711/170 |
| 2007/0112847 A1 | 5/2007 | Dublish et al. |
| 2007/0143166 A1 | 6/2007 | Leymann et al. |
| 2007/0150571 A1 | 6/2007 | Haga et al. |
| 2007/0165525 A1 | 7/2007 | Kageyama |
| 2007/0179826 A1 | 8/2007 | Cutlip et al. |
| 2007/0198678 A1 | 8/2007 | Dieberger et al. |
| 2007/0234408 A1* | 10/2007 | Burch et al. ................ 726/6 |
| 2007/0266029 A1 | 11/2007 | Baskey et al. |
| 2007/0271219 A1 | 11/2007 | Agarwal et al. |
| 2007/0276885 A1* | 11/2007 | Valiyaparambil et al. .... 707/204 |
| 2007/0286219 A1 | 12/2007 | Knop et al. |
| 2008/0005739 A1 | 1/2008 | Sadiq et al. |
| 2008/0016335 A1* | 1/2008 | Takahashi et al. ............ 713/156 |
| 2008/0052719 A1 | 2/2008 | Briscoe et al. |
| 2008/0063423 A1 | 3/2008 | Matoba |
| 2008/0140495 A1 | 6/2008 | Bhamidipaty et al. |
| 2008/0215909 A1 | 9/2008 | Bretschneider et al. |
| 2008/0294777 A1 | 11/2008 | Karve et al. |
| 2008/0295100 A1 | 11/2008 | Ainsworth |
| 2008/0317217 A1 | 12/2008 | Bernardini et al. |
| 2009/0037363 A1 | 2/2009 | Kozlov et al. |
| 2009/0077210 A1 | 3/2009 | Musman et al. |
| 2009/0125751 A1 | 5/2009 | Dawson et al. |
| 2009/0150456 A1 | 6/2009 | Balasubramanian et al. |
| 2009/0150887 A1 | 6/2009 | Sanghvi et al. |
| 2009/0171703 A1 | 7/2009 | Bobak et al. |
| 2009/0171704 A1 | 7/2009 | Bobak et al. |
| 2009/0171705 A1 | 7/2009 | Bobak et al. |
| 2009/0171706 A1 | 7/2009 | Bobak et al. |
| 2009/0171707 A1 | 7/2009 | Bobak et al. |
| 2009/0171708 A1 | 7/2009 | Bobak et al. |
| 2009/0171730 A1 | 7/2009 | Bobak et al. |
| 2009/0171731 A1 | 7/2009 | Bobak et al. |
| 2009/0171732 A1 | 7/2009 | Bobak et al. |
| 2009/0171733 A1 | 7/2009 | Bobak et al. |
| 2009/0172149 A1 | 7/2009 | Bobak et al. |
| 2009/0172460 A1 | 7/2009 | Bobak et al. |
| 2009/0172461 A1 | 7/2009 | Bobak et al. |
| 2009/0172470 A1 | 7/2009 | Bobak et al. |
| 2009/0172668 A1 | 7/2009 | Bobak et al. |
| 2009/0172669 A1 | 7/2009 | Bobak et al. |
| 2009/0172670 A1 | 7/2009 | Bobak et al. |
| 2009/0172671 A1 | 7/2009 | Bobak et al. |
| 2009/0172674 A1 | 7/2009 | Bobak et al. |
| 2009/0172682 A1 | 7/2009 | Bobak et al. |
| 2009/0172687 A1 | 7/2009 | Bobak et al. |
| 2009/0172688 A1 | 7/2009 | Bobak et al. |
| 2009/0172689 A1 | 7/2009 | Bobak et al. |

| | | |
|---|---|---|
| 2009/0172769 A1 | 7/2009 | Bobak et al. |
| 2010/0280863 A1 | 11/2010 | Wilcock et al. |
| 2011/0004564 A1 | 1/2011 | Rolia et al. |

OTHER PUBLICATIONS

Office Action for U.S. Appl. No. 11/965,832 dated Dec. 22, 2010.
Final Office Action for U.S. Appl. No. 11/965,872 dated Dec. 22, 2010.
Patent Application for U.S. Appl. No. 12/975,520 filed Dec. 22, 2010 entitled "Real-Time Information Technology Environments".
Office Action for U.S. Appl. No. 11/966,495 dated Oct. 29, 2009.
Office Action for U.S. Appl. No. 11/965,874 dated Mar. 18, 2010.
Office Action for U.S. Appl. No. 11/965,897 dated Mar. 31, 2010.
Office Action for U.S. Appl. No. 11/965,930 dated Apr. 1, 2010.
Bolie et al., "BPEL Cookbook: Best Practices for SOA-based Integration and Composite Applications Development", 2006, Packt Publishing, ISBN 1904811337; Chapter 1; 12 pages.
Juric, et al., Business Process Execution Language for Web Services—An Architect and Developer's Guide to Orchestrating Web Services Using BPEL4WS, Second Edition; 2006; Packt Publishing; ISBN 1904811817; Chapter 5; 28 pages.
Horstman et al., Core Java 2: vol. I—Fundamentals (7th Edition); Core Series; 2003; Sun Microsystems, Inc., ISBN 0131472025; pp. 324-327.
Perry, J. Steven, "Java Management Extension: 1st Edition," Jun. 15, 2002; O'Reilly & Associates, Inc.; ISBN 0596002459; Chapter 1 (pp. 1-32) and Chapter 7 (pp. 207-222).
Weerawarana et al., "Web Services Platform Architecture: SOAP, WSDL, WS-Policy, WS-Addressing, WS-BPEL, WS-Reliable Messaging, and More," 2005; Pearson Education, Inc.; ISBN 0131488740; Chapter 14 (pp. 313-340).
Van Bon, Jan, "Foundations of IT Service Management Based on ITIL," Sep. 2005; Van Haren Publishing; ISBN 9077212582; Chapter 6 (pp. 69-85).
Kreger et al., "JAVA and JMX—Building Manageable Systems," Jan. 2003; ISBN 0672324083; pp. 54-64.
Office Action for U.S. Appl. No. 11/965,855 dated Apr. 30, 2010.
Final Office Action for U.S. Appl. No. 11/966,495 dated May 14, 2010.
Office Action for U.S. Appl. No. 11/965,862 dated Jun. 23, 2010.
Final Office Action for U.S. Appl. No. 11/966,495 dated Jun. 14, 2010.
Office Action for U.S. Appl. No. 11/965,872 dated Jul. 6, 2010.
Evans, James, "Optimization Algorithms for Networks and Graphs, Second Edition", 1992, CCR, ISBN 0824786025, Chapters 1-3 (pp. 1-76) and Chapter 11 (pp. 390-413).
Jolliffe, Ian T., "Principal Component Analysis", 2002, Pringer, ISBN 0387954422, Chapters 1-4 (pp. 1-77), Chapters 6-7 (pp. 111-166) and Chapters 12-14 (pp. 299-405).
Lau, Hang T., "A Java Library of Graph Algorithms and Optimization Discrete Mathematics and Its Applications," 2006, Chapman & Hall, ISBN 1584887184, Chapter 2.2 (pp. 39-43).
Horstmann, Cay S. et al., Core Java 2—vol. II—Advanced Features (7th Edition), Sun Microsystems Press, 2005, ISBN 0131118269, Chapter 1 (pp. 1-22).
"Parasoft BPEL Maestro," http://www.parasoft.com/jsp/products/home.jsp?product=BPEL.
Final Office Action for U.S. Appl. No. 11/965,897 dated Sep. 17, 2010.
"BPEL Project", http://www.eclipse.org/bpel/.
"Factor Analysis Using SAS PROC FACTOR", http://www.utexas.edu/cc/docs/stat53.html.
"Principal Components and Factor Analysis", http://statsoft.com/textbook/stfacan.html.
"WebSphere Intergration Developer", http://www-306.ibm.com/software/integration/wid/about/?S_CMP=rnay.
Office Action for U.S. Appl. No. 11/965,926 dated Feb. 3, 2011.
Rood, Melody A., "Enterprise Architecture: Definition, Content & Utility," IEEE, Jul. 1994, pp. 106-111.
Buchanan, Richard D., et al., "Aligning Enterprise and IT Investments with Corporate Goals," OMG White Paper, 2002, p. 1-13 (Office Action for U.S. Appl. No. 11/965,926—no further date information available.).
Restriction Requirement for U.S. Appl. No. 11/965,889 dated Feb. 16, 2011.
Office Action for U.S. Appl. No. 11/965,913 dated Mar. 1, 2011.
Office Action for U.S. Appl. No. 11/965,845 dated Mar. 11, 2011.
Liu, Rong et al., "Modeling Business Contexture and Behavior Using Business Artifacts," Lecture Notes in Computer Science, 2007, vol. 4495/2007, pp. 324-339 (Office Action for U.S. Appl. No. 11/965,845—no further date information available.).
Office Action for U.S. Appl. No. 11/965,922 dated Mar. 16, 2011.
Office Action for U.S. Appl. No. 11/965,832 dated May 12, 2011.
Office Action for U.S. Appl. No. 11/965,851 dated May 20, 2011.
Final Office Action for U.S. Appl. No. 11/965,922 dated Jul. 29, 2011.
Office Action for U.S. Appl. No. 11/965,845 dated Jul. 29, 2011.
Office Action for U.S. Appl. No. 11/965,832 dated Aug. 23, 2011.
Office Action for U.S. Appl. No. 11/965,902 dated Aug. 23, 2011.
Final Office Action for U.S. Appl. No. 11/965,838 dated Aug. 19, 2011.
Final Office Action for U.S. Appl. No. 11/965,913 dated Aug. 17, 2011.
Office Action for U.S. Appl. No. 11/965,894 dated Jul. 18, 2011.
Office Action for U.S. Appl. No. 11/965,855 dated Oct. 3, 2011.
Office Action for U.S. Appl. No. 11/965,951 dated Oct. 5, 2011.
Final Office Action for U.S. Appl. No. 11/965,851 dated Oct. 28, 2011.
Final Office Action for U.S. Appl. No. 11/965,877 dated Nov. 8, 2011.
Final Office Action for U.S. Appl. No. 11/965,899 dated Nov. 22, 2011.
Final Office Action for U.S. Appl. No. 11/965,917 dated Dec. 21, 2011.
Final Office Action for U.S. Appl. No. 11/965,902 dated Dec. 21, 2011.
Final Office Action for U.S. Appl. No. 11/965,894 dated Dec. 27, 2011.
Final Office Action for U.S. Appl. No. 11/965,832 dated Jan. 9, 2012.
Final Office Action for U.S. Appl. No. 11/965,889 dated Jan. 11, 2012.
Office Action for U.S. Appl. No. 11/966,495 dated Feb. 1, 2012.
Final Office Action for U.S. Appl. No. 11/965,862 dated Feb. 14, 2012.
Office Action for U.S. Appl. No. 11/965,872 dated Feb. 16, 2012.
Final Office Action for U.S. Appl. No. 11/965,951 dated Feb. 22, 2012.
Office Action for U.S. Appl. No. 11/965,926 dated Mar. 2, 2012.
Office Action for U.S. Appl. No. 11/965,874 dated Mar. 19, 2012.
Office Action for U.S. Appl. No. 11/965,845 dated Apr. 18, 2012.
Office Action for U.S. Appl. No. 11/965,922 dated Apr. 20, 2012.
Crawford, C. H. et al., "Toward an On Demand Service-Oriented Architecture," IBM Systems Journal, vol. 44, No. 1, 2005, pp. 81-107.
Office Action for U.S. Appl. No. 11/965,894 dated Jun. 13, 2012.
Final Office Action for U.S. Appl. No. 11/965,889 dated Jun. 20, 2012.
Office Action for U.S. Appl. No. 11/965,902 dated Jul. 5, 2012.
Office Action for U.S. Appl. No. 12/975,520 dated Jul. 18, 2012.
Final Office Action for U.S. Appl. No. 11/965,906 dated Jul. 23, 2012.
Final Office Action for U.S. Appl. No. 11/965,922 dated Aug. 28, 2012.
Office Action for U.S. Appl. No. 11/965,899 dated Aug. 28, 2012.
Final Office Action for U.S. Appl. No. 11/965,845 dated Aug. 29, 2012.
Office Action for U.S. Appl. No. 11/965,862 dated Sep. 26, 2012.
Final Office Action for U.S. Appl. No. 11/965,926 dated Oct. 5, 2012.
Kramer, Jeff et al., "The Evolving Philosophers Problem: Dynamic Change Management," Aug. 1991, pp. 1-33.

* cited by examiner

| EVENT LOG | | |
|---|---|---|
| ! | MESSAGE | RESOURCE | DATE |
| i | CONTAINMENT REGION HAS RECOVERED | CONTAINMENT1 | APR 18, 2006 10:50:52.193 |
| x | CONTAINMENT REGION CREATED FOR RESOURCE FAILURE | CONTAINMENT1 | APR 18, 2006 10:50:52.103 |
| i | CONTAINMENT REGION HAS RECOVERED | CONTAINMENT3 | APR 18, 2006 10:50:51.982 |
| x | DETECTED DYNAMIC MEMBERSHIP CHANGE: ACTIVE POLICY REED... | RECOVERYSEGMENT2 | APR 18, 2006 10:12:25.696 |
| x | THIS RESOURCE HAS ENTERED AN UNRECOVERABLE STATE AND REQ... | RECOVERY MANAGER2 | APR 18, 2006 10:12:25.696 |
| x | THIS RESOURCE HAS ENTERED AN UNRECOVERABLE STATE AND REQ... | RECOVERY MANAGER1 | APR 18, 2006 10:12:14.770 |
| x | ACTIVATION OF POLICY "XYZ" HAS FAILED | RECOVERY SEGMENT1 | APR 18, 2006 10:12:14.760 |
| i | DETECTED DYNAMIC MEMBERSHIP CHANGE: ACTIVE POLICY REED... | RECOVERY SEGMENT2 | APR 18, 2006 10:10:25.696 |

(?) THE RESOURCE "CODER 1 RECOVERY" HAS ENTERED AN UNRECOVERABLE STATE THAT REQUIRES YOUR INPUT. DO YOU WANT TO OPEN THE RESOURCE NOW?

[ YES ]    [ NO ]

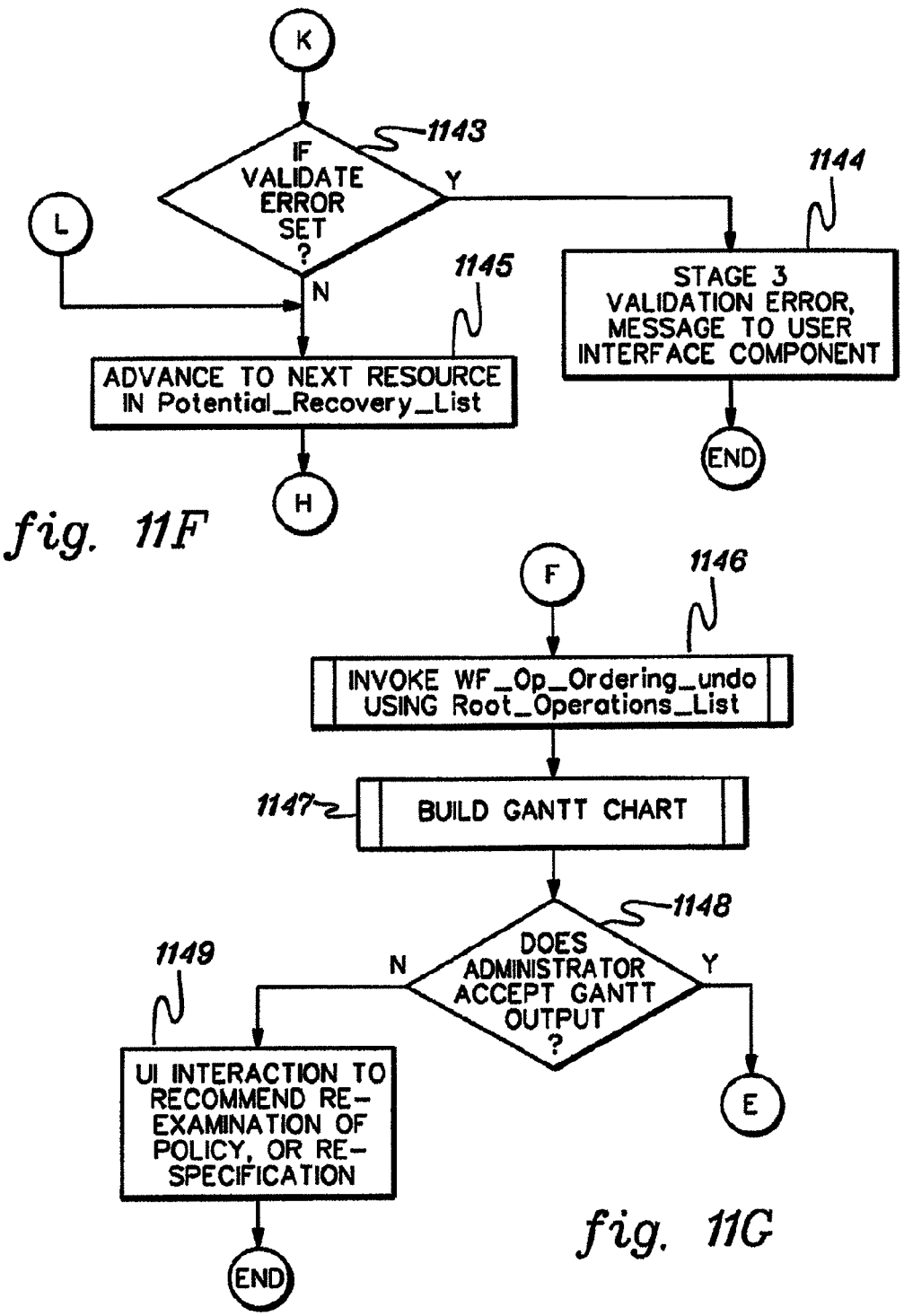

fig. 15B

| row-c | row-e | op-n | ordered | | | | |
|---|---|---|---|---|---|---|---|
| N | N | | | $A_j=1$ | | | ... |
| | | | | | | | ... | current_orow_index → (first row)
i_next_avail_row → (second row)

fig. 16B

| row-c | row-e | op-n | ordered | | | | |
|---|---|---|---|---|---|---|---|
| N | N | | | $a_j=1$ | | | ... |
| | | | | | | | ... | current_orow_index → (first row)
i_next_avail_row → (second row)

fig. 17B

| row-c | row-e | op-n | ordered | | | | |
|---|---|---|---|---|---|---|---|
| N | N | | | $I_j=1$ | | | ... |
| | | | | | | | ... | current_orow_index → (first row)
i_next_avail_row → (second row)

fig. 15C

| row-c | row-e | op-n | ordered | | | | |
|---|---|---|---|---|---|---|---|
| Y | N | 2 | 3 | $A_j=1$ | $B_j=3$ | | ... |
| | | | | | | | ... | current_orow_index → (first row)
i_next_avail_row → (second row)

fig. 16C

| row-c | row-e | op-n | ordered | | | | |
|---|---|---|---|---|---|---|---|
| Y | N | 2 | 3 | $a_j=1$ | $b_j=3$ | | ... |
| | | | | | | | ... | current_orow_index → (first row)
i_next_avail_row → (second row)

fig. 17C

| row-c | row-e | op-n | ordered | | | | |
|---|---|---|---|---|---|---|---|
| Y | N | 2 | 2 | $I_j=1$ | $II_j=2$ | | ... |
| | | | | | | | ... | current_orow_index → (first row)
i_next_avail_row → (second row)

*fig. 15D*

| row-c | row-e | op-n | ordered | | | | | |
|---|---|---|---|---|---|---|---|---|
| N | N | 2 | 3 | $A_i=1$ | $B_i=3$ | | | ... |
| | | | | | | | | ... |

← current_orow_index (row 1)
← i_next_avail_row (row 2)

*fig. 15E*

| row-c | row-e | op-n | ordered | | | | | |
|---|---|---|---|---|---|---|---|---|
| Y | N | 3 | 4 | $A_i=1$ | $B_i=3$ | $C_i=4$ | | ... |
| | | | | | | | | ... |

← current_orow_index (row 1)
← i_next_avail_row (row 2)

*fig. 15F*

| row-c | row-e | op-n | ordered | | | | | |
|---|---|---|---|---|---|---|---|---|
| N | Y | 3 | 4 | $A_i=1$ | $B_i=3$ | $C_i=4$ | | ... |
| | | | | | | | | ... |

← current_orow_index (row 2)
← i_next_avail_row (row 2)

*fig. 15G*

| row-c | row-e | op-n | ordered | | | | | |
|---|---|---|---|---|---|---|---|---|
| N | N | 3 | 4 | $A_i=1$ | $B_i=3$ | $C_i=4$ | | ... |
| N | N | | | $D_i=2$ | | | | ... |
| | | | | | | | | |

← current_orow_index (row 2)
← i_next_avail_row (row 3)

fig. 16D current_orow_index →
i_next_avail_row →

| row-c | row-e | op-n | ordered | | | | |
|---|---|---|---|---|---|---|---|
| N | N | 3 | 4 | a$_i$ =1 | b$_i$ =3 | c$_i$ =4 | ••• |
| | | | | | | | ••• | fig. 16E current_orow_index →
i_next_avail_row →

| row-c | row-e | op-n | ordered | | | | |
|---|---|---|---|---|---|---|---|
| N | N | 4 | 5 | a$_i$ =1 | b$_i$ =3 | c$_i$ =4 | e$_i$ =5 | ••• |
| | | | | | | | | ••• | fig. 16F current_orow_index →
i_next_avail_row →

| row-c | row-e | op-n | ordered | | | | |
|---|---|---|---|---|---|---|---|
| N | Y | 4 | 5 | a$_i$ =1 | b$_i$ =3 | c$_i$ =4 | e$_i$ =5 | ••• |
| N | N | | | d$_i$ =2 | | | | ••• | fig. 16G current_orow_index →
i_next_avail_row →

| row-c | row-e | op-n | ordered | | | | |
|---|---|---|---|---|---|---|---|
| N | Y | 4 | 5 | a$_i$ =1 | b$_i$ =3 | c$_i$ =4 | e$_i$ =5 | ••• |
| Y | N | 2 | 4 | d$_i$ =2 | c$_i$ =4 | | | ••• | fig. 16H current_orow_index →
i_next_avail_row →

| row-c | row-e | op-n | ordered | | | | |
|---|---|---|---|---|---|---|---|
| N | Y | 4 | 5 | a$_i$ =1 | b$_i$ =3 | c$_i$ =4 | e$_i$ =5 | ••• |
| N | Y | 2 | 4 | d$_i$ =2 | c$_i$ =4 | e$_i$ =5 | | ••• |

*fig. 17D* current_orow_index →

| row-c | row-e | op-n | ordered | | | | | |
|---|---|---|---|---|---|---|---|---|
| Y | N | 3 | 3 | $I_i=1$ | $II_i=2$ | $III_i=3$ | | ... | i_next_avail_row →

| | | | | | | | | ... |

*fig. 17E* current_orow_index →

| row-c | row-e | op-n | ordered | | | | | |
|---|---|---|---|---|---|---|---|---|
| Y | N | 3 | 3 | $I_i=1$ | $II_i=2$ | $III_i=3$ | | ... |
| N | N | 3 | 4 | $I_i=1$ | $II_i=2$ | $IV_i=4$ | | ... | i_next_avail_row →

*fig. 17F* current_orow_index →

| row-c | row-e | op-n | ordered | | | | | |
|---|---|---|---|---|---|---|---|---|
| Y | N | 3 | 3 | $I_i=1$ | $II_i=2$ | $III_i=3$ | | ... |
| N | N | 3 | 4 | $I_i=1$ | $II_i=2$ | $IV_i=4$ | | ... |
| N | N | 3 | 5 | $I_i=1$ | $II_i=2$ | $V_i=5$ | | | i_next_avail_row →

*fig. 17G* current_orow_index →

| row-c | row-e | op-n | ordered | | | | | |
|---|---|---|---|---|---|---|---|---|
| Y | N | 4 | 6 | $I_i=1$ | $II_i=2$ | $III_i=3$ | $VI_i=6$ | ... |
| N | N | 3 | 4 | $I_i=1$ | $II_i=2$ | $IV_i=4$ | | ... |
| N | N | 3 | 5 | $I_i=1$ | $II_i=2$ | $V_i=5$ | | | i_next_avail_row →

*fig. 17H*

| row-c | row-e | op-n | ordered | | | | | |
|---|---|---|---|---|---|---|---|---|
| Y | N | 5 | 7 | $I_i=1$ | $II_i=2$ | $III_i=3$ | $VI_i=6$ | $VII_i=7$ ... |
| N | N | 3 | 4 | $I_i=1$ | $II_i=2$ | $IV_i=4$ | | |
| N | N | 3 | 5 | $I_i=1$ | $II_i=2$ | $V_i=5$ | | |
| | | | | | | | | | current_orow_index → (row 1)
i_next_avail_row → (row 4)

*fig. 17I*

| row-c | row-e | op-n | ordered | | | | | |
|---|---|---|---|---|---|---|---|---|
| N | Y | 5 | 7 | $I_i=1$ | $II_i=2$ | $III_i=3$ | $VI_i=6$ | $VII_i=7$ ... |
| N | N | 3 | 4 | $I_i=1$ | $II_i=2$ | $IV_i=4$ | | |
| N | N | 3 | 5 | $I_i=1$ | $II_i=2$ | $V_i=5$ | | |
| | | | | | | | | | current_orow_index → (row 2)
i_next_avail_row → (row 4)

*fig. 17J*

| row-c | row-e | op-n | ordered | | | | | |
|---|---|---|---|---|---|---|---|---|
| N | Y | 5 | 7 | $I_i=1$ | $II_i=2$ | $III_i=3$ | $VI_i=6$ | $VII_i=7$ ... |
| Y | N | 4 | 6 | $I_i=1$ | $II_i=2$ | $IV_i=4$ | $VI_i=6$ | |
| N | N | 3 | 5 | $I_i=1$ | $II_i=2$ | $V_i=5$ | | |
| | | | | | | | | | current_orow_index → (row 2)
i_next_avail_row → (row 4)

fig. 17K

| row-c | row-e | op-n | ordered | | | | | | |
|---|---|---|---|---|---|---|---|---|---|
| N | Y | 5 | 7 | $I_i=1$ | $II_i=2$ | $III_i=3$ | $VI_i=6$ | $VII_i=7$ | ••• |
| Y | N | 5 | 7 | $I_i=1$ | $II_i=2$ | $IV_i=4$ | $VI_i=6$ | $VII_i=7$ | |
| N | N | 3 | 5 | $I_i=1$ | $II_i=2$ | $V_i=5$ | | | |
| | | | | | | | | | | current_orow_index → (row 2)
i_next_avail_row → (row 4)

fig. 17L

| row-c | row-e | op-n | ordered | | | | | | |
|---|---|---|---|---|---|---|---|---|---|
| N | Y | 5 | 7 | $I_i=1$ | $II_i=2$ | $III_i=3$ | $VI_i=6$ | $VII_i=7$ | ••• |
| N | Y | 5 | 7 | $I_i=1$ | $II_i=2$ | $IV_i=4$ | $VI_i=6$ | $VII_i=7$ | |
| N | N | 3 | 5 | $I_i=1$ | $II_i=2$ | $V_i=5$ | | | |
| | | | | | | | | | | current_orow_index → (row 3)
i_next_avail_row → (row 4)

fig. 17M

| row-c | row-e | op-n | ordered | | | | | | |
|---|---|---|---|---|---|---|---|---|---|
| N | Y | 5 | 7 | $I_i=1$ | $II_i=2$ | $III_i=3$ | $VI_i=6$ | $VII_i=7$ | ••• |
| N | Y | 5 | 7 | $I_i=1$ | $II_i=2$ | $IV_i=4$ | $VI_i=6$ | $VII_i=7$ | |
| Y | N | 4 | 7 | $I_i=1$ | $II_i=2$ | $V_i=5$ | $VII_i=7$ | | |
| | | | | | | | | | | current_orow_index → (row 3)
i_next_avail_row → (row 4)

PROGRAMMATIC VALIDATION IN AN INFORMATION TECHNOLOGY ENVIRONMENT

TECHNICAL FIELD

This invention relates, in general, to managing customer environments to provide support for business resiliency, and in particular, to facilitating management of the environment by programmatically validating service level policies established for the environment.

BACKGROUND OF THE INVENTION

Today, customers attempt to manually manage and align their availability management with their information technology (IT) infrastructure. Changes in either business needs or the underlying infrastructure are often not captured in a timely manner and require considerable rework, leading to an inflexible environment.

Often high availability solutions and disaster recovery technologies are handled via a number of disparate point products that target specific scopes of failure, platforms or applications. Integrating these solutions into an end-to-end solution is a complex task left to the customer, with results being either proprietary and very specific, or unsuccessful.

Customers do not have the tools and infrastructure in place to customize their availability management infrastructure to respond to failures in a way that allows for a more graceful degradation of their environments. As a result, more drastic and costly actions may be taken (such as a site switch) when other options (such as disabling a set of applications or users) could have been offered, depending on business needs.

Coordination across availability management and other systems management disciplines is either nonexistent or accomplished via non-reusable, proprietary, custom technology.

There is little predictability as to whether the desired recovery objective will be achieved, prior to time of failure. There are only manual, labor intensive techniques to connect recovery actions with the business impact of failures and degradations.

Any change in the underlying application, technologies, business recovery objectives, resources or their interrelationships require a manual assessment of impact to the handcrafted recovery scheme.

SUMMARY OF THE INVENTION

Based on the foregoing, a need exists for a capability that facilitates management of an IT environment. In one example, a need exists for a technique to programmatically validate service level policies associated with business applications of the environment. A further need exists for a technique that programmatically validates the policies in a predictive manner, such that a prediction is made as to whether the policies are achievable.

The shortcomings of the prior art are overcome and additional advantages are provided through the provision of a computer-implemented validation method. The method includes, for instance, obtaining a service level policy to be validated for an information technology environment; and programmatically validating the service level policy for achievability, wherein the programmatically validating predicts whether the service level policy is achievable.

Computer program products and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6A depicts one example of a notification view indicating a plurality of notifications, in accordance with an aspect of the present invention;

FIG. 6B depicts one example of a notification message sent to a user, in accordance with an aspect of the present invention;

FIGS. 11A-11H depict one embodiment of the logic to validate a policy, in accordance with an aspect of the present invention;

FIGS. 15B-15G depict examples of values in an outlist_table based on the example of FIG. 15A, in accordance with an aspect of the present invention;

FIGS. 16B-16H depict examples of values in an outlist_table based on the example of FIG. 16A, in accordance with an aspect of the present invention;

FIGS. 17B-17M depict examples of values in an outlist_table based on the example of FIG. 17A, in accordance with an aspect of the present invention;

DETAILED DESCRIPTION OF THE INVENTION

Figure 1:
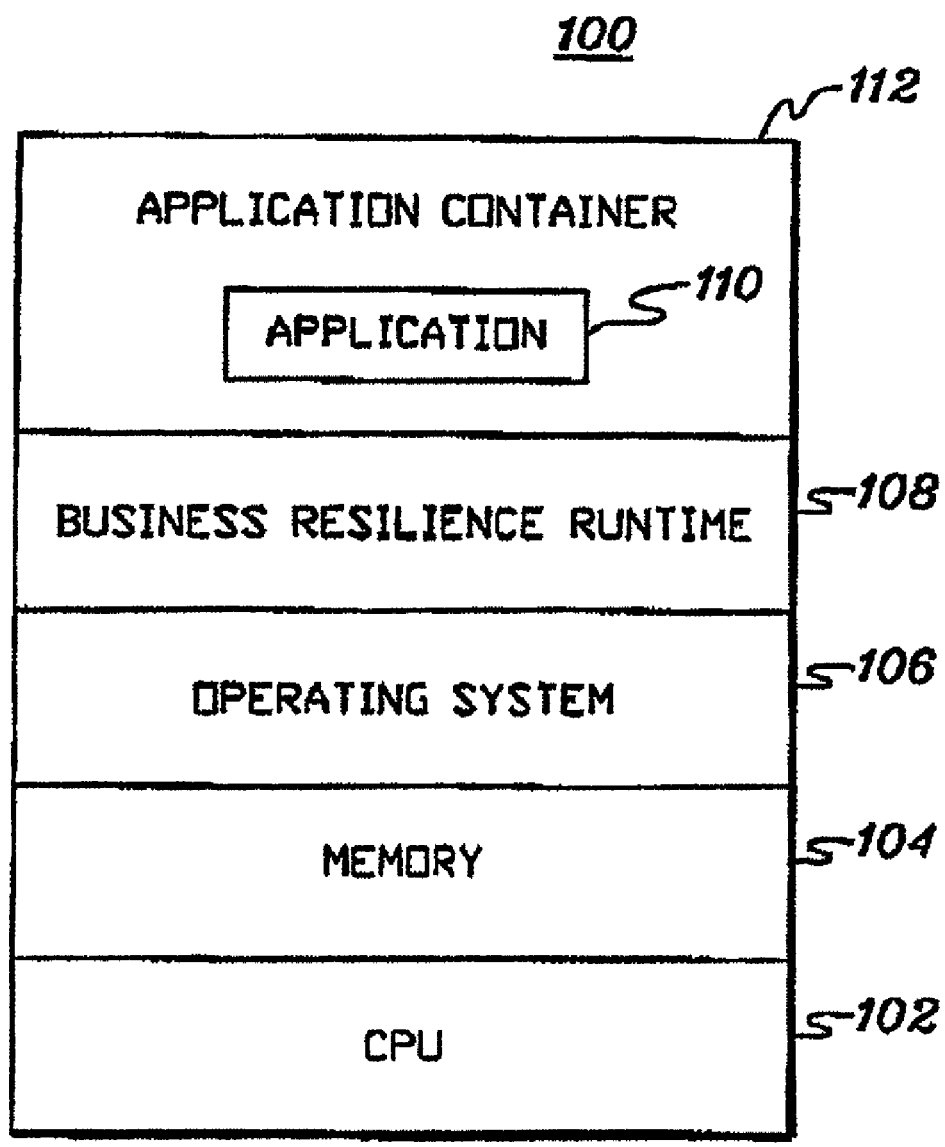
FIG. 1 depicts one embodiment of a processing environment to incorporate and use one or more aspects of the present invention.

In managing a customer's environment, such as its business environment, there is a set of requirements unaddressed by existing technology, which causes unpredictable down time, large impact failures and recoveries, and significant extra labor cost, with resulting loss of business revenue. These requirements include, for instance:

1. Ensuring that there is a consistent recovery scheme across the environment, linked to the business application, across the different types of resources; not a different methodology performed by platform silo. The recovery is to match the scope of the business application, not limited in scope to a single platform. The recovery is to be end-to-end and allow for interaction across multiple vendor products. In one example, a business application is defined as a process that is supported by IT services. It is supportive of the products and/or services created by a customer. It can be of fine granularity (e.g., a specific service/product provided) or of coarse granularity (e.g., a group of services/products provided).
2. Ability to group together mixed resource types (servers, storage, applications, subsystems, network, etc.) into logical groupings aligned with business processes requirements for availability.
3. Ability to share resources across logical groups of resources; ability to nest these logical group definitions, with specifications for goal policy accepted and implemented at each level.
4. Pre-specified recommendations for resource groupings, with customization possible, and pattern matching customer configuration with vendor or customer provided groupings/relationships—to avoid requiring customers to start from scratch for definitions.
5. Ability to group together redundant resources with functional equivalence—use during validation when customer has less redundancy than required to meet the Recovery Time Objective (RTO) goal; in recovery to select an alternate resource for one that has failed.
6. Ability to configure the definition of what constitutes available, degraded, or unavailable based on customer's own sensitivity for a given grouping of resources, and business needs, and further aggregate the state across various resources to produce an overall state for the business application. The state is to be assessed real time, based on what is actually occurring in the system at the time, rather than fixed definitions. In some cases, a performance slowdown might flag a degraded environment, and in other cases, a failure may be necessary before flagging a degraded or unavailable environment. The definitions of available, degraded and unavailable are to be consumed by an availability system that evaluates them in the context of a policy, and then determines appropriate action, including possibly launching recovery automatically.
7. Ability to relate the redundancy capability of relevant resources to the availability status of a business application.
8. Allow customers to configure when recovery actions can be delegated to lower level resources, particularly since resource sharing is becoming more relevant in many customer environments.
9. Include customer or vendor best practices for availability as prespecified workflows, expressed in a standards based manner, that can be customized.
10. Ability to specify quantitative business goals for the recovery of logical groupings of resources, effecting both how the resources are pre-configured for recovery, as well as recovered during errors. One such quantitative goal is Recovery Time Objective (RTO). As part of the specification of quantitative business goals, to be able to include time bias of applications, and facilitate the encoding of appropriate regulatory requirements for handling of certain workloads during changing business cycles in selected businesses, such as financial services.
11. Decomposition of the overall quantified RTO goal to nested logical groups; processing for shared groups having different goals.
12. Ability to configure redundancy groupings and co-location requirements with resources from other vendors, using a representation for resources (which may be, for example, standards based), with ability to clearly identify the vendor as part of the resource definition.
13. Ability to use customer's own historical system measures to automatically generate various system environments, then use these system environments when specifying quantitative recovery goals (since recovery time achievability and requirements are not consistent across time of day, business cycle, etc.). The function is to be able to incorporate historical information from dependent resources, as part of the automatic generation of system environments.
14. Specification of statistical thresholds for acceptability of using historical information; customer specification directly of expected operation times and directive to use customer specified values.
15. Environments are matched to IT operations and time of day, with automatic processing under a new system environment at time boundaries—no automatic internal adjustment of RTO is to be allowed, rather changed if the customer has specified that a different RTO is needed for different system environments.
16. Goal Validation—Prior to failure time. Ability to see assessment of achievable recovery time, in, for instance, a Gantt chart like manner, detailing what is achievable for each resource and taking into account overlaps of recovery sequences, and differentiating by system environment. Specific use can be during risk assessments, management requests for additional recovery related resources, mitigation plans for where there are potentials for RTO miss. Example customer questions:

What is my expected recovery time for a given application during "end of month close" system environment?

What is the longest component of that recovery time?

Can I expect to achieve the desired RTO during the "market open" for stock exchange or financial services applications?

What would be the optimal sequence and parallelization of recovery for the resources used by my business application?

17. Ability to prepare the environment to meet the desired quantitative business goals, allowing for tradeoffs when shared resources are involved. Ensure that both automated and non-automated tasks can be incorporated into the pre-conditioning. Example of customer question: What would I need to do for pre-conditioning my system to support the RTO goal I need to achieve for this business application?
18. Ability to incorporate operations from any vendors' resources for pre-conditioning or recovery workflows, including specification of which pre-conditioning operations have effect on recoveries, which operations have dependencies on others, either within vendor resources or across resources from multiple vendors.
19. Customer ability to modify pre-conditioning workflows, consistent with supported operations on resources.
20. Ability to undo pre-conditioning actions taken, when there is a failure to complete a transactionally consistent set of pre-conditioning actions; recognize the failure, show customers the optional workflow to undo the actions taken, allow them to decide preferred technique for reacting to the failure—manual intervention, running undo set of operations, combination of both, etc.
21. Ability to divide pre-conditioning work between long running and immediate, nondisruptive short term actions.
22. Impact only the smallest set of resources required during recovery, to avoid negative residual or side effects for attempting to recover a broader set of resources than what is actually impacted by the failure.
23. Choosing recovery operations based on determination of which recovery actions address the minimal impact, to meet goal, and then prepare for subsequent escalation in event of failure of initial recovery actions.
24. Choosing a target for applications and operating systems (OS), based on customer co-location specifications, redundancy groups, and realtime system state.
25. Ability for customer to indicate specific effect that recovery of a given business process can have on another business process—to avoid situations where lower priority workloads are recovered causing disruption to higher priority workloads; handling situations where resources are shared.
26. Ability to prioritize ongoing recovery processing over configuration changes to an availability system, and over any other administration functions required for the availability system.
27. Ability for recoveries and pre-conditioning actions to run as entire transactions so that partial results are appropriately accounted for and backed out or compensated, based on actual effect (e.g., during recovery time or even pre-conditioning, not all actions may succeed, so need to preserve a consistent environment).
28. Allow for possible non-responsive resources or underlying infrastructure that does not have known maximum delays in response time in determining recovery actions, while not going beyond the allotted recovery time.
29. Allow customer to change quantified business recovery goals/targets without disruption to the existing recovery capability, with appropriate labeling of version of the policy to facilitate interaction with change management systems.
30. Allow customers to change logical groupings of resources that have assigned recovery goals, without disruption to the existing recovery capability, with changes versioned to facilitate interaction with change management systems.
31. Ability to specify customizable human tasks, with time specifications that can be incorporated into the goal achievement validation so customers can understand the full time involved for a recovery and where focusing on IT and people time is critical to reducing RTO.
32. There is a requirement/desire to implement dynamically modified redundancy groupings for those resources which are high volume—automatic inclusion based on a specified set of characteristics and a matching criteria.
33. There is a requirement/desire to automatically add/delete resources from the logical resource groupings for sets of resources that are not needing individual assessment.

The above set of requirements is addressed, however, by a Business Resiliency (BR) Management System, of which one or more aspects of the present invention are included. The Business Resiliency Management System provides, for instance:

1. Rapid identification of fault scope.
   Correlation and identification of dependencies between business functions and the supporting IT resources.
   Impact analysis of failures affecting business functions, across resources used within the business functions, including the applications and data.
   Isolation of failure scope to smallest set of resources, to ensure that any disruptive recovery actions effect only the necessary resources.
2. Rapid granular and graceful degradation of IT service.
   Discontinuation of services based on business priorities.
   Selection of alternate resources at various levels may include selection of hardware, application software, data, etc.
   Notifications to allow applications to tailor or reduce service consumption during times of availability constraints.
3. Integration of availability management with normal business operations and other core business processes.
   Policy controls for availability and planned reconfiguration, aligned with business objectives.
   Encapsulation, integration of isolated point solutions into availability IT fabric, through identification of affected resources and operations initiated by the solutions, as well as business resiliency.
   Goal based policy support, associated with Recovery Segments that may be overlapped or nested in scope.
   Derivation of data currency requirements, based on business availability goals.

One goal of the BR system is to allow customers to align their supporting information technology systems with their business goals for handling failures of various scopes, and to offer a continuum of recovery services from finer grained process failures to broader scoped site outages. The BR system is built around the idea of identifying the components that constitute a business function, and identifying successive levels of recovery that lead to more complex constructs as the solution evolves. The various recovery options are connected by an overall BR management capability that is driven by policy controls.

Various characteristics of one embodiment of a BR system include:

1. Capability for dynamic generation of recovery actions, into a programmatic and manageable entity.
2. Dynamic generation of configuration changes required/desired to support a customer defined Recovery Time Objective (RTO) goal.
3. Dynamic definition of key Pattern System Environments (PSEs) through statistical analysis of historical observations.
4. Validation of whether requested RTO goals are achievable, based on observed historical snapshots of outages or customer specified recovery operation time duration, in the context of key Pattern System Environments.
5. BR system dynamic, automatic generation and use of standards based Business Process Execution Language (BPEL) workflows to specify recovery transactions and allow for customer integration through workflow authoring tools.
6. Ability to configure customized scopes of recovery, based on topologies of resources and their relationships, called Recovery Segments (RSs).
7. Best practice workflows for configuration and recovery, including, but not limited to, those for different resource types: servers, storage, network, and middleware, as examples.
8. Ability to customize the definition of available, degraded, unavailable states for Recovery Segments.
9. Ability to represent customers' recommended configurations via best practice templates.
10. Ability to define the impact that recovery of one business application is allowed to have on other business applications.
11. Ability to correlate errors from the same or multiple resources into related outages and perform root cause analysis prior to initiating recovery actions.
12. Quantified policy driven, goal oriented management of unplanned outages.
13. Groupings of IT resources that have associated, consistent recovery policy and recovery actions, classified as Recovery Segments.
14. Handling of situations where the underlying error detection and notifications system itself is unavailable.

A Business Resilience System is capable of being incorporated in and used by many types of environments. One example of a processing environment to incorporate and use aspects of a BR system, including one or more aspects of the present invention, is described with reference to FIG. 1.

Processing environment 100 includes, for instance, a central processing unit (CPU) 102 coupled to memory 104 and executing an operating system 106. Examples of operating systems include AIX® and z/OS®, offered by International Business Machines Corporation; Linux; etc. AIX® and z/OS® are registered trademarks of International Business Machines Corporation, Armonk, N.Y., U.S.A. Other names used herein may be registered trademarks, trademarks or product names of International Business Machines Corporation or other companies.

The operating system manages execution of a Business Resilience Runtime Component 108 of a Business Resilience System, described herein, and one or more applications 110 of an application container 112.

As examples, processing environment 100 includes an IBM™ System z™ processor or a pSeries® server offered by International Business Machines Corporation; a Linux server; or other servers, processors, etc. Processing environment 100 may include more, less and/or different components than described herein. (pSeries® is a registered trademark of International Business Machines Corporation, Armonk, N.Y., USA.)

Figure 2:
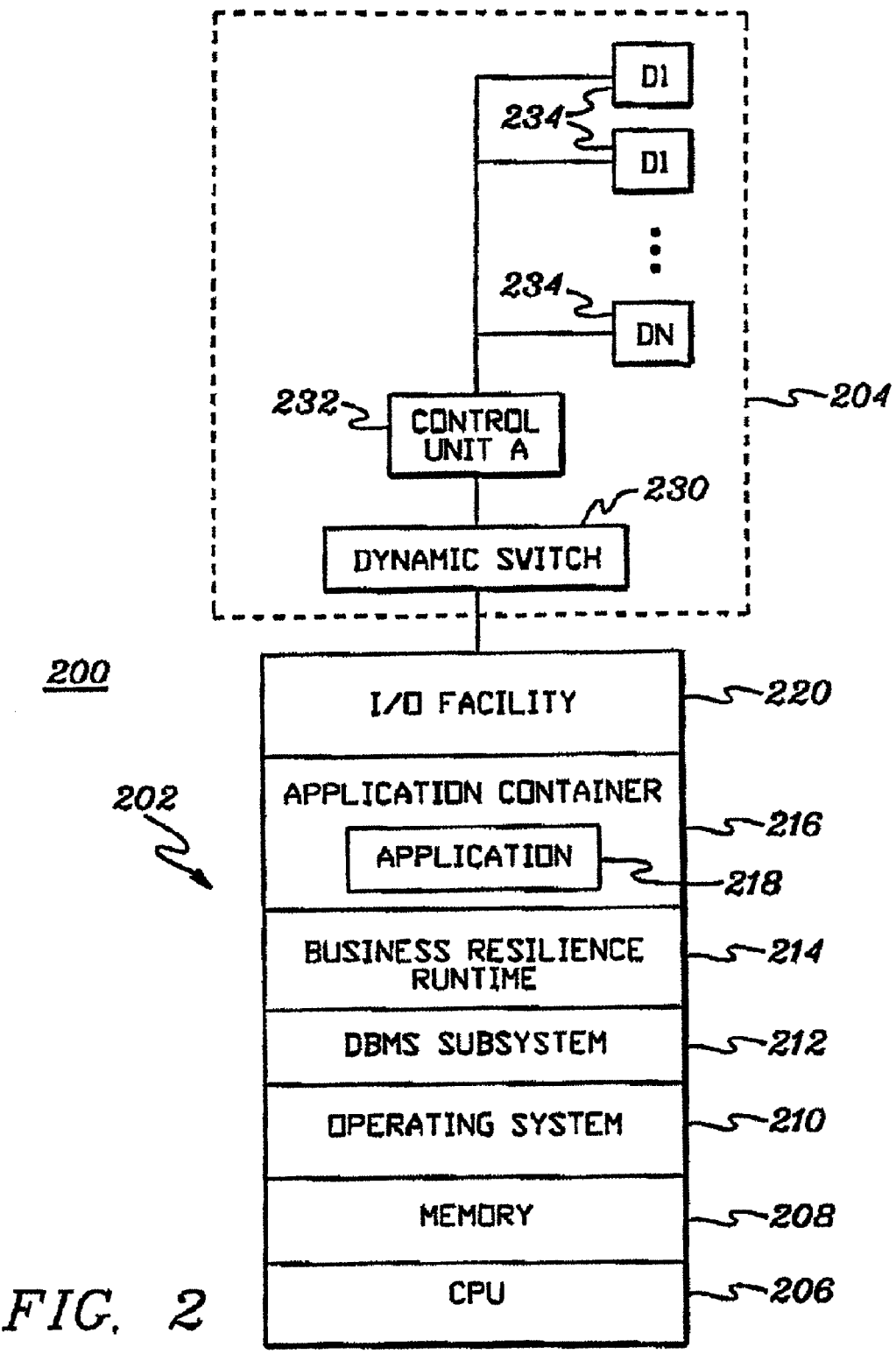
FIG. 2 depicts another embodiment of a processing environment to incorporate and use one or more aspects of the present invention.

Another example of a processing environment to incorporate and use aspects of a BR System, including one or more aspects of the present invention, is described with reference to FIG. 2.

As shown, a processing environment 200 includes for instance, a central processing complex 202 coupled to an input/output (I/O) subsystem 204. Central processing complex 202 includes, for instance, a central processing unit 206, memory 208, an operating system 210, a database management system 212, a Business Resilience Runtime Component 214, an application container 216 including one or more applications 218, and an I/O facility 220.

I/O facility 220 couples central processing complex 202 to I/O subsystem 204 via, for example, a dynamic switch 230. Dynamic switch 230 is coupled to a control unit 232, which is further coupled to one or more I/O devices 234, such as one or more direct access storage devices (DASD).

Processing environments 100 and/or 200 may include, in other embodiments, more, less and/or different components.

Figure 3:
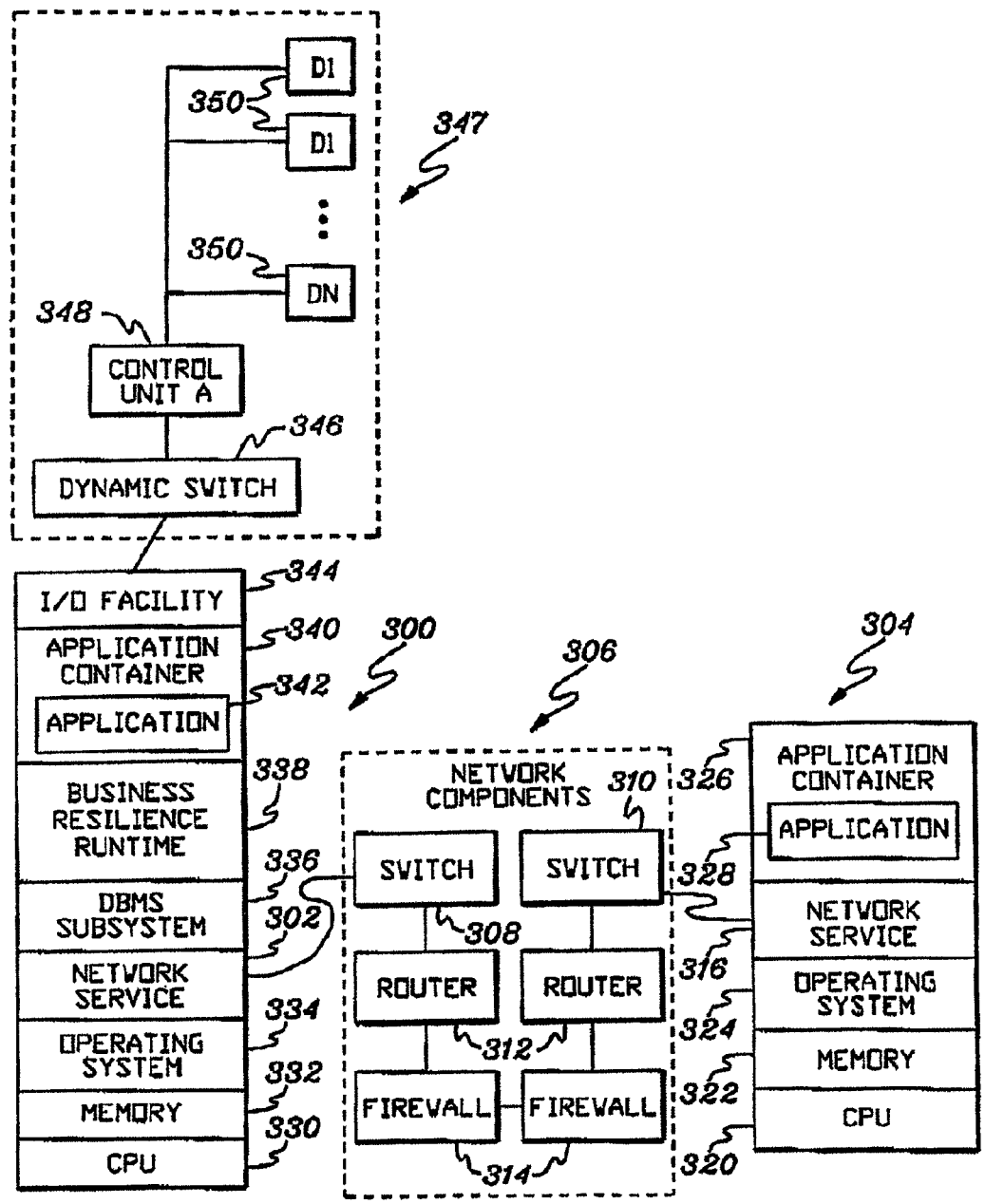
FIG. 3 depicts yet a further embodiment of a processing environment to incorporate and use one or more aspects of the present invention.

In yet another embodiment, a central processing complex 300 (FIG. 3) further includes a network service 302, which is used to couple a central processing complex 300 to a processing environment 304 via a network subsystem 306.

For example, network service 302 of central processing complex 300 is coupled to a switch 308 of network subsystem 306. Switch 308 is coupled to a switch 310 via routers 312 and firewalls 314. Switch 310 is further coupled to a network service 316 of processing environment 304.

Processing environment 304 further includes, for instance, a central processing unit 320, a memory 322, an operating system 324, and an application container 326 including one or more applications 328. In other embodiments, it can include more, less and/or different components.

Moreover, CPC 300 further includes, in one embodiment, a central processing unit 330, a memory 332, an operating system 334, a database management system 336, a Business Resilience Runtime Component 338, an application container 340 including one or more applications 342, and an I/O facility 344. It also may include more, less and/or different components.

I/O facility 344 is coupled to a dynamic switch 346 of an I/O subsystem 347. Dynamic switch 346 is further coupled to a control unit 348, which is coupled to one or more I/O devices 350.

Although examples of various environments are provided herein, these are only examples. Many variations to the above environments are possible and are considered within the scope of the present invention.

In the above-described environments, a Business Resilience Runtime Component of a Business Resilience System is included. Further details associated with a Business Resilience Runtime Component and a Business Resilience System are described with reference to FIG. 4.

In one example, a Business Resilience System 400 is a component that represents the management of recovery operations and configurations across an IT environment. Within that Business Resilience System, there is a Business Resilience Runtime Component (402) that represents the management functionality across multiple distinct Recovery Segments, and provides the service level automation and the support of creation of the recovery sequences. In addition, there are user interface (404), administration (406), installation (408) and configuration template (410) components within the Business Resilience System that enable the administrative operations that are to be performed. Each of these components is described in further detail below.

Business Resilience Runtime Component 402 includes a plurality of components of the BR System that are directly responsible for the collection of observations, creation of PSEs, policy acceptance, validation, error detection, and formulation of recovery sequences. As one example, Business Resilience Runtime Component 402 includes the following components:

1. One or more Business Resilience Managers (BRM) (412).

The Business Resilience Manager (BRM) is the primary component containing logic to detect potential errors in the IT environment, perform assessment to find resources causing errors, and formulate recovery sequences to reestablish the desired state for resources for all Recovery Segments that may be impacted.

The Business Resilience Manager is a component of which there can be one or more. It manages a set of Recovery Segments, and has primary responsibility to formulate recovery sequences. The association of which Recovery Segments are managed by a given BRM is determined at deployment time by the customer, with the help of deployment time templates. BRMs are primarily responsible for operations that relate to error handling and recovery workflow generation, and cross RS interaction.

2. One or more Recovery Segments (RS) (414).

Recovery Segments are customer-defined groupings of IT resources to which consistent availability policy is assigned. In other words, a Recovery Segment acts as a context within which resource recovery is performed. In many cases, Recovery Segments are compositions of IT resources that constitute logical entities, such as a middleware and its related physical resources, or an "application" and its related components.

There is no presumed granularity of a Recovery Segment. Customers can choose to specify fine-grained Recovery Segments, such as one for a given operating system, or a coarser grained Recovery Segment associated with a business process and its component parts, or even a site, as examples.

Relationships between IT resources associated with a RS are those which are part of the IT topology.

Recovery Segments can be nested or overlapped. In case of overlapping Recovery Segments, there can be policy associated with each RS, and during policy validation, conflicting definitions are reconciled. Runtime assessment is also used for policy tradeoff.

The Recovery Segment has operations which support policy expression, validation, decomposition, and assessment of state.

The number of Recovery Segments supported by a BR System can vary, depending on customer configurations and business needs.

One BRM can manage multiple Recovery Segments, but a given RS is managed by a single BRM. Further, Recovery Segments that share resources, or are subset/superset of other Recovery Segments are managed by the same BRM, in this example. Multiple BRMs can exist in the environment, depending on performance, availability, and/or maintainability characteristics.

3. Pattern System Environments (PSEs) (416).

Pattern System Environments (PSEs) are representations of a customer's environment. Sets of observations are clustered together using available mathematical tooling to generate the PSEs. In one embodiment, the generation of a PSE is automatic. A PSE is associated with a given RS, but a PSE may include information that crosses RSs.

As one example, the representation is programmatic in that it is contained within a structure from which information can be added/extracted.

4. Quantified Recovery Goal (418).

A quantified recovery goal, such as a Recovery Time Objective (RTO), is specified for each Recovery Segment that a customer creates. If customers have multiple Pattern System Environments (PSEs), a unique RTO for each PSE associated with the RS may be specified.

5. Containment Region (CR) (420).

Containment Region(s) are components of the BR System which are used at runtime to reflect the scope and impact of an outage. A Containment Region includes, for instance, identification for a set of impacted resources, as well as BR specific information about the failure/degraded state, as well as proposed recovery. CRs are associated with a set of impacted resources, and are dynamically constructed by BR in assessing the error.

The original resources reporting degraded availability, as well as the resources related to those reporting degraded availability, are identified as part of the Containment Region. Impacted resources are accumulated into the topology by traversing the IT relationships and inspecting the attributes defined to the relationships. The Containment Region is transitioned to an inactive state after a successful recovery workflow has completed, and after all information (or a selected subset in another example) about the CR has been logged.

6. Redundancy Groups (RG) (422).

Redundancy Group(s) (422) are components of the BR System that represent sets of logically equivalent services that can be used as alternates when a resource experiences failure or degradation. For example, three instances of a database may form a redundancy group, if an application server requires connectivity to one of the set of three, but does not specify one specific instance.

There can be zero or more Redundancy Groups in a BR System.

Redundancy Groups also have an associated state that is maintained in realtime, and can contribute to the definition of what constitutes available, degraded, or unavailable states. In addition, Redundancy Groups members are dynamically and automatically selected by the BR System, based on availability of the member and co-location constraints.

7. BR Manager Data Table (BRMD) (424).

BR maintains specific internal information related to various resources it manages and each entry in the BR specific Management Data (BRMD) table represents such a record of management. Entries in the BRMD represent IT resources.

8. BR Manager Relationship Data Table (BRRD) (426).

BR maintains BR specific internal information related to the pairings of resources it needs to interact with, and each entry in the BR specific Relationship Data (BRRD) table represents an instance of such a pairing. The pairing record identifies the resources that participate in the pairing, and resources can be any of those that appear in the BRMD above. The BRRD includes information about the pairings, which include operation ordering across resources, failure and degradation impact across resources, constraint specifications for allowable recovery actions, effect an operation has on resource state, requirements for resource to co-locate or anti-co-locate, and effects of preparatory actions on resources.

9. BR Asynchronous Distributor (BRAD) (428).

The BR Asynchronous Distributor (BRAD) is used to handle asynchronous behavior during time critical queries for resource state and key properties, recovery, and for getting observations back from resources for the observation log.

10. Observation Log (430).

The Observation Log captures the information that is returned through periodic observations of the environment. The information in the Observation Log is used by cluster tooling to generate Pattern System Environments (PSE).

11. RS Activity Log (432).

Each RS has an activity log that represents the RS actions, successes, failures. Activity logs are internal BR structures. Primarily, they are used for either problem determination purposes or at runtime, recovery of failed BR components. For example, when the RS fails and recovers, it reads the Activity Log to understand what was in progress at time of failure, and what needs to be handled in terms of residuals.

12. BRM Activity Log (434).

The BRM also has an activity log that represents BRM actions, success, failures. Activity logs are internal BR structures.

13. Transaction Table (TT) (436).

The transaction table is a serialization mechanism used to house the counts of ongoing recovery and preparatory operations. It is associated with the RS, and is referred to as the RS TT.

In addition to the Business Resilience Runtime Component of the BR system, the BR system includes the following components, previously mentioned above.

User Interface (UI) Component (404).

The User interface component is, for instance, a graphical environment through which the customer's IT staff can make changes to the BR configuration. As examples: create and manage Recovery Segments; specify recovery goals; validate achievability of goals prior to failure time; view and alter BR generated workflows.

The user interface (UI) is used as the primary interface for configuring BR. It targets roles normally associated with a Business Analyst, Solution Architect, System Architect, or Enterprise Architect, as examples.

One purpose of the BR UI is to configure the BR resources. It allows the user to create BR artifacts that are used for a working BR runtime and also monitors the behaviors and notifications of these BR resources as they run. In addition, the BR UI allows interaction with resources in the environment through, for instance, relationships and their surfaced properties and operations. The user can add resources to BR to affect recovery and behaviors of the runtime environment.

The BR UI also surfaces recommendations and best practices in the form of templates. These are reusable constructs that present a best practice to the user which can then be approved and realized by the user.

Interaction with the BR UI is based on the typical editor save lifecycle used within, for instance, the developmental tool known as Eclipse (available and described at www.Eclipse.org). The user typically opens or edits an existing resource, makes modifications, and those modifications are not persisted back to the resource until the user saves the editor.

Predefined window layouts in Eclipse are called perspectives. Eclipse views and editors are displayed in accordance with the perspective's layout, which can be customized by the user. The BR UI provides a layout as exemplified in the screen display depicted in FIG. 5A.

Figure 5A:
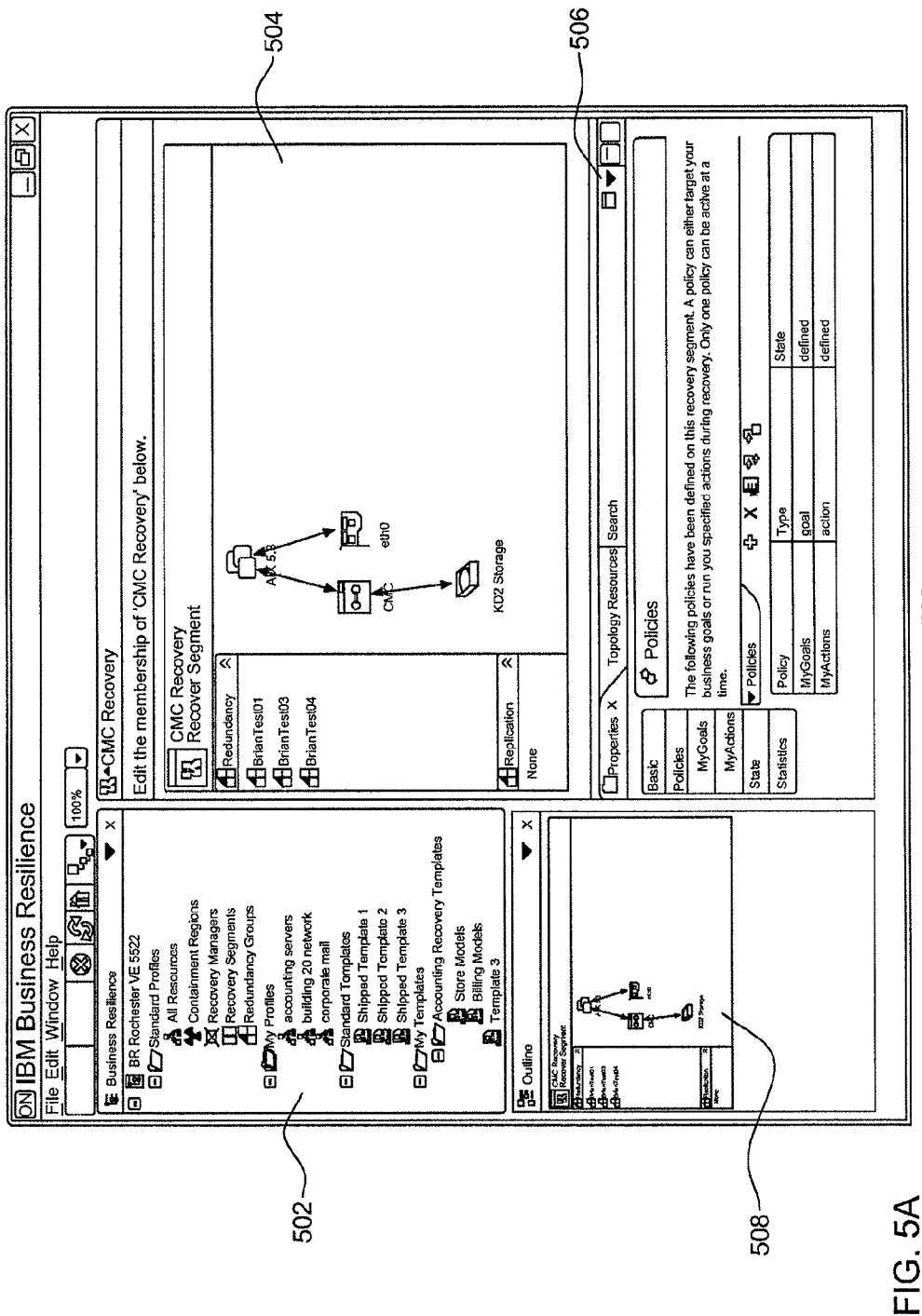
FIG. 5A depicts one example of a screen display of a business resilience perspective, in accordance with an aspect of the present invention.

Screen display 500 depicted in FIG. 5A displays one example of a Business Resilience Perspective. Starting in the upper left corner and rotating clockwise, the user interface includes, for instance:

1. Business Resilience View 502

This is where the user launches topologies and definition templates for viewing and editing.

2. Topology/Definition Template Editor 504

This is where the editors are launched from the Business Resilience View display. The user can have any number of editors open at one time.

3. Properties View/Topology Resources View/Search View 506

The property and topology resource views are driven off the active editor. They display information on the currently selected resource and allow the user to modify settings within the editor.

4. Outline View 508

This view provides a small thumbnail of the topology or template being displayed in the editor. The user can pan around the editor quickly by moving the thumbnail.

Figure 5B:
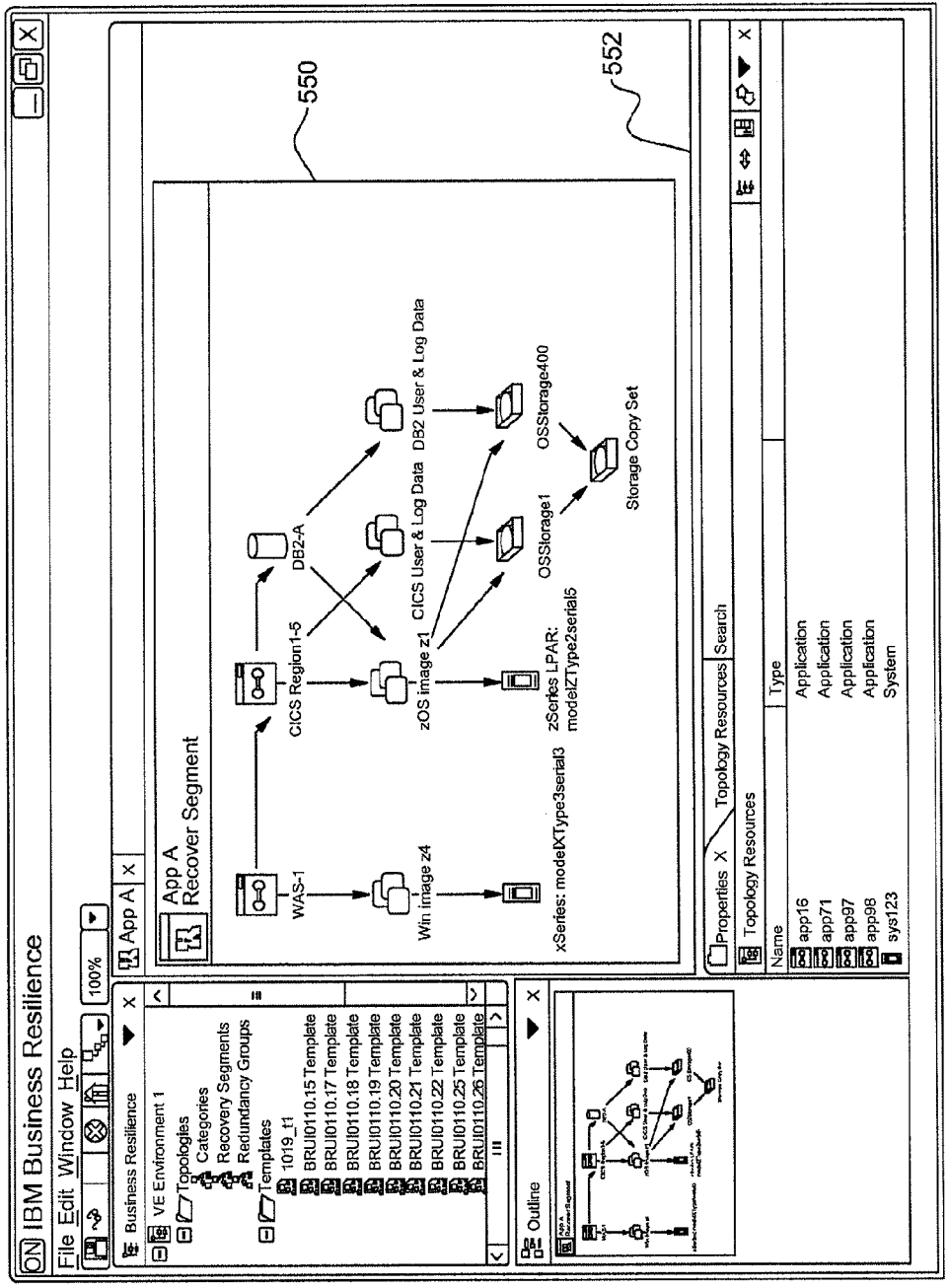
FIG. 5B depicts one example of a screen display of a Recovery Segment, in accordance with an aspect of the present invention.

The topology is reflected by a RS, as shown in the screen display of FIG. 5B. In FIG. 5B, a Recovery Segment 550 is depicted, along with a list of one or more topology resources 552 of the RS (not necessarily shown in the current view of the RS).

In one example, the BR UI is created on the Eclipse Rich Client Platform (RCP), meaning it has complete control over the Eclipse environment, window layouts, and overall behavior. This allows BR to tailor the Eclipse platform and remove Eclipse artifacts not directly relevant to the BR UI application, allowing the user to remain focused, while improving usability.

BR extends the basic user interface of Eclipse by creating software packages called "plugins' that plug into the core Eclipse platform architecture to extend its capabilities. By implementing the UI as a set of standard Eclipse plug-ins, BR has the flexibility to plug into Eclipse, WebSphere Integration Developer, or Rational product installs, as examples. The UI includes two categories of plug-ins, those that are BR specific and those that are specific to processing resources in the IT environment. This separation allows the resource plug-ins to be potentially re-used by other products.

By building upon Eclipse, BR has the option to leverage other tooling being developed for Eclipse. This is most apparent in its usage of BPEL workflow tooling, but the following packages and capabilities are also being leveraged, in one embodiment, as well:

The Eclipse platform provides two graphical toolkit packages, GEF and Draw2D, which are used by BR, in one example, to render topology displays and handle the rather advanced topology layouts and animations. These packages are built into the base Eclipse platform and provide the foundation for much of the tooling and topology user interfaces provided by this design.

The Eclipse platform allows building of advanced editors and forms, which are being leveraged for BR policy and template editing. Much of the common support needed for editors, from the common save lifecycle to undo and redo support, is provided by Eclipse.

The Eclipse platform provides a sophisticated Welcome and Help system, which helps introduce and helps users to get started configuring their environment. Likewise, Eclipse provides a pluggable capability to create task instructions, which can be followed step-by-step by the user to accomplish common or difficult tasks.

Figure 4:
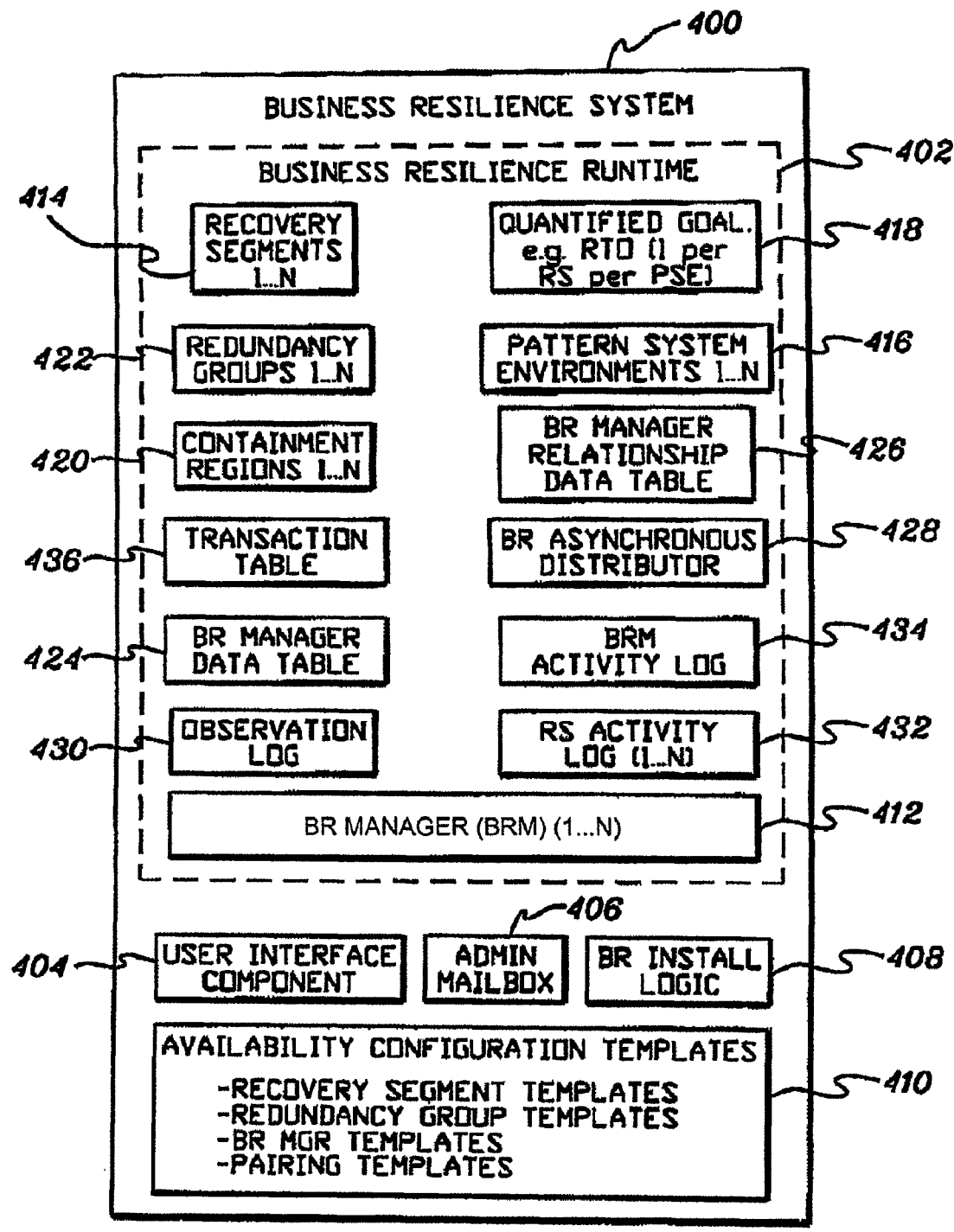
FIG. 4 depicts one embodiment of a Business Resilience System used in accordance with an aspect of the present invention.

BR Admin Mailbox (406) (FIG. 4).

The BR Admin (or Administrative) Mailbox is a mechanism used by various flows of the BR runtime to get requests to an administrator to take some action. The Admin mailbox periodically retrieves information from a table, where BR keeps an up-to-date state.

As an example, the Admin Mailbox defines a mechanism where BR can notify the user of important events needing user attention or at least user awareness. The notifications are stored in the BR database so they can be recorded while the UI is not running and then shown to the user during their next session.

The notifications are presented to the user, in one example, in their own Eclipse view, which is sorted by date timestamp to bubble the most recent notifications to the top. An example of this view is shown in FIG. 6A. As shown, a view 600 is presented that includes messages 602 relating to resources 604. A date timestamp 606 is also included therewith.

Double clicking a notification opens an editor on the corresponding resource within the BR UI, which surfaces the available properties and operations the user may need to handle the notification.

The user is able to configure the UI to notify them whenever a notification exceeding a certain severity is encountered. The UI then alerts 650 the user of the notification and message when it comes in, as shown in FIG. 6B, in one example.

When alerted, the user can choose to open the corresponding resource directly. If the user selects No, the user can revisit the message or resource by using the above notification log view.

BR Install Logic (408) (FIG. 4).

The BR Install logic initializes the environment through accessing the set of preconfigured template information and vendor provided tables containing resource and relationship information, then applying any customizations initiated by the user.

Availability Configuration Templates (410):

Recovery Segment Templates

The BR System has a set of Recovery Segment templates which represent common patterns of resources and relationships. These are patterns matched with each individual customer environment to produce recommendations for RS definitions to the customer, and offer these visually for customization or acceptance.

Redundancy Group Templates

The BR System has a set of Redundancy Group templates which represent common patterns of forming groups of redundant resources. These are optionally selected and pattern matched with each individual customer environment to produce recommendations for RG definitions to a customer.

BR Manager Deployment Templates

The BR System has a set of BR Manager Deployment templates which represent recommended configurations for deploying the BR Manager, its related Recovery Segments, and the related BR management components. There are choices for distribution or consolidation of these components. Best practice information is combined with optimal availability and performance characteristics to recommend a configuration, which can then be subsequently accepted or altered by the customer.

Pairing Templates

The BR System has a set of Pairing Templates used to represent best practice information about which resources are related to each other.

The user interface, admin mailbox, install logic and/or template components can be part of the same computing unit executing BR Runtime or executed on one or more other distributed computing units.

To further understand the use of some of the above components and their interrelationships, the following example is offered. This example is only offered for clarification purposes and is not meant to be limiting in any way.

Figure 7:
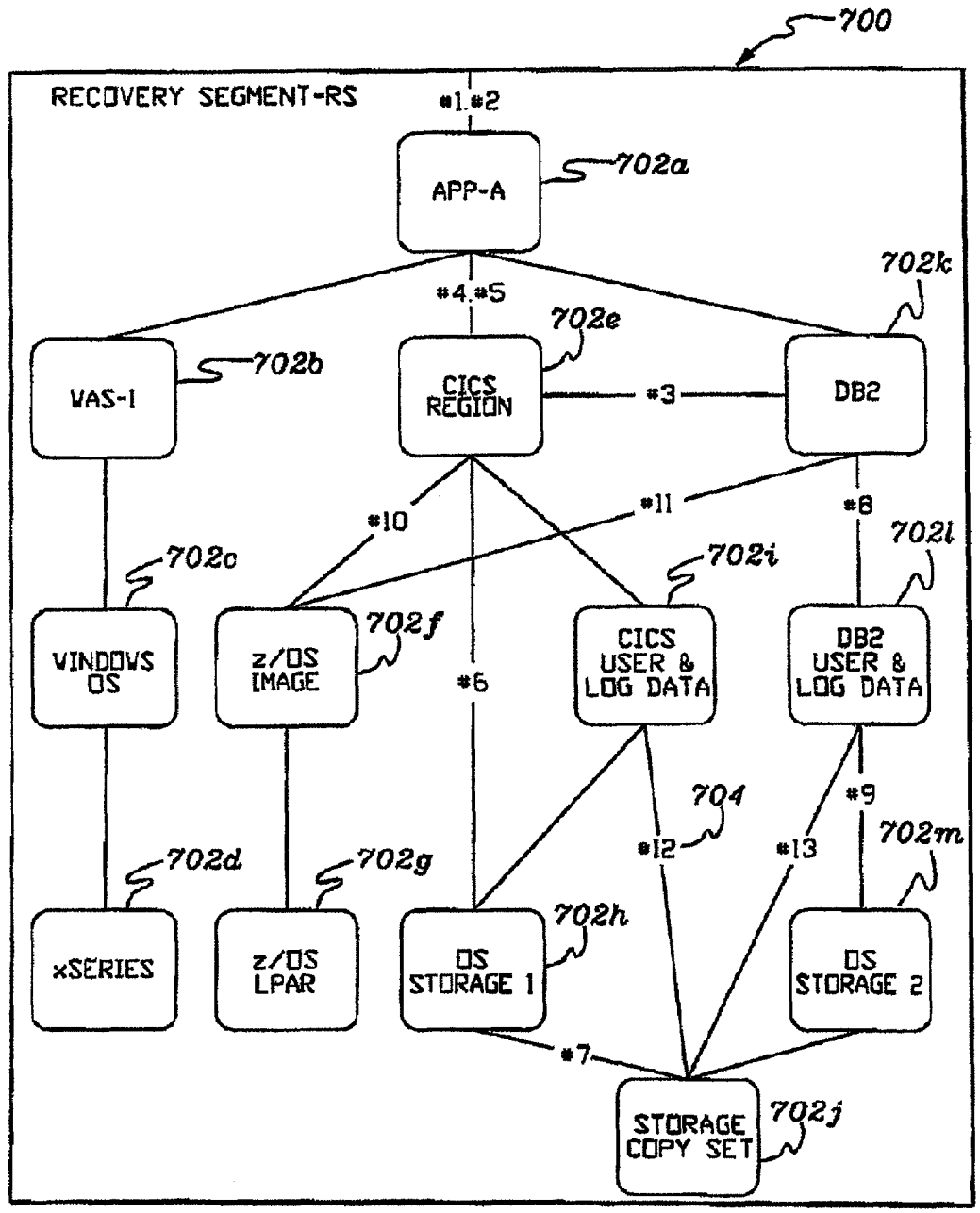
FIG. 7 depicts one example of a Recovery Segment of the Business Resilience System of FIG. 4, in accordance with an aspect of the present invention.

Referring to FIG. 7, a Recovery Segment RS 700 is depicted. It is assumed for this Recovery Segment that:

The Recovery Segment RS has been defined associated with an instantiated and deployed BR Manager for monitoring and management.

Relationships have been established between the Recovery Segment RS and the constituent resources 702a-702m.

A goal policy has been defined and validated for the Recovery Segment through interactions with the BR UI.

The following impact pairings have been assigned to the resources and relationships:

| Rule | Resource #1 | State | Resource #2 | State |
|---|---|---|---|---|
| 1 | App-A | Degraded | RS | Degraded |
| 2 | App-A | Unavailable | RS | Unavailable |
| 3 | DB2 | Degraded | CICS | Unavailable |
| 4 | CICS | Unavailable | App-A | Unavailable |
| 5 | CICS | Degraded | App-A | Degraded |
| 6 | OSStorage-1 | Unavailable | CICS | Degraded |
| 7 | OSStorage-1 | Unavailable | Storage Copy Set | Degraded |
| 8 | DB2 User & Log Data | Degraded | DB2 | Degraded |
| 9 | OSStorage-2 | Unavailable | DB2 User & Log Data | Degraded |
| 10 | z/OS | Unavailable | CICS | Unavailable |

-continued

| Rule | Resource #1 | State | Resource #2 | State |
|---|---|---|---|---|
| 11 | z/OS | Unavailable | DB2 | Unavailable |
| 12 | Storage Copy Set | Degraded | CICS User & Log Data | Degraded |
| 13 | Storage Copy Set | Degraded | DB2 User & Log Data | Degraded |

The rules in the above table correspond to the numbers in the figure. For instance, #12 (704) corresponds to Rule 12 above.

Observation mode for the resources in the Recovery Segment has been initiated either by the customer or as a result of policy validation.

The environment has been prepared as a result of that goal policy via policy validation and the possible creation and execution of a preparatory workflow.

The goal policy has been activated for monitoring by BR.

As a result of these conditions leading up to runtime, the following subscriptions have already taken place:

The BRM has subscribed to runtime state change events for the RS.

RS has subscribed to state change events for the constituent resources.

These steps highlight one example of an error detection process:

The OSStorage-1 resource 702*h* fails (goes Unavailable).

RS gets notified of state change event.

$1^{st}$ level state aggregation determines:
  Storage Copy Set→Degraded
  CICS User & Log Data→Degraded
  DB2 User & Log Data→Degraded
  DB2→Degraded
  CICS→Unavailable
  App-A→Unavailable $1^{st}$ level state aggregation determines:
  RS→Unavailable BRM gets notified of RS state change. Creates the following Containment Region:

| Resource | Reason |
|---|---|
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

Creates a recovery workflow based on the following resources:

| Resource | State |
|---|---|
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

In addition to the above, BR includes a set of design points that help in the understanding of the system. These design points include, for instance:

Goal Policy Support

BR is targeted towards goal based policies—the customer configures his target availability goal, and BR determines the preparatory actions and recovery actions to achieve that goal (e.g., automatically).

Availability management of the IT infrastructure through goal based policy is introduced by this design. The BR system includes the ability to author and associate goal based availability policy with the resource Recovery Segments described herein. In addition, support is provided to decompose the goal policy into configuration settings, preparatory actions and runtime procedures in order to execute against the deployed availability goal. In one implementation of the BR system, the Recovery Time Objective (RTO—time to recover post outage) is a supported goal policy. Additional goal policies of data currency (e.g., Recovery Point Objective) and downtime maximums, as well as others, can also be implemented with the BR system. Recovery Segments provide the context for association of goal based availability policies, and are the scope for goal policy expression supported in the BR design. The BR system manages the RTO through an understanding of historical information, metrics, recovery time formulas (if available), and actions that affect the recovery time for IT resources.

RTO goals are specified by the customer at a Recovery Segment level and apportioned to the various component resources grouped within the RS. In one example, RTO goals are expressed as units of time intervals, such as seconds, minutes, and hours. Each RS can have one RTO goal per Pattern System Environment associated with the RS. Based on the metrics available from the IT resources, and based on observed history and/or data from the customer, the RTO goal associated with the RS is evaluated for achievability, taking into account which resources are able to be recovered in parallel.

Based on the RTO for the RS, a set of preparatory actions expressed as a workflow is generated. This preparatory workflow configures the environment or makes alterations in the current configuration, to achieve the RTO goal or to attempt to achieve the goal.

In terms of optimizing RTO, there are tradeoffs associated with the choices that are possible for preparatory and recovery actions. Optimization of recovery choice is performed by BR, and may include interaction at various levels of sophistication with IT resources. In some cases, BR may set specific configuration parameters that are surfaced by the IT resource to align with the stated RTO. In other cases, BR may request that an IT resource itself alter its management functions to achieve some portion of the overall RS RTO. In either case, BR aligns availability management of the IT resources contained in the RS with the stated RTO.

Metrics and Goal Association

In this design, as one example, there is an approach to collecting the required or desired metrics data, both observed and key varying factors, system profile information that is slow or non-moving, as well as potential formulas that reflect a specific resource's use of the key factors in assessing and performing recovery and preparatory actions, historical data and system information. The information and raw metrics that BR uses to perform analysis and RTO projections are expressed as part of the IT resources, as resource properties. BR specific interpretations and results of statistical analysis of key factors correlated to recovery time are kept as BR Specific Management data (BRMD).

Relationships Used by BR, and BR Specific Resource Pairing Information

BR maintains specific information about the BR management of each resource pairing or relationship between resources. Information regarding the BR specific data for a resource pairing is kept by BR, including information such as ordering of operations across resources, impact assessment information, operation effect on availability state, constraint analysis of actions to be performed, effects of preparatory actions on resources, and requirements for resources to co-locate or anti-co-locate.

Evaluation of Failure Scope

One feature of the BR function is the ability to identify the scope and impact of a failure. The BR design uses a Containment Region to identify the resources affected by an incident. The Containment Region is initially formed with a fairly tight restriction on the scope of impact, but is expanded on receiving errors related to the first incident. The impact and scope of the failure is evaluated by traversing the resource relationships, evaluating information on BR specific resource pairing information, and determining most current state of the resources impacted.

Generation and Use of Workflow

Various types of preparatory and recovery processes are formulated and in some cases, optionally initiated. Workflows used by BR are dynamically generated based on, for instance, customer requirements for RTO goal, based on actual scope of failure, and based on any configuration settings customers have set for the BR system.

A workflow includes one or more operations to be performed, such as Start CICS, etc. Each operation takes time to execute and this amount of time is learned based on execution of the workflows, based on historical data in the observation log or from customer specification of execution time for operations. The workflows formalize, in a machine readable, machine editable form, the operations to be performed.

In one example, the processes are generated into Business Process Execution Language (BPEL) compliant workflows with activities that are operations on IT resources or specified manual, human activities. For example, BRM automatically generates the workflows in BPEL. This automatic generation includes invoking routines to insert activities to build the workflow, or forming the activities and building the XML (Extensible Mark-Up Language). Since these workflows are BPEL standard compliant, they can be integrated with other BPEL defined workflows which may incorporate manual activities performed by the operations staff. These BR related workflows are categorized as follows, in one example:

Preparatory—Steps taken during the policy prepare phase in support of a given goal, such as the setting of specific configuration values, or the propagation of availability related policy on finer grained resources in the Recovery Segment composition. BR generates preparatory workflows, for instance, dynamically. Examples of preparatory actions include setting up storage replication, and starting additional instances of middleware subsystems to support redundancy.

Recovery—Steps taken as a result of fault detection during runtime monitoring of the environment, such as, for example, restarting a failed operating system (OS). BR generates recovery workflows dynamically, in one example, based on the actual failure rather than a pre-specified sequence.

Preventive—Steps taken to contain or fence an error condition and prevent the situation from escalating to a more substantial outage or impact; for example, the severing of a failed resource's relationship instances to other resources. Preventive workflows are also dynamically generated, in one example.

Return—Steps taken to restore the environment back to 'normal operations' post recovery, also represented as dynamically generated workflows, as one example.

Capturing of Workflow Information

Since the set of BR actions described above modify existing IT environments, visibility to the actions that are taken by BR prior to the actual execution is provided. To gain trust in the decisions and recommendations produced by BR, the BR System can run in 'advisory mode'. As part of advisory mode, the possible actions that would be taken are constructed into a workflow, similar to what would be done to actually execute the processes. The workflows are then made visible through standard workflow authoring tooling for customers to inspect or modify. Examples of BPEL tooling include:

Bolie, et al., BPEL Cookbook: Best Practices for SOA-based Integration and Composite Applications Development, ISBN 1904811337, 2006, PACKT Publishing, hereby incorporated herein by reference in its entirety;

Juric, et al., Business Process Execution Language for Web Services: BPEL and BPELYWS, ISBN 1-904811-18-3, 2004, PACKT Publishing, hereby incorporated herein by reference in its entirety.

http://www-306.ibm.com/software/integration/wid/about/?S_CMP=rnav http://www.eclipse.org/bpel/ http://www.parasoft.com/jsp/products/home.jsp;jessionid=aaa56iqFywA-HJ?product=BPEL&redname=googbpelm&referred=searchengine%2Fgoogle%Fbpel Tooling Lifecycle, Support of Managed Resources and Roles BR tooling spans the availability management lifecycle from definition of business objectives, IT resource selection, availability policy authoring and deployment, development and deployment of runtime monitors, etc. In one example, support for the following is captured in the tooling environment for the BR system:

Visual presentation of the IT resources & their relationships, within both an operations and administration context.

Configuration and deployment of Recovery Segments and BRMs.

Authoring and deployment of a BR policy.

Modification of availability configuration or policy changes for BR.

BPEL tooling to support viewing of BR created, as well as customer authored, workflows.

BPEL tooling to support monitoring of workflow status, related to an operations console view of IT resource operational state.

Policy Lifecycle

The policy lifecycle for BR goal policies, such as RTO goals, includes, for example:

Define—Policy is specified to a RS, but no action is taken by the BRM to support the policy (observation information may be obtained).

Validate—Policy is validated for syntax, capability, etc.; preparatory workflow created for viewing and validation by customer.

Prepare—Preparatory action workflows are optionally executed.

Activate—Policy is activated for runtime monitoring of the environment.

Modify—Policy is changed dynamically in runtime.

Configurable State Aggregation

One of the points in determining operational state of a Recovery Segment is that this design allows for customers to configure a definition of specific 'aggregated' states, using properties of individual IT resources. A Recovery Segment is an availability management context, in one example, which may include a diverse set of IT resources.

The customer may provide the rules logic used within the Recovery Segment to consume the relevant IT resource properties and determine the overall state of the RS (available, degraded and unavailable, etc). The customer can develop and deploy these rules as part of the Recovery Segment availability policy. For example, if there is a database included in the Recovery Segment, along with the supporting operating system, storage, and network resources, a customer may configure one set of rules that requires that the database must have completed the recovery of in-flight work in order to consider the overall Recovery Segment available. As another example, customers may choose to configure a definition of availability based on transaction rate metrics for a database, so that if the rate falls below some value, the RS is considered unavailable or degraded, and evaluation of 'failure' impact will be triggered within the BR system. Using these configurations, customers can tailor both the definitions of availability, as well as the rapidity with which problems are detected, since any IT resource property can be used as input to the aggregation, not just the operational state of IT resources.

Failure During Workflow Sequences of Preparatory, Recovery, Preventive

Failures occurring during sequences of operations executed within a BPEL compliant process workflow are intended to be handled through use of BPEL declared compensation actions, associated with the workflow activities that took a failure. The BR System creates associated "undo" workflows that are then submitted to compensate, and reset the environment to a stable state, based on where in the workflow the failure occurred.

Customer Values

The following set of customer values, as examples, are derived from the BR system functions described above, listed here with supporting technologies from the BR system:

Align total IT runtime environment to business function availability objectives:
  RS definition from representation of IT Resources;
  Goal (RTO) and action policy specification, validation and activation; and
  Tooling by Eclipse, as an example, to integrate with IT process management.
Rapid, flexible, administrative level:
  Alteration of operation escalation rules;
  Customization of workflows for preparatory and recovery to customer goals;
  Customization of IT resource selection from RG based on quality of service (QoS);
  Alteration of definition of IT resource and business application state (available, degraded, or unavailable);
  Customization of aggregated state;
  Modification of topology for RS and RG definition;
  Selection of BR deployment configuration;
  Alteration of IT resource recovery metrics;
  Customization of generated Pattern System Environments; and
  Specification of statistical tolerances required for system environment formation or recovery metric usage.
Extensible framework for customer and vendor resources:
  IT resource definitions not specific to BR System; and
  Industry standard specification of workflows, using, for instance, BPEL standards.
Adaptive to configuration changes and optimization:
  IT resource lifecycle and relationships dynamically maintained;
  System event infrastructure utilized for linkage of IT resource and BR management;
  IT resource recovery metrics identified and collected;
  IT resource recovery metrics used in forming Pattern System Environments;
  Learned recovery process effectiveness applied to successive recovery events;
  System provided measurement of eventing infrastructure timing;
  Dynamic formation of time intervals for aggregation of related availability events to a root cause; and
  Distribution of achieved recovery time over constituent resources.
Incremental adoption and coexistence with other availability offerings:
  Potential conflict of multiple managers for a resource based on IT representation;
  Workflows for recovery and preparatory reflect operations with meta data linked to existing operations;
  Advisory mode execution for preparatory and recovery workflows; and
  Incremental inclusion of resources of multiple types.
Support for resource sharing:
  Overlapping and contained RS;
  Merger of CR across RS and escalation of failure scope; and
  Preparatory and recovery workflows built to stringency requirements over multiple RS.
Extensible formalization of best practices based on industry standards:
  Templates and patterns for RS and RG definition;
  Preparatory and recovery workflows (e.g., BPEL) for customization, adoption; and
  Industry standard workflow specifications enabling integration across customer and multiple vendors.
Integration of business resilience with normal runtime operations and IT process automation:
  Option to base on IT system wide, open industry standard representation of resources;
  BR infrastructure used for localized recovery within a system, cluster and across sites; and
  Utilization of common system infrastructure for events, resource discovery, workflow processing, visualization.

Management of the IT environment is adaptively performed, as described herein and in a U.S. Patent Application "Adaptive Business Resiliency Computer System for Information Technology Environments," (POU920070364US1), Bobak et al., co-filed herewith, which is hereby incorporated herein by reference in its entirety.

Many different sequences of activities can be undertaken in creating a BR environment. The following represents one possible sequence; however, many other sequences are possible. This sequence is provided merely to facilitate an understanding of a BR system and one or more aspects of the present invention. This sequence is not meant to be limiting in any way. In the following description, reference is made to various U.S. Patent Applications, which are co-filed herewith.

On receiving the BR and related product offerings, an installation process is undertaken. Subsequent to installation of the products, a BR administrator may define the configuration for BR manager instances with the aid of BRM configuration templates.

Having defined the BRM configuration a next step could be to define Recovery Segments as described in "Recovery Segments for Computer Business Applications," (POU920070108US1), Bobak et al., which is hereby incorporated herein by reference in its entirety.

Definition of a RS may use a representation of resources in a topology graph as described in "Use of Graphs in Managing Computing Environments," (POU920070112US1), Bobak et al., which is hereby incorporated herein by reference in its entirety.

It is expected that customers will enable BR operation in "observation" mode for a period of time to gather information regarding key metrics and operation execution duration associated with resources in a RS.

At some point, sufficient observation data will have been gathered or a customer may have sufficient knowledge of the environment to be managed by BR. A series of activities may then be undertaken to prepare the RS for availability management by BR. As one example, the following steps may be performed iteratively.

A set of functionally equivalent resources may be defined as described in "Use of Redundancy Groups in Runtime Computer Management of Business Applications," (POU920070113US1), Bobak et al., which is hereby incorporated herein by reference in its entirety.

Specification of the availability state for individual resources, redundancy groups and Recovery Segments may be performed as described in "Use of Multi-Level State Assessment in Computer Business Environments," (POU920070114US1), Bobak et al., which is hereby incorporated herein by reference in its entirety.

Representations for the IT environment in which BR is to operate may be created from historical information captured during observation mode, as described in "Computer Pattern System Environment Supporting Business Resiliency," (POU920070107US1), Bobak et al., which is hereby incorporated herein by reference in its entirety. These definitions provide the context for understanding how long it takes to perform operations which change the configuration—especially during recovery periods.

Information on relationships between resources may be specified based on recommended best practices—expressed in templates—or based on customer knowledge of their IT environment as described in "Conditional Computer Runtime Control of an Information Technology Environment Based on Pairing Constructs," (POU920070110US1), Bobak et al., which is hereby incorporated herein by reference in its entirety. Pairing processing provides the mechanism for reflecting required or desired order of execution for operations, the impact of state change for one resource on another, the effect execution of an operation is expected to have on a resource state, desire to have one subsystem located on the same system as another and the effect an operation has on preparing the environment for availability management.

With preliminary definitions in place, a next activity of the BR administrator might be to define the goals for availability of the business application represented by a Recovery Segment as described herein, in accordance with one or more aspects of the present invention.

Managing the IT environment to meet availability goals includes having the BR system prioritize internal operations. The mechanism utilized to achieve the prioritization is described in "Serialization in Computer Management," (POU920070105US1), Bobak et al., which is hereby incorporated herein by reference in its entirety.

Multiple operations are performed to prepare an IT environment to meet a business application's availability goal or to perform recovery when a failure occurs. The BR system creates workflows to achieve the required or desired ordering of operations, as described in "Dynamic Generation of Processes in Computing Environments," (POU920070123US1), Bobak et al., which is hereby incorporated herein by reference in its entirety.

A next activity in achieving a BR environment might be execution of the ordered set of operations used to prepare the IT environment, as described in "Dynamic Selection of Actions in an Information Technology Environment," (POU920070117US1), Bobak et al., which is hereby incorporated herein by reference in its entirety.

Management by BR to achieve availability goals may be initiated, which may initiate or continue monitoring of resources to detect changes in their operational state, as described in "Real-Time Information Technology Environments," (POU920070120US1), Bobak et al., which is hereby incorporated herein by reference in its entirety. Monitoring of resources may have already been initiated as a result of "observation" mode processing.

Changes in resource or redundancy group state may result in impacting the availability of a business application represented by a Recovery Segment. Analysis of the environment following an error is performed. The analysis allows sufficient time for related errors to be reported, insures gathering of resource state completes in a timely manner and insures sufficient time is provided for building and executing the recovery operations—all within the recovery time goal, as described in "Management Based on Computer Dynamically Adjusted Discrete Phases of Event Correlation," (POU920070119US1), Bobak et al., which is hereby incorporated herein by reference in its entirety.

A mechanism is provided for determining if events impacting the availability of the IT environment are related, and if so, aggregating the failures to optimally scope the outage, as described in "Management of Computer Events in a Computer Environment," (POU920070118US1), Bobak et al., which is hereby incorporated herein by reference in its entirety.

Ideally, current resource state can be gathered after scoping of a failure. However, provisions are made to insure management to the availability goal is achievable in the presence of non-responsive components in the IT environment, as described in "Managing the Computer Collection of Information in an Information Technology Environment," (POU920070121US1), Bobak et al., which is hereby incorporated herein by reference in its entirety.

With the outage scoped and current resource state evaluated, the BR environment can formulate an optimized recovery set of operations to meet the availability goal, as described in "Defining a Computer Recovery Process that Matches the Scope of Outage," (POU920070124US1), Bobak et al., which is hereby incorporated herein by reference in its entirety.

Formulation of a recovery plan is to uphold customer specification regarding the impact recovery operations can have between different business applications, as described in "Managing Execution Within a Computing Environment," (POU920070115US1), Bobak et al., which is hereby incorporated herein by reference in its entirety.

Varying levels of recovery capability exist with resources used to support a business application. Some resources possess the ability to perform detailed recovery actions while others do not. For resources capable of performing recovery operations, the BR system provides for delegation of recovery if the resource is not shared by two or more business applications, as described in "Conditional Actions Based on Runtime Conditions of a Computer System Environment," (POU920070116US1), Bobak et al., which is hereby incorporated herein by reference in its entirety.

Having evaluated the outage and formulated a set of recovery operations, the BR system resumes monitoring for subsequent changes to the IT environment.

In support of mainline BR system operation, there are a number of activities including, for instance:

Coordination for administrative task that employ multiple steps, as described in "Adaptive Computer Sequencing of Actions," (POU920070106US1), Bobak et al., which is hereby incorporated herein by reference in its entirety.

Use of provided templates representing best practices in defining the BR system, as described in "Defining and Using Templates in Configuring Information Technology Environments," (POU920070109US1), Bobak et al., which is hereby incorporated herein by reference in its entirety.

Use of provided templates in formulation of workflows, as described in "Using Templates in a Computing Environment," (POU920070126US1), Bobak et al., which is hereby incorporated herein by reference in its entirety.

Making changes to the availability goals while supporting ongoing BR operation, as described in "Non-Disruptively Changing a Computing Environment," (POU920070122US1), Bobak et al., which is hereby incorporated herein by reference in its entirety.

Making changes to the scope of a business application or Recovery Segment, as described in "Non-Disruptively Changing Scope of Computer Business Applications Based on Detected Changes in Topology," (POU920070125US1), Bobak et al., which is hereby incorporated herein by reference in its entirety.

Detecting and recovery for the BR system is performed non-disruptively, as described in "Managing Processing of a Computing Environment During Failures of the Environment," (POU920070365US1), Bobak et al., which is hereby incorporated herein in its entirety.

In order to build a BR environment that meets recovery time objectives, IT configurations within a customer's location are to be characterized and knowledge about the duration of execution for recovery time operations within those configurations is to be gained. IT configurations and the durations for operation execution vary by time, constituent resources, quantity and quality of application invocations, as examples. Customer environments vary widely in configuration of IT resources in support of business applications. Understanding the customer environment and the duration of operations within those environments aids in insuring a Recovery Time Objective is achievable and in building workflows to alter the customer configuration of IT resources in advance of a failure and/or when a failure occurs.

A characterization of IT configurations within a customer location is built by having knowledge of the key recovery time characteristics for individual resources (i.e., the resources that are part of the IT configuration being managed; also referred to as managed resources). Utilizing the representation for a resource, a set of key recovery time objective (RTO) metrics are specified by the resource owner. During ongoing operations, the BR manager gathers values for these key RTO metrics and gathers timings for the operations that are used to alter the configuration. It is expected that customers will run the BR function in "observation" mode prior to having provided a BR policy for availability management or other management. While executing in "observation" mode, the BR manager periodically gathers RTO metrics and operation execution durations from resource representations. The key RTO metrics properties, associated values and operation execution times are recorded in an Observation log for later analysis through tooling. Key RTO metrics and operation execution timings continue to be gathered during active BR policy management in order to maintain currency and iteratively refine data used to characterize customer IT configurations and operation timings within those configurations.

Examples of RTO properties and value range information by resource type are provided in the below table. It will be apparent to those skilled in the art that additional, less, and/or different resource types, properties and/or value ranges may be provided.

| Resource Type | Property | Value Range |
| --- | --- | --- |
| Operating System | Identifier | Text |
| | State | Ok, stopping, planned stop, stopped, starting, error, lost monitoring capability, unknown |
| | Memory Size | Units in MB |
| | Number of systems in sysplex, if applicable | integer |
| | Last IPL time of day | Units in time of day/clock |
| | Type of last IPL | Cold, warm, emergency |
| | Total Real Storage Available | Units in MB |
| | GRS Star Mode | Yes or No |
| | Complete IPL time to reach 'available' | Units of elapsed time |
| | Total CPU using to reach available during IPL | Units of elapsed time |
| | Total CPU delay to reach available during IPL | Units of elapsed time |
| | Total Memory using to reach available during IPL | Units in MB |
| | Total Memory delay to reach available during IPL | Units of elapsed time |

-continued

| Resource Type | Property | Value Range |
|---|---|---|
| | Total i/o requests | Integer value, number of requests |
| | Total i/o using to reach available during IPL | Units of elapsed time |
| | Total i/o delay to reach available during IPL | Units of elapsed time |
| Computer System (LPAR, Server, etc.) | Identifier | Text |
| | State | Ok, stopping, stopped, planned down, starting, error, lost monitoring capability, unknown |
| | Type of CPU - model, type, serial | Text value |
| | Number of CPUs | integer |
| | Number of shared processors | integer |
| | Number of dedicated processors | integer |
| | Last Activate Time of Day | Units in time of day/clock |
| Network Components | | |
| Group of Network Connections | Identity | |
| | Operational State | Ok, Starting, Disconnected, Stopping, Degraded, Unknown |
| | State of each associated Network Application Connection | Text |
| | Performance Stats on loss and delays | Complex |
| | Recovery Time for any associated application network connections | Units in elapsed time |
| | Number of active application network connections associated at time of network problem | Integer |
| | Stopped Time/duration for group of connectoins | Units in elapsed time |
| | Maximum Network Recovery Time for any application connection in group | Units in elapsed time |
| | Maximum Number of active connections at time of network problem encountered, for any application connection in group | Integer |
| | Maximum Number of connections processed at time of network recovery, for the group of connections | Integer |
| | Maximum network connection recovery time/duration for any application connection in the group | Units in elapsed time |
| | Maximum Number of connections dropped at time of application network connection recovery, for any application connection in the group | Integer |
| Network Application Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Network Recovery Time for app connection | Units in elapsed time |
| | Number of active connections at time of network problem encountered, on a per app connection basis | Integer |
| | Number of connections processed at time of network recovery, for the app connection | Integer |

-continued

| Resource Type | Property | Value Range |
|---|---|---|
| | application network connection recovery time/duration | Units in elapsed time |
| | Number of connections at time of application network connection problem encountered | Integer |
| | Number of connections processed at time of application network connection recovery | Integer |
| | Number of connections dropped at time of application network connection recovery | Integer |
| Network Host Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Number of QoS Events, indicating potential degradation | Integer |
| | Number of QoS Events handled, | Integer |
| | Last handled QoS Event | Text |
| Database Subsystem | Name, identifier | Text |
| | Operational State | Operational, Nonoperational, starting, stopping, in recovery, log suspended, backup initiated, restore initiated, restore complete, in checkpoint, checkpoint completed, applying log, backing out inflights, resolving indoubts, planned termination, lost monitoring capability |
| | Time spent in log apply | Units of elapsed time |
| | Time spent during inflight processing | Units of elapsed time |
| | Time spent during indoubt processing | Units of elapsed time |
| | Total time to restart | Units of elapsed time |
| | Checkpoint frequency | Units of time |
| | Backout Duration | Number of records to read back in log during restart processing |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O using during restart | Units of elapsed time |
| | I/O Delay during restart | Units of elapsed time |
| Database Datasharing Group | Identifer | Text |
| | Operational State | Operational, nonoperational, degraded (some subset of members non operational), lost monitoring capability |
| | Number of locks in Shared Facility | Integer value |
| | Time spent in lock cleanup for last restart | Elapsed time value |
| Database | Identifier | Text |
| Tablespace | Identifier | Text |
| Transaction Region | Identifier | Text |
| | Name | Text |
| | Associated job name | Text |
| | Maximum number of tasks/threads | Integer value |
| | Restart type for next restart | Warm, cold, emergency |
| | Forward log name | Text |
| | System log name | Text |

-continued

| Resource Type | Property | Value Range |
|---|---|---|
| | Operational State | Operational, nonoperational, in recovery, starting, stop normal first quiesce, stop normal second quiesce, stop normal third quiesce |
| | Time spent in log apply | Units of elapsed time |
| | Time during each recovery stage | Units of elapsed time |
| | Total time to restart | Units of elapsed time |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O connect time during restart | Units of elapsed time |
| | I/O Delay during restart | Units of elapsed time |
| | System Logsize | Units in MB |
| | Forward Logsize | Units in MB |
| | Activity Keypoint frequency | Integer - number of writes before activity checkpoint taken |
| | Average Transaction Rate for this region | Number of transactions per second, on average |
| Transaction Group | Group name | Text |
| Transaction Region File | Filename | Text |
| | Region Name | Text |
| | Dataset Name | Text |
| | Operational State | Operational/enabled, nonoperational/disabled |
| | Open status | Open, closed, closing |
| Transaction | Identifier | Text |
| | Operational State | Running, failed, shunted, retry in progress |
| | Region Name (s) that can run this transaction | Text |
| | Program Name | Text |
| Logical Replication Group of related datasets | Identity | Text |
| | State | |
| | Required currency characteristics for datasets | Complex |
| | Required consistency characteristics for datasets | Complex |
| Replication Group | Identity | |
| | State | |
| Replication Session | Identity | |
| | State | Established, in progress replication, replication successful complete |
| | Type of Session | Flash copy, metro mirror, etc. |
| | Duration of last replication | Units in elapsed time |
| | Time of Day for last replication | Units in time of day/clock |
| | Amount of data replicated at last replication | Units in MB |
| Roleset | Identity | Text |
| | State | |
| CopySet | Identity | Text |
| | State | |
| Dataset | Identity | Text |
| | State | Open, Closed |
| Storage Group | Identity | Text |
| | State | |
| Storage Volume | Identity | Text |
| | State | Online, offline, boxed, unknown |
| Logical Storage Subsystem | Identity | Text |
| | State | |
| Storage Subsystem | Identity | Text |
| | State | |
| | Subsystem I/O Velocity - ratio of time channels are being used | |
| Replication Link (Logical) between Logical Subsystems | Identity | Text |
| | State | Operational, nonoperational, degraded redundancy |
| | Number of configured pipes | Integer |
| | Number of operational pipes | Integer |

Figure 8A:
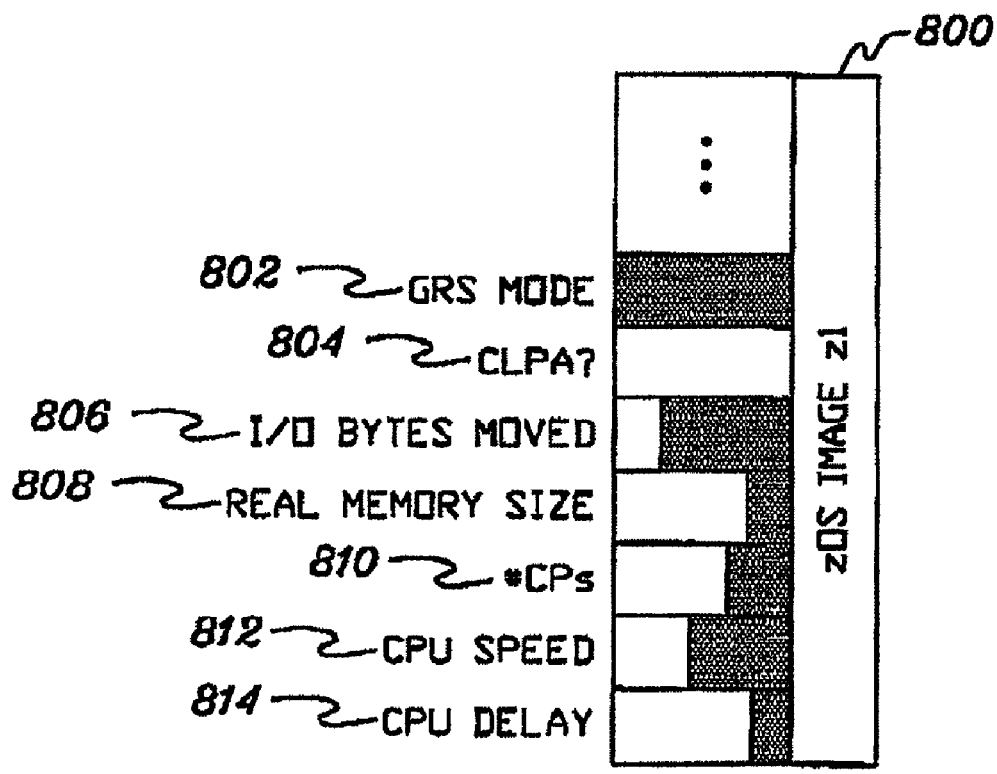
FIG. 8A depicts examples of key Recovery Time Objective properties for a particular resource, in accordance with an aspect of the present invention.

A specific example of key RTO properties for a z/OS® image is depicted in FIG. 8A. As shown, for a z/OS® image 800, the following properties are identified: GRS mode 802, CLPA? (i.e., Was the link pack area page space initialized?) 804, I/O bytes moved 806, real memory size 808, # CPs 810, CPU speed 812, and CPU delay 814, as examples.

Figure 8B:
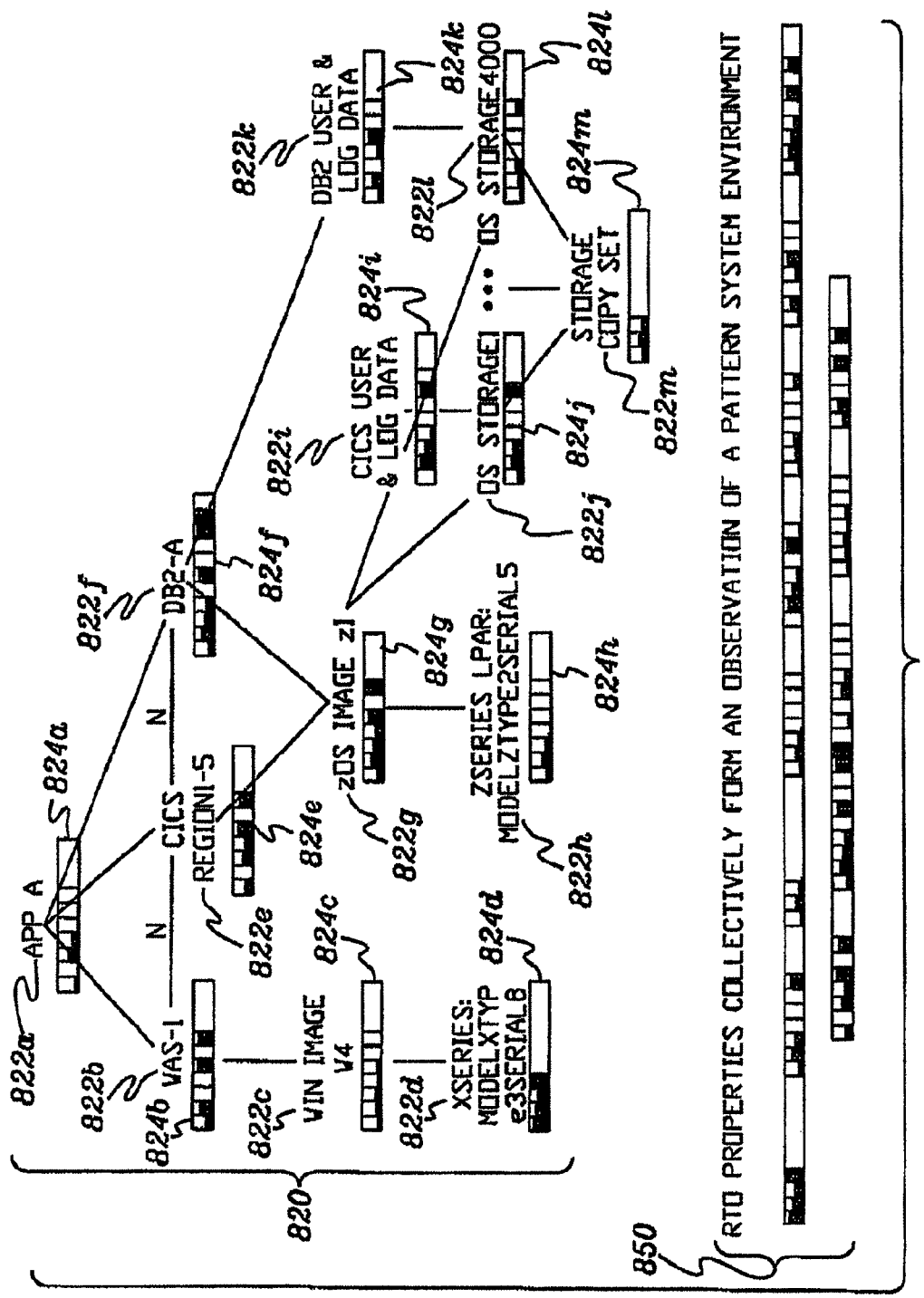
FIG. 8B depicts one example in which Recovery Time Objective properties collectively form an observation of a Pattern System Environment, in accordance with an aspect of the present invention.

The z/OS® image has a set of RTO metrics associated therewith, as described above. Other resources may also have its own set of metrics. An example of this is depicted in FIG. 8B, in which a Recovery Segment 820 is shown that includes a plurality of resources 822*a-m*, each having its own set of metrics 824*a-m*, as indicated by the shading.

Further, in one example, the RTO properties from each of the resources that are part of the Recovery Segment for App A have been gathered by BR and formed into an "observation" for recording to the Observation log, as depicted at 850.

Resources have varying degrees of functionality to support RTO goal policy. Such capacity is evaluated by BR, and expressed in resource property RTOGoalCapability in the BRMD entry for the resource. Two options for BR to receive information operation execution timings are: use of historical data or use of explicitly customer configured data. If BR relies on historical data to make recovery time projections, then before a statistically meaningful set of data is collected, this resource is not capable of supporting goal policy. A mix of resources can appear in a given RS—some have a set of observations that allow classification of the operation execution times, and others are explicitly configured by the customer.

Calculation of projected recovery time can be accomplished in two ways, depending on customer choice: use of historical observations or use of customers input timings. The following is an example of values for the RTOGoalCapability metadata that is found in the BRMD entry for the resource that indicates this choice:

| | |
|---|---|
| UseHistoricalObservations | The resource has a collection of statistically meaningful observations of recovery time, where definition of 'statistically valid' is provided on a resource basis, as default by BR, but tailorable by customers |
| UseCustomerInputTimings | The customer can explicitly set the operation timings for a resource |

If the customer is in observation mode, then historical information is captured, regardless of whether the customer has indicated use of explicitly input timings or use of historical information.

The administrator can alter, on a resource basis, which set of timings BR is to use. The default is to use historical observations. In particular, a change source of resource timing logic is provided that alters the source that BR uses to retrieve resource timings. The two options for retrieving timings are from observed histories or explicitly from admin defined times for operation execution. The default uses information from the observed histories, gathered from periodic polls. If the customer defines times explicitly, the customer can direct BR to use those times for a given resource. If activated, observation mode continues and captures information, as well as running averages, and standard deviations. The impact to this logic is to alter the source of information for policy validation and formulation of recovery plan.

With respect to the historical observations, there may be a statistically meaningful set of observations to verify. The sample size should be large enough so that a time range for each operation execution can be calculated, with a sufficient confidence interval. The acceptable number of observations to qualify as statistically meaningful, and the desired confidence interval are customer configurable using BR UI, but provided as defaults in the BRMD entry for the resource. The default confidence interval is 95%, in one example.

There are metrics from a resource that are employed by BR to enable and perform goal management. These include, for instance:

| Metric | Qualification |
|---|---|
| Last observed recovery/restart time | In milliseconds; or alternately specifying units to use in calculations |
| The key factors and associated values of the resource that affect recovery time | Captured at last observed recovery time, and capturable at a point in time by BR |
| The key factors and associated values of the resource that affect other dependent resources' recovery times | Captured at last observed recovery time, and capturable at a point in time by BR |
| Observed time interval from 'start' state to each 'non-blocking' state | If there are various points in the resource recovery lifecycle at which it becomes non-blocking to other resources which depend upon it, then: Observed time interval from 'start' state to each 'non-blocking' state |
| Resource Consumption Information | If the resource can provide information about its consumption, or the consumption of dependent resources, on an interval basis, then BR will use this information in forming PSEs and classifying timings. One example of this is: cpu, i/o, memory usage information that is available from zOS WLM for an aggregation of processes/address spaces over a given interval. |

There is also a set of information about the resource that is employed—this information is provided as defaults in the BRMD entry for the resource, but provided to the BR team in the form of best practices information/defaults by the domain owners:

The operational state of the resource at which the observed recovery time interval started.

The operational state of the resource at which the observed recovery time interval ended.

The operational states of the resource at which point it can unblock dependent resources (example: operational states at which a DB2 could unblock new work from CICS, at which it could allow processing of logs for transactions ongoing at time of failure . . . ).

Values of statistical thresholds to indicate sufficient observations for goal managing the resource (number of observations, max standard deviations, confidence level).

In addition to the resources defined herein as part of the IT configuration that is managed, there are other resources, referred to herein as assessed resources. Assessed resources are present primarily to provide observation data for PSE formation, and to understand impact(s) on managed resources. They do not have a decomposed RTO associated with them nor are they acted on for availability by BR. Assessed resources have the following characteristics, as examples:

Are present to collect observation data for PSE formation.

Are present to understand impacts on managed resources.

No decomposed RTO is associated with an assessed resource.

They are resources on which resources managed by BR depend upon, but are not directly acted on for availability by BR.

They are resources removed (or not explicitly added) from the actively monitored set of resources by the BR admin during RS definition.

They are resources that BR does not try to recover and BR thus will not invoke any preparatory or recovery operations on them.

Similarly, there are likely scenarios where a resource exists in a customer environment that already has an alternative availability management solution, and does not require BR for its availability. However, since other resources that are managed by BR may be dependent on them, they are observed and assessed in order to collect observation data and understand their impacts on managed resources. Additionally, there may be resources that do not have alternative management solutions, but the customer simply does not want them managed by BR, but other managed resources are dependent upon them. They too are classified as assessed resources.

These assessed resources share many of the same characteristics of managed resources, such as, for example:

They have an entry in the BRMD, depending on their use, and the BRMD entry has an indication of assessed vs. managed.

The RS subscribes to state change notifications for assessed resources (and possibly other notifiable properties).

Relationships between observed and managed resources are possible (and likely).

BR monitors for lifecycle events on assessed resources in the same manner as for managed resources.

Assessed resources can be added and/or removed from Recovery Segments.

They can be used to contribute to the aggregated state of an RS.

Finally, there are a few restrictions that BR imposes upon assessed resources, in this embodiment:

Again, BR does not invoke any workflow operations on assessed resources.

A resource that is shared between two Recovery Segments is not categorized as an assessed resource in one RS and a managed resource in the other. It is one or the other in the RS's, but not both.

To facilitate the building of the customer's IT configuration, observations regarding the customer's environment are gathered and stored in an observation log. In particular, the observation log is used to store observations gathered during runtime in customer environments, where each observation is a collection of various data points. They are created for each of the Recovery Segments that are in "observation" mode. These observations are used for numerous runtime and administrative purposes in the BR environment. As examples the observations are used:

To perform statistical analysis from the BR UI to form characterizations of customers' normal execution environments, represented in BR as Pattern System Environments (PSE).

To classify operations on resources into these PSEs for purposes of determining operation execution duration.

Help determine approximate path length of operations that are pushed down from BR to the resources, and possibly to the underlying instrumentation of each resource.

Help determine approximate path length of activities executed within BPEL workflows.

Finally, the data collected via the observation is also used to update the metadata associated with the resource (i.e., in the BRMD table) where appropriate.

BR gathers observations during runtime when "observation mode" is enabled at the Recovery Segment level. There are two means for enabling observation mode, as examples:

1. The BR UI allows the administrator to enable observation mode at a Recovery Segment, which will change its "ObservationMode" resource property to "True", and to set the polling interval (default=15 minutes). The Recovery Segment is defined in order to allow observation mode, but a policy does not have to be defined or activated for it.

2. Once a policy is defined though and subsequently activated, observation mode is set for the Recovery Segment (due to the data being used in managing and monitoring the customer's environment). Thus, it is set automatically at policy activation, if not already set explicitly by the administrator (see 1 above) using the default polling interval (15 minutes).

The administrator may also disable observation mode for a Recovery Segment, which stops it from polling for data and creating subsequent observation records for insertion in the log. However, the accumulated observation log is not deleted. In one example, an RS remains in observation mode throughout its lifecycle. The UI displays the implications of disabling observation mode.

In BR, the observations that are collected by BR during runtime can be grouped into two categories, as examples:

1. Periodic poll.

2. Workflow (includes workflow begin/end, and workflow activity begin/end).

A periodic poll observation is a point-in-time snapshot of the constituent resources in a Recovery Segment. Observation data points are collected for those resources in the Recovery Segment(s) which have associated BR management data for any of the following reasons, as examples:

1. Resource has RTO properties.

2. Resource has operations.

3. Resource participates in the aggregated state for the Recovery Segment, in which it is contained.
4. Resource participates in any of the six types of pairing rules.

The full value of these observations is derived for an RS when they include data that has been gathered for its constituent resources, plus the resources that those are dependent upon. In one embodiment, the administrator is not forced to include all dependent resources when defining a Recovery Segment, and even if that were the case, there is nothing that prevents them from deleting various dependent resources. When defining a Recovery Segment, the BR UI provides an option that allows the customer to display the dependency graph for those resources already in the Recovery Segment. This displays the topology from the seed node(s) in the Recovery Segment down to and including the dependent leaf nodes. The purpose of this capability is to give the customer the opportunity to display the dependent nodes and recommend that they be included in the Recovery Segment.

Preparatory and recovery workflows are built by the BR manager to achieve the customer requested RTO policy based on resource operations timings. During active policy monitoring by the BR manager, measurements of achieved time for operations are recorded in observations to the log and used to maintain the running statistical data on operation execution times. Observations written to the log may vary in the contained resource RTO metrics and operation execution timings.

Observations are also collected from any of the BPEL workflows created by BR in the customer's environment. There is a standard template that each BR BPEL workflow uses. As part of that template, observation data is captured at the start of, during, and at the completion of each workflow. Specifically, in one example, one observation is created at the end of the workflow with data accumulated from completion of each activity. This information is used to gather timings for workflow execution for use in creating subsequent workflows at time of failure.

In accordance with an aspect of the present invention, management of an IT environment is facilitated by programmatically validating one or more service level policies established for the environment to predict whether the one or more policies are achievable within the environment. Service level policies are policies in which a customer specifies a desired level of service. As examples, service level policies include quantitative goals, redundancy levels, resource use, etc. In the embodiment described herein, the service level policy being validated includes a quantitative goal; however, other service level policies can be validated in a similar manner.

To programmatically validate a quantitative goal, system characteristics, values of resource attributes and the current system environment are assessed; the goal to be achieved is examined; and the ability of the resources to recover in a period of time together as one business application is compared with a target goal. From there, an assessment is made as to whether the goal can be achieved. If not achievable, the resources that cannot meet their individual target goals are identified. This is all performed dynamically at runtime without manual intervention, in this embodiment.

Managing today's IT environment is frequently performed through sets of labor intensive configurations of the infrastructure supporting multiple business applications, with no ability to predict whether the underlying infrastructure can support the business goals. In one example, the quantified goal for recovering a business application can vary depending on the application's criticality, or on the timeframe in which it encounters an error; however, using today's technology, the achievability of such a quantified recovery goal is not able to be determined in advance of an actual failure. As a result, business commitments for management of the IT environment are not able to be validated, and are often missed. Today, there is neither a technique to assess the achievability of a quantified IT management goal or other service level policy, nor a representation for expressing its achievability.

Once a goal is activated for management, a set of actions may result in case of certain conditions. As an example, in managing the availability of an environment, a set of recovery actions may be initiated when failures are detected and assessed. These actions may vary depending on the goal to be achieved. IT staff today do not have the ability to inspect the potential recovery actions prior to an actual failure. This lack of predictability can lead to problems when the actual situation occurs, and recovery actions cause unexpected results.

Since the business application, its scope and management goals, as well as the supporting IT environment can change often, there is a need to ensure that any goal can be re-assessed against the changing environment.

The BR System, of which one or more aspects of the invention are included, defines techniques that can be implemented as computer programs or logic for establishing and validating service level policies. In one implementation, techniques are provided for establishing a quantitative goal with a business application; determining whether the goal is achievable using historical observations of past system performance, prior to any active management; representing achievability of the goal in a programmatic way, where the relative contribution to the goal for each resource associated with the business application is shown, in a predictive manner; determining the set of result actions that are likely to occur while the system is managing to achieve the IT goal, in a predictive manner; and performing revalidation of the goal as the environment changes or as the customer initiates change.

In one example implementation chosen by the BR System, the goal relates to managing the availability of business applications and the supporting IT infrastructure components. The specific goal used in the example is Recovery Time Objective (RTO), measured in units of time. Although RTO is referenced as the example goal, the set of functions described can also be applied to other quantified IT management goals, as well as other service level policies.

Policy Life Cycle

Goals of an IT environment are encoded in one or more policies. In the BR system, policies are established that are used in managing various aspects of the environment. Each policy has a lifecycle. As an example, the policy lifecycle encoded by the BR System includes the following stages:

Define—Policy is specified to a business application, but no action is taken by the BR System to support the policy (observation information may be obtained).

Validate—A defined policy is validated for syntax and the ability to achieve the goal.

Prepare—Execute the preparatory action workflows to condition the IT environment to achieve the desired goal.

Activate—Policy is activated for runtime monitoring of the environment.

Modify—An already activated policy is changed dynamically in runtime.

Specifically, a goal is defined to a Recovery Segment (RS), using, for instance, the User Interface component. The goal is encoded into a policy, and associated with the RS. The policy includes the quantified goal, in this case, the RTO. In one implementation, the goal specification can also include a programmatic representation of an IT environment, such as one or more Pattern System Environments (PSEs), in which a customer would like the goal to apply. The goal defining procedure processes the information from the User Interface component, and the RS component then stores it into a new policy data structure associated with the RS representation of the business application.

As one example, definition processing, which is part of the RS component, parses the policy and stores it in a new policy structure associated with the RS. No impact is seen to the runtime environment from defining a policy. If this is the first policy to be defined for the RS, the observations for each resource associated with the RS are classified into best fit PSEs.

Define Policy

One embodiment of the logic to define a policy is described with reference to FIG. 9. As one example, this logic is performed by the RS component of the BR System.

Figure 9:
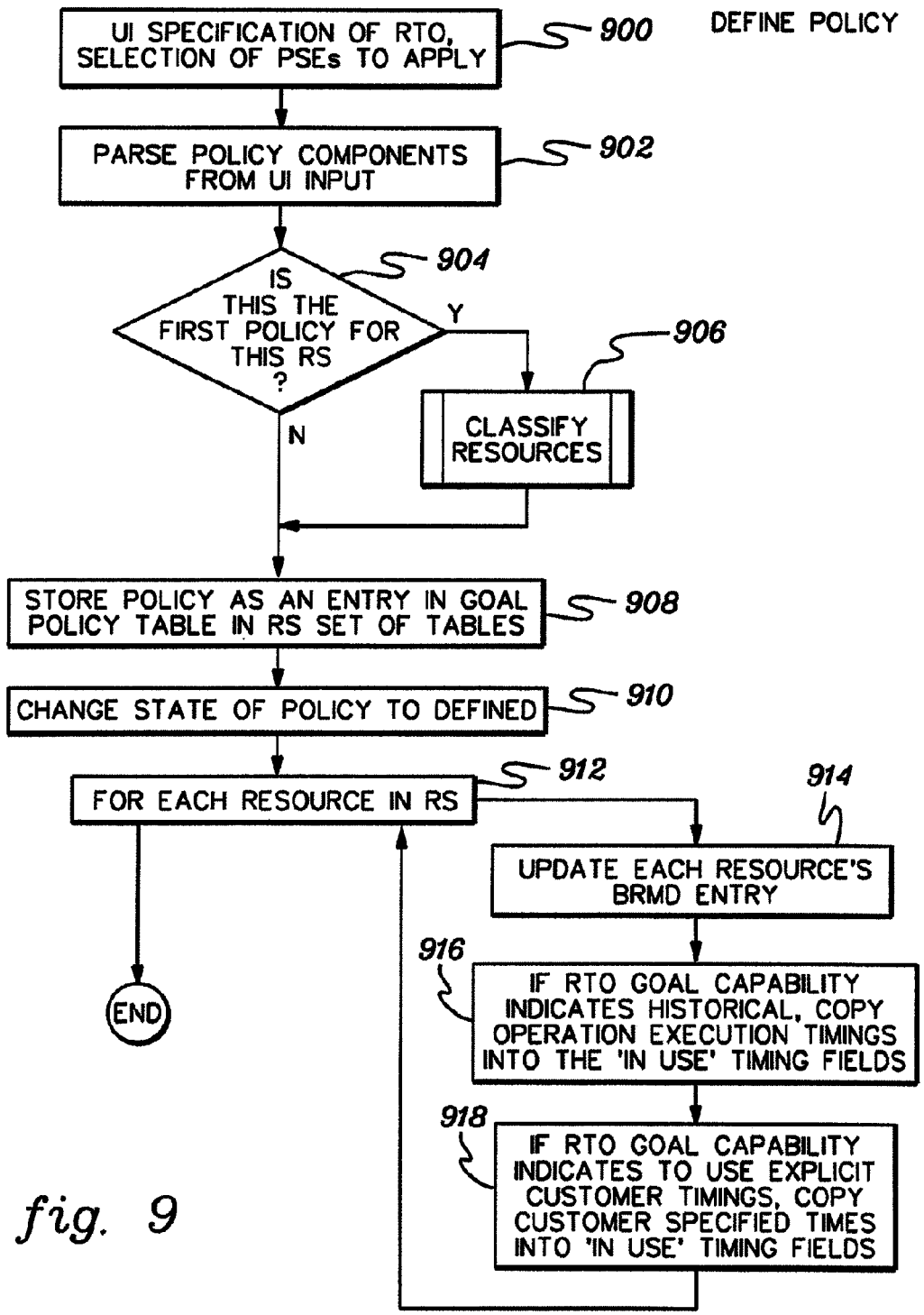
FIG. 9 depicts one embodiment of the logic to define a policy, in accordance with an aspect of the present invention.

Referring to FIG. 9, this logic is used to define a policy for a business application, represented in this implementation by a RS. Initially, the User Interface component accepts the specification of the goal policy (e.g., the specified RTO), STEP 900. In this implementation, a PSE is also specified, though that may be optional or omitted in other implementations. Next, the policy components are parsed from the UI input, STEP 902. For example, if this is the first policy defined for this RS, INQUIRY 904, logic is initiated to classify the resource to the best fit PSE, as well as to calculate the average, min/max and standard deviations of all operation execution timings, STEP 906, as described below. In other implementations, the logic to reconcile resource statistics when a policy is first defined may be performed differently. For example, a periodic task may run to routinely update the statistical information for a set of resources, and thus, this logic may not need to be explicitly invoked during policy definition.

After the classification or if this is not the first policy, the policy is stored as an entry in a Goal Policy table, which in this implementation is one of the tables used to persist the RS information, STEP 908. The policy state is then changed to Defined, STEP 910. Thereafter, each resource in the RS is processed, STEP 912. The output of the classification is used to update the BRMD entry for the resource with the average operation execution time, min/max execution times, and standard deviation of execution time, STEP 914. Next, if the flag is set in the RTOGoalCapabilities to use historical information, then the operation execution timing information is copied into the in use fields for timing, STEP 916. In one implementation, the in use fields for timing are stored in the operation table associated with the BRMD entry, with a field name of operation_execution_time, one per operation. If the flag is set in the RTOGoalCapabilities to use explicit customer input for timing information, then the customer specified timings (found, e.g., in the BRMD entry in field customer_input_timing) are copied into the operation_execution_time fields in the operation table associated with the BRMD entry for the resource, STEP 918. After all resources are processed via the loop (e.g., STEPs 912-918), processing for defining a policy concludes.

Classify Resources

One embodiment of the logic to classify resources on initial policy definition is described with reference to FIG. 10. As one example, the RS performs this logic.

Figure 10:
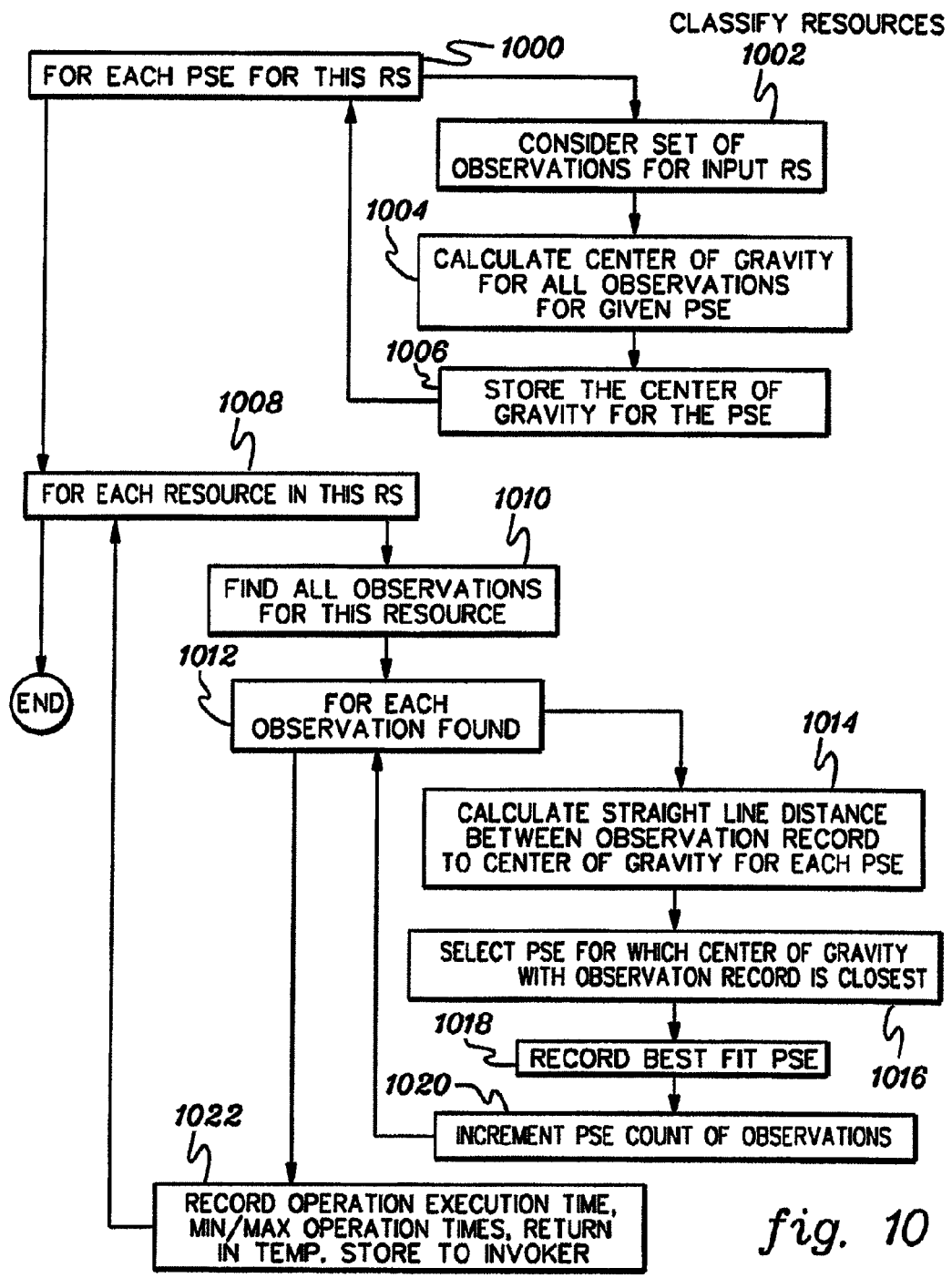
FIG. 10 depicts one embodiment of the logic to classify resources, in accordance with an aspect of the present invention.

Referring to FIG. 10, for each PSE defined to the RS being processed, STEP 1000, the set of observations for the input RS is considered, with each observation being a point in N-dimensional space, where N is number of key factors used in determining RTO, STEP 1002. Next, the center of gravity for the observations for the given PSE is calculated, STEP 1004, using standard techniques. That is, treating a set of RTO metrics to be a N-dimensional space, a center of gravity is calculated for the PSE. As an example, the average and standard deviation for the operation execution data and non-operational RTO metrics of the observations in the PSE are calculated to determine the center of gravity for the PSE. That is, for the N-dimensional space to the average of each key RTO metric forming the N-dimensional space is minimized. The center of gravity for each PSE is then stored in temporary store, STEP 1006.

After the PSEs for the RS are processed, each resource in the RS is evaluated for timing information. The loop to process the resources starts at STEP 1008, and initially, the observations for a resource are selected, in one example, from the observation log, STEP 1010. Next, for each observation found, STEP 1012, the straight line distance between the observation record to the center of gravity for each PSE for the RS is calculated, STEP 1014. The PSE with the closest center of gravity to the observation record is the 'best fit PSE', STEP 1016. The best fit PSE is recorded, STEP 1018, and the count of observations recorded for this PSE is incremented, STEP 1020.

After the observation records for the resource have been processed, the operation execution time of the operation, for each PSE, as well as the min/max operation times, are recorded, for instance, in an in-memory output array of resource information that is returned to the processing which invoked the classification, STEP 1022.

In the above logic, policy definition processing invoked classify logic, and thus, receives the output array. For each resource found in the output array, the associated BRMD entry is updated with the operation execution time information returned in the output array. Processing continues until all resources for the RS have been classified in this manner.

Validate of Policy

Policy validation has several stages. The purpose of validation is to ascertain whether the IT environment is able to satisfy the goal specified, such as the recovery goal. There are three stages of validation, which are summarized below and described in detail in the logic and descriptions to follow. The example implementation described is based on a RTO goal, and includes specification of PSEs as part of the goal. In other implementations, additional quantitative management goals may be used, and PSEs may or may not be implemented. In this implementation, for each Pattern System Environment selected for the RTO goal, the following processes occur at each stage:

Stage 1: Basic Validation

At a minimum, policy validation includes checking the syntax for allowable values of RTO and specification of PSEs that are defined to the RS.

Verify that there are sufficient numbers of observations available for statistical analysis, based on the threshold settings found in the BR management information for the resource stored in the BRMD.

For each resource, verify specification of either use of historical information or customer specified input of operation execution timings.

For each resource associated with the RS, examine the total number of observations found for it in the Observation Log, and verify that the number exceeds the specified minimum number of observations value and that the confidence interval exceeds the specified confidence interval value in the BRMD entry for the resource.

Timings are calculated for each operation during classification of the observations for the resource, and upon definition of the first policy for a RS (and upon add of resources to a RS).

Stage 2: Related RS Check

In case of nested Recovery Segments, verify that the RTO of the inner Recovery Segment is smaller than that of the outer Recovery Segment.

Goal policy validation uses the RTO projections of nested RSs to determine whether a RS higher up in the composition can meet its RTO goal.

Stage 3: RTO Achievability/Determine Recovery Time Estimation

Build a list of resources which are part of the RS using the DAG for the RS.

Indicate recovery is required for each resource.

For each of the resources from leaf nodes to root nodes, find whether that resource has recovery operations that place it in an available state.

If multiple operations exist, select the smallest operation execution duration.

If no recovery operation for a resource exists that achieves an available state:

Select pairings entries having an effect on the resource being processed;

If multiple operations on other resources yield an available state and are recovery operations, select the operation having the smallest operation execution duration.

Create an ordered list of operations for the resources including dependent operations; take into account resource pairing information that has ordering dependencies to allow for maximum parallelism.

One embodiment of the validate logic is described with reference to FIGS. 11A-11H. In one example, the RS performs this logic.

Figure 11A:
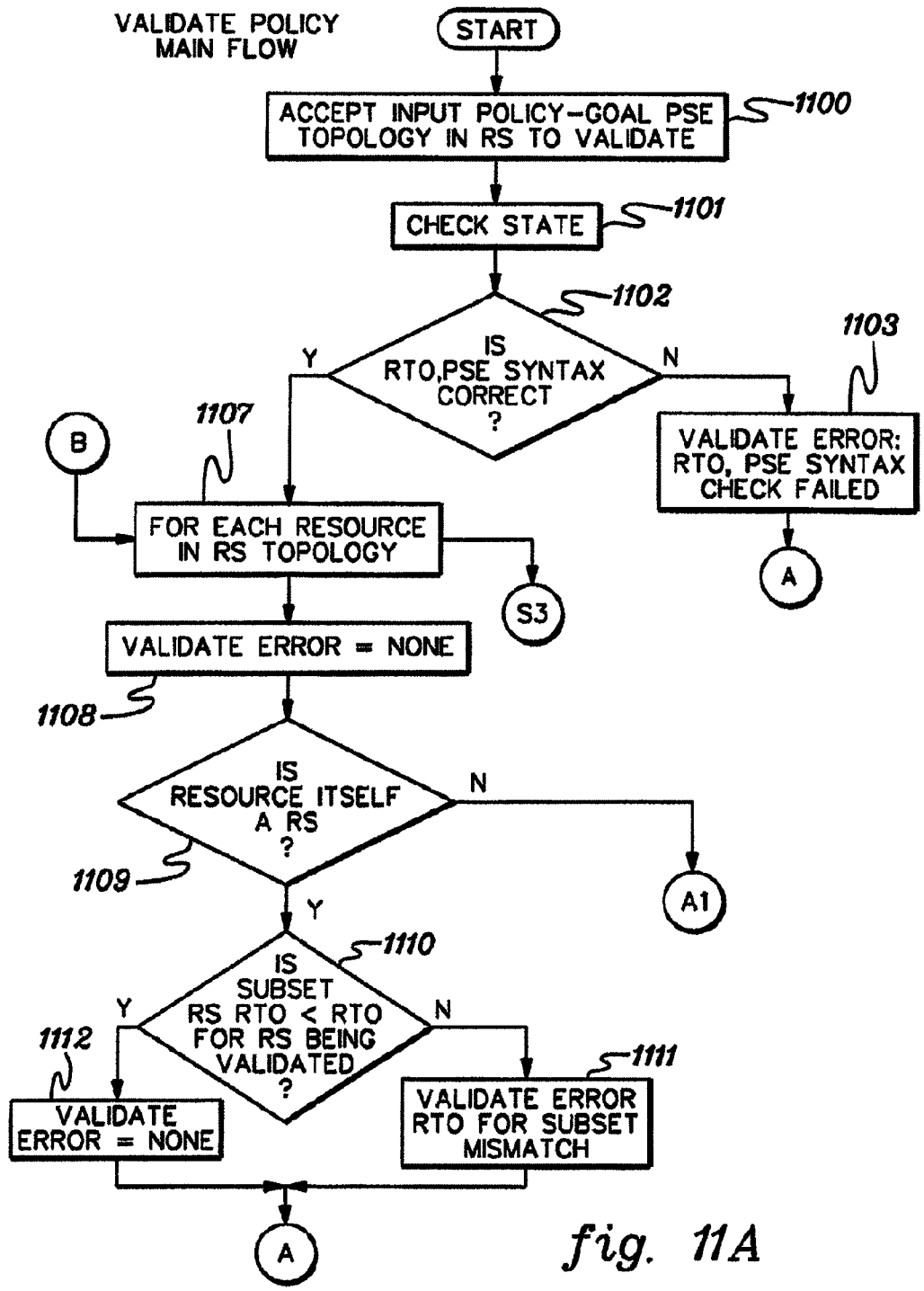

Referring to FIG. 11A, initially, via the User Interface component, a customer chooses to validate a specific goal policy, as there may be multiple defined for a given business application, STEP 1100. In one implementation, the programmatic representation of a business application is a Recovery Segment (RS). Note that at various points in the logic, validation can encounter an error, and processing eventually proceeds to STEP 1105 (FIG. 11C) for a message to the user interface. The customer may then choose to respecify the goal or PSE and retry the validation.

Returning to STEP 1100 (FIG. 11A), after accepting the input policy to validate, the state of the RS is checked to ensure that if the goal specification is for a subset RS, then the superset is in a deactivated mode, and if the goal is for a superset RS, then both the subset and superset RSs are in a deactivated mode, STEP 1101. Next, the basic syntax of the specification is checked, INQUIRY 1102. In one implementation, the quantitative goal is expressed as a Recovery Time Objective (RTO), and is to be specified in units of time. In addition, the implementation may include specification for a programmatic representation of the IT environment, such as a Pattern System Environment. If the syntax is not correct, there is a validation error, STEP 1103. Thus, an error situation is detected, INQUIRY 1104 (FIG. 11C), and processing terminates with a resulting error message, STEP 1105.

Returning to INQUIRY 1102 (FIG. 11A), if the syntax checks are completed successfully, each resource in the RS is assessed (starting at STEP 1107) to determine whether there is sufficient information about the resource to goal manage it. For each resource, a ValidateError flag is initially set to 'none', STEP 1108. Then, a determination is made whether the resource is itself another RS, indicating a subset, INQUIRY 1109. If so, a check is performed to determine whether the RTO goal of the subset is less than the RTO of the superset, INQUIRY 1110. If not, then a ValidateError is detected, STEP 1111. Otherwise, there is no error, STEP 1112. In either case, processing continues to INQUIRY 1104 (FIG. 11C). At INQUIRY 1104, if there is an error, a message is presented, STEP 1105, and processing ends. Otherwise, processing continues to the next resource in the RS topology, STEP 1106.

Figure 11B:
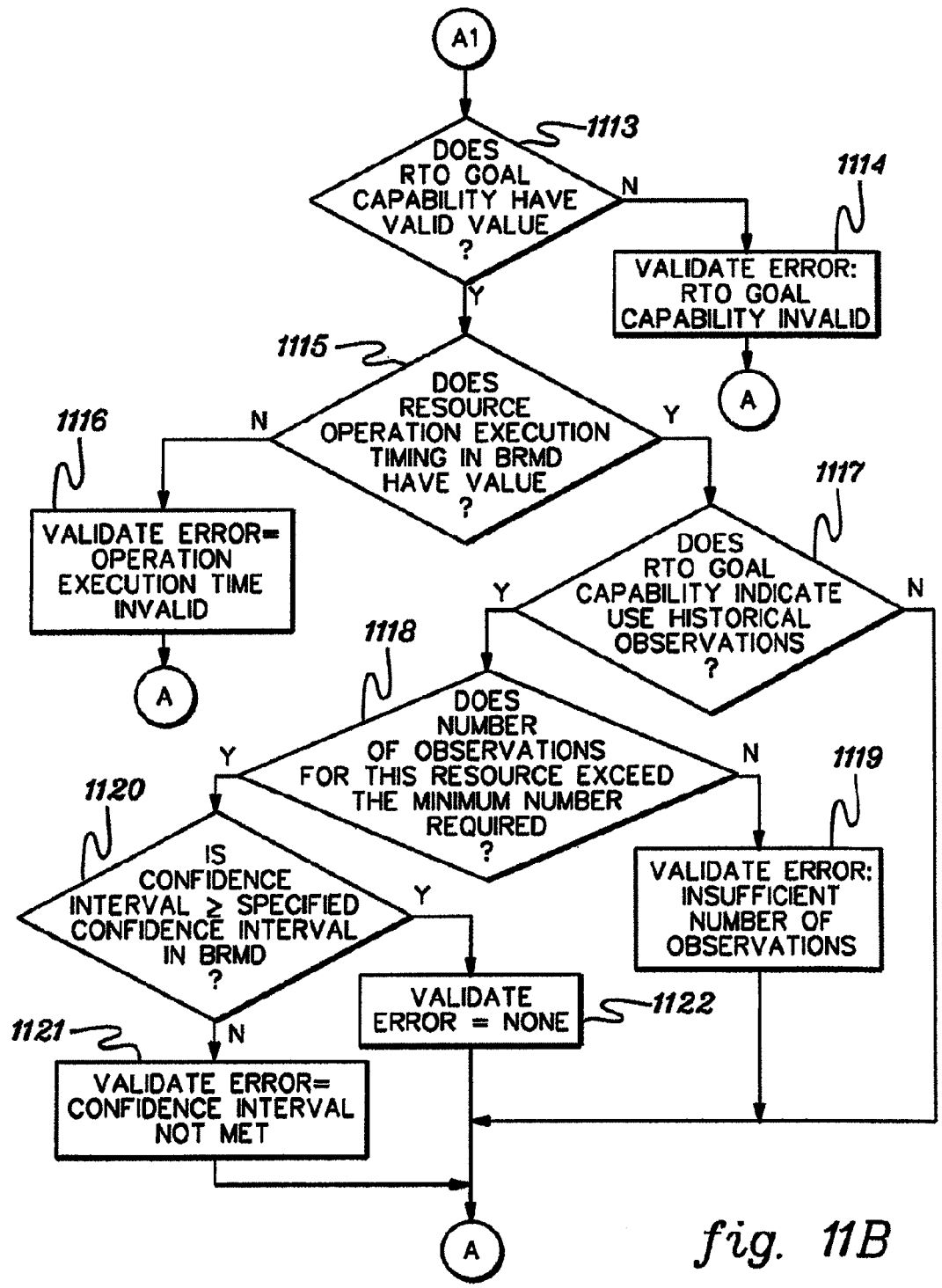
Figure 11C:
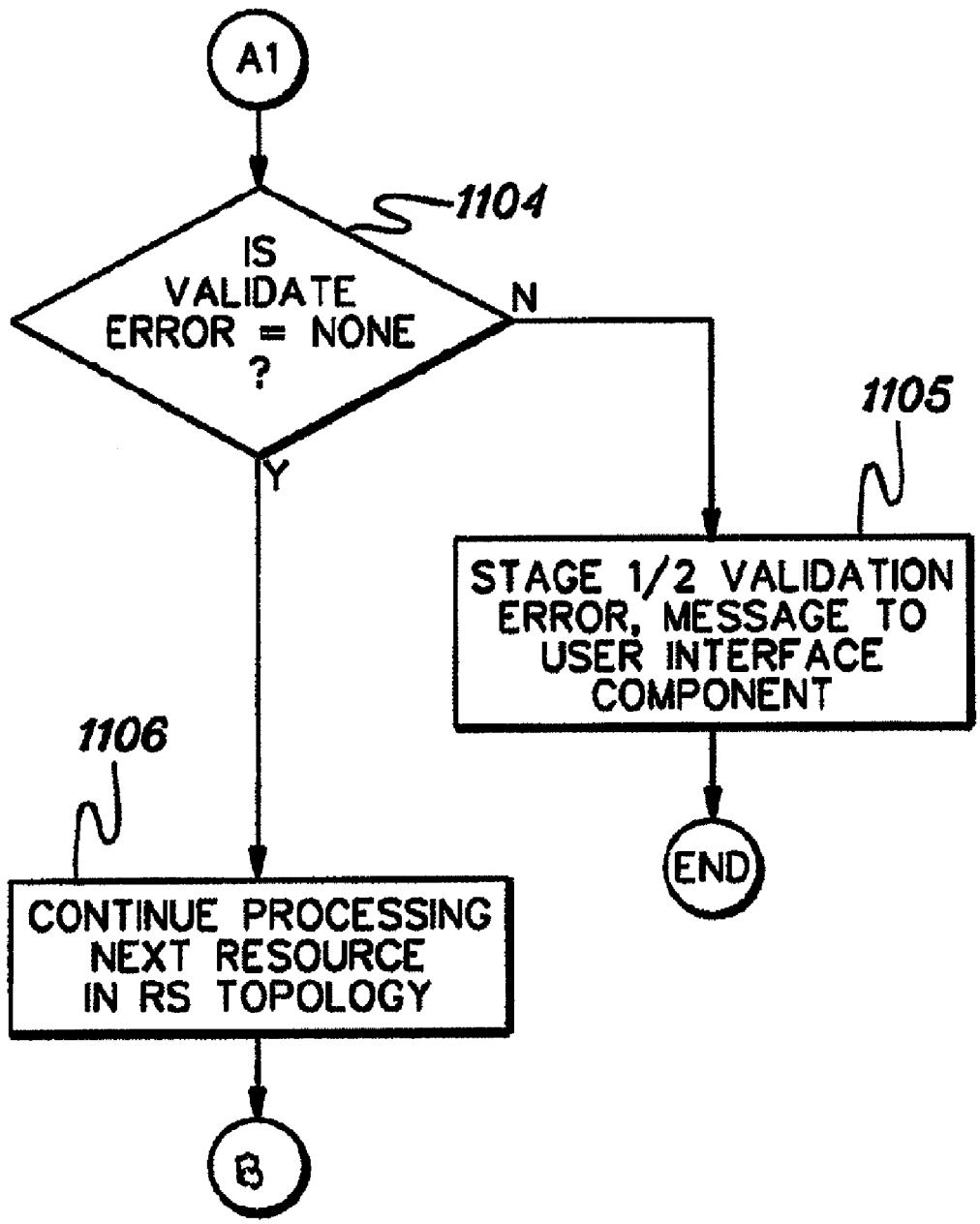

Returning to INQUIRY 1109 (FIG. 11A), if the resource being evaluated is not a RS, then the BRMD entry for the resource is inspected to determine whether the resource indicates that the RTOGoalCapability indicates that processing should use historical observations or direct customer specification of operation execution timings, INQUIRY 1113 (FIG. 11B). If neither of these is true, then there is a ValidateError, STEP 1114, and validate processing terminates, INQUIRY 1104, STEP 1105 (FIG. 11C). If RTOGoalCapability is validly specified, INQUIRY 1113 (FIG. 11B), then the BRMD entry is again inspected to determine whether the operation execution timings have values for the operations of the resource, INQUIRY 1115. If not, then a ValidateError is detected, STEP 1116, and validate processing terminates, INQUIRY 1104, STEP 1105 (FIG. 11C). If there are operation execution timings, INQUIRY 1115 (FIG. 11B), then the BRMD entry is inspected to determine whether the customer has indicated that historical observations are to be used, INQUIRY 1117. If not, then the customer has specified direct operation execution timings, and processing continues to the next resource, INQUIRY 1104, STEP 1106 (FIG. 11C).

Returning to FIG. 11B, if historical observations are to be used, INQUIRY 1117, then the processing determines whether the total number of observations present for this resource meets the specification for the minimum number of observations required, INQUIRY 1118. If not, a ValidateError is detected, STEP 1119, and validate processing terminates, INQUIRY 1104, STEP 1105. If the minimum number of observations has been met, then a check is made to determine whether the confidence interval for the operation execution timings equals or exceeds that specified as a requirement for the resource, INQUIRY 1120. If not, then a ValidateError is detected, STEP 1121, and validate processing terminates, INQUIRY 1104, STEP 1105. If the confidence interval is met, then there is no error, STEP 1122, and processing continues to the next resource, INQUIRY 1104, STEP 1106.

Figure 11D:
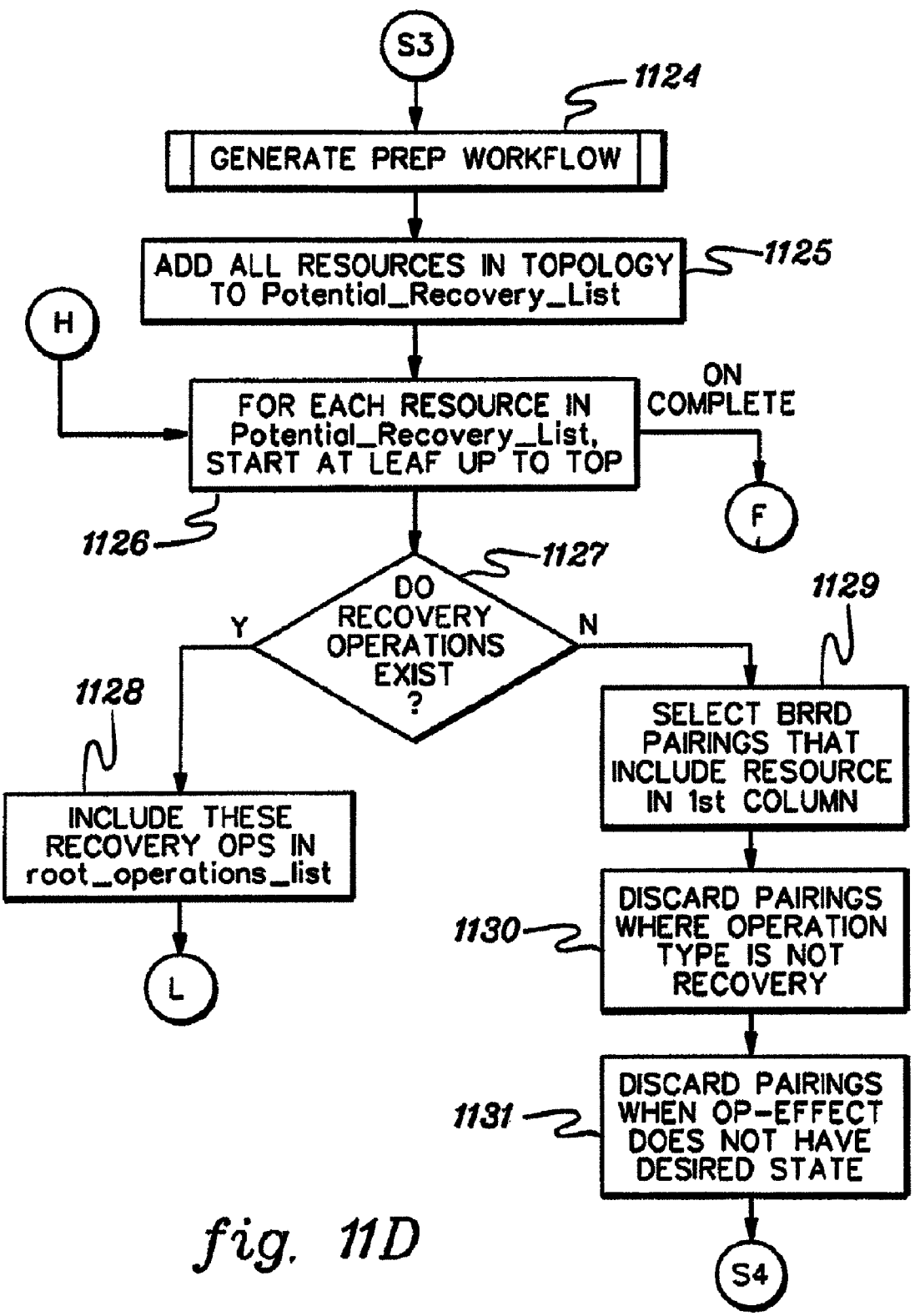
Figure 11E:
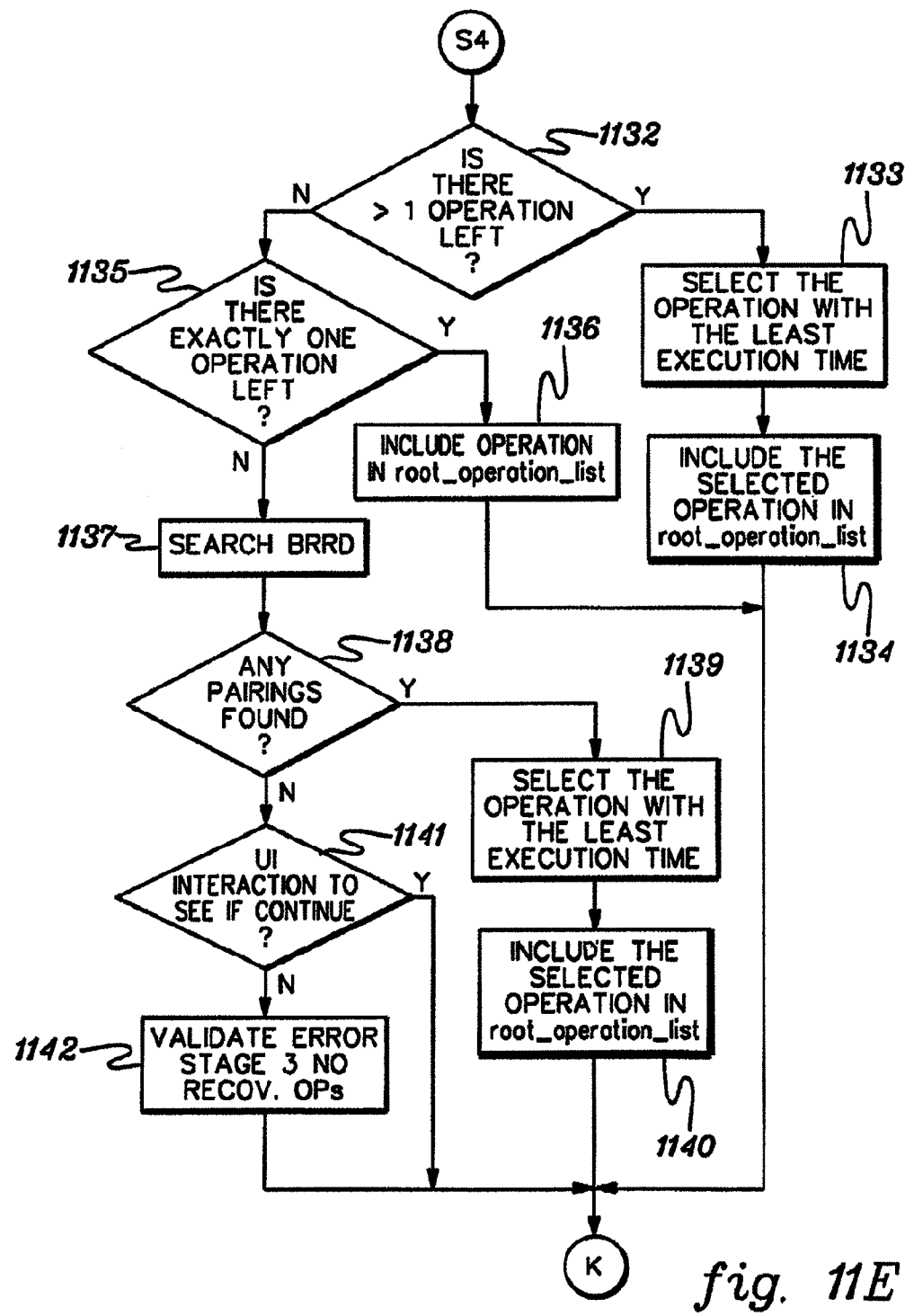
Figure 11H:
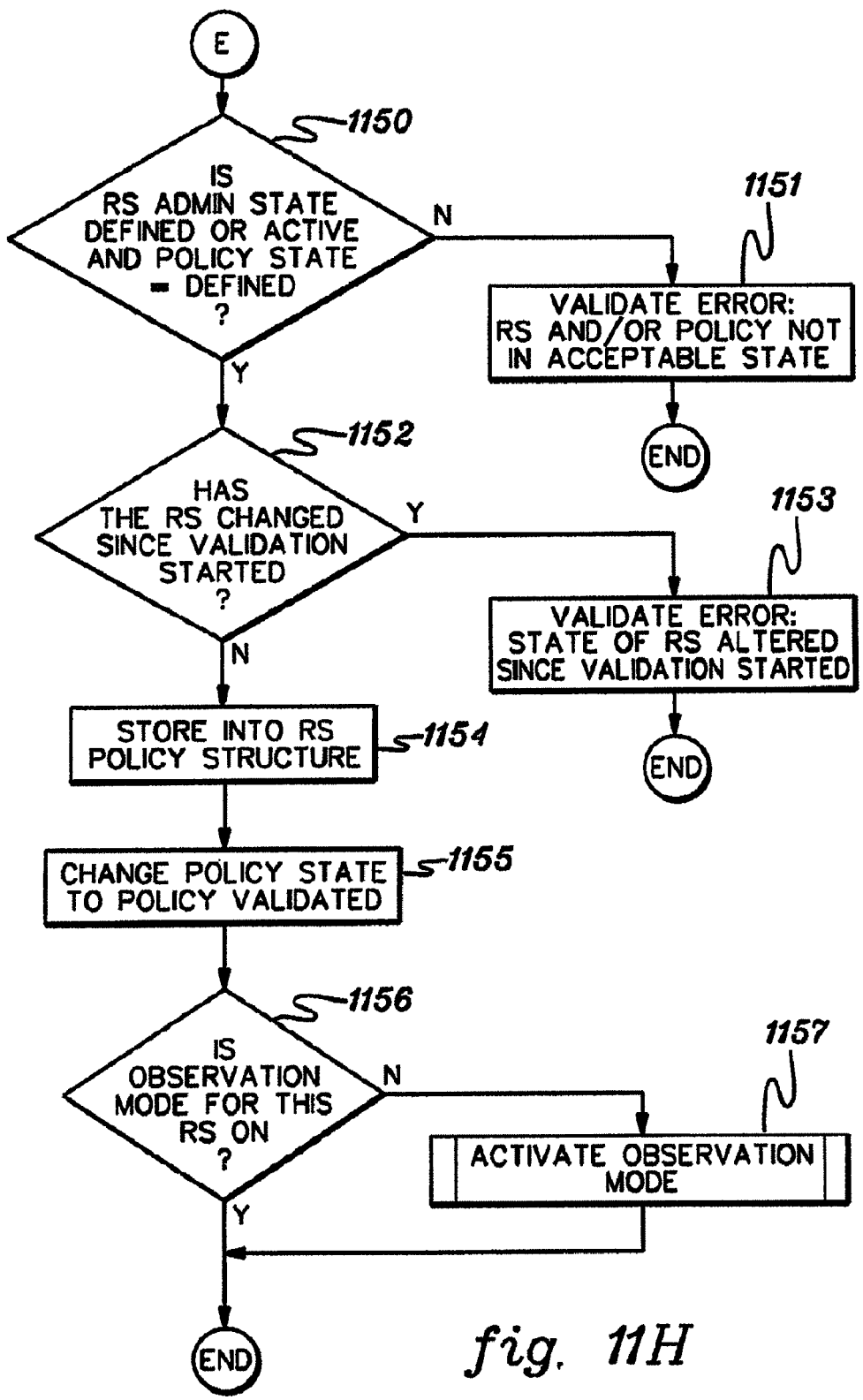

At the conclusion of the processing started at STEP 1107 (FIG. 11A), if there are no terminations due to ValidateError, then processing continues to the next stage of validation, STEP 1124 (FIG. 11D). In one implementation, this stage of validation invokes processing to determine how to programmatically prepare the environment to meet the goal. Alternatively, the customer can prepare the environment based on best practices and previous experience.

In one example, to programmatically prepare the environment, the current state of resources is determined and used in conjunction with preparatory effect pairing constructs to determine if the current state of a resource can meet the recovery goals or if operations to alter the current state of the resource, i.e., preparatory operations, are needed to enable achievement of the recovery goal. Where preparatory operations are to be used, precursor operations and dependencies among the set of operations is determined using pairings. The set of preparatory operations may then be formed into a workflow and provided to the customer for programmatic execution or manual execution. After the IT environment has been altered by a set of preconditioning actions, a subsequent validation of achievability for the goal detects the alterations resulting in a potentially different set or a null set of preconditioning actions.

If preconditioning actions (a.k.a., Preparatory processing) is employed, some of the preparatory operations may fail to execute correctly. Should a failure of a preparatory operation occur, the IT environment may need to be returned to the prior state. An undo set of operations may be formed and executed manually through human intervention. Alternatively, a programmatic formation of an undo workflow process is provided to be conditionally executed should a preparatory workflow result in failed operations. Formation of the undo workflow uses pairing constructs to identify undo operations.

When an IT environment has been preconditioned through preparatory actions to assure achievability of a goal, it is monitored, in one example, to insure prepared resources do not become changed such that the goal would fail to be achievable. Monitoring of the prepared environment may be achieved through manual, human intervention or through monitoring associated with individual products and coordinated by the customer.

Subsequently, processing continues with a determination of a projected set of recovery operations, sequences and recovery times based on the resources in the RS. The resources in the topology associated with the RS are initially added to a potential_recovery_list, STEP 1125. Then, recovery operations are determined for each resource in the potential_recovery_list, starting at the leaf node and working up to the top of the topology (loop processing for each resource, starting at STEP 1126).

First, the BRMD entry is inspected to determine whether there are operations of type recovery that exist for the resource, INQUIRY 1127. If so, these are included in the set of root_operations_list, STEP 1128, and processing continues to the next resource, STEP 1145 (FIG. 11F). If there are no operations of type recovery, INQUIRY 1127 (FIG. 11D), then starting at STEP 1129 the processing searches for any operations for the resource where the effect transitions the resource to the desired state. In one implementation, this may be done through searching the pairing constructs in the BRRD. The BRRD pairings that include the resource in column 1 are selected, STEP 1129, then those that are not type recovery are discarded, STEP 1130, and then any pairings that do not transition the resource to the desired state per the operation effect pairing are discarded, STEP 1131. In an alternate implementation, a table of operations and their effect on resources could be scanned to produce the same result.

If there is more than one operation found, INQUIRY 1132 (FIG. 11E), then the one that is the operation with the least operation execution time is selected, STEP 1133, and that resource and operation are added to the root_operation_list, STEP 1134. If there is not more than 1 operation found, then a test is made to determine if there is exactly 1 operation found, STEP 1135, and if so, that operation and resource are included into the root_operation_list, STEP 1136. Otherwise, no operations were found.

If no operations are found, a search is made to determine whether any operation on any other resource transitions this resource to the desired state. In one implementation, this is accomplished by searching the pairing constructs in the BRRD for operation effect pairings where the resource being processed is included and where the desired state matches the desired recovered state of the resource, STEP 1137. If there are matching pairings found, INQUIRY 1138, then the one with the least operation execution time is selected, STEP 1139, and included into the root_operations_list, STEP 1140.

Otherwise, there is a UI interaction to ask the customer whether continuation of validation is desired, since there are no operations that transition this resource to the desired state, INQUIRY 1141. If continuation is not desired, ValidateError is set, STEP 1142. Thereafter, or if continuation is desired, or after including the operation in the root_operations_list, processing continues via STEP 1143 (FIG. 11F) to test for that error. If the error is set, the error is displayed, STEP 1144, and processing is terminated. If the error is not set, processing advances to the next resource in the RS topology, STEP 1145. Processing returns to STEP 1126 (FIG. 11D) to continue the loop.

Once all potential recovery operations for the resources in the RS are added to the root_operations_list, STEP 1126, the root_operations_list includes a set of operations on associated resources, in no particular order or optimized sequence. In the subsequent sections, processing to build an ordered dependency set of operations (initiated from STEP 1146 (FIG. 11G)) and to construct a programmatic representation of a Gantt chart (initiated from STEP 1147) are detailed. To conclude the mainline processing for validate, once the two sets of processing initiated by STEPs 1146 and 1147 are completed, the customer is asked via the User Interface component whether the Gantt representation is accepted, INQUIRY 1148. If not, then the recommendation is to re-examine the goal policy specification, consider re-specification, and to terminate the validate processing for this particular goal policy, STEP 1149.

If the Gantt representation is accepted, then processing continues to STEP 1150 (FIG. 11H) where a determination is made if the RS administrative state is either Defined or Active, and whether the policy state is Defined. If not, then this produces a ValidateError, STEP 1151, and processing terminates. If the states meet the criteria, then the logic determines whether the RS state has changed since the validate processing started, INQUIRY 1152. If it has, then in one implementation, this produces a ValidateError, STEP 1153, and terminates processing. In an alternate implementation, validation could be redriven automatically back to the start of the stage 3 processing at STEP 1124 (FIG. 11D).

If the RS state has not changed since validate started, then the RS policy structure is updated, STEP 1154, with the following components, as examples: the preparatory workflow, the impacted resource list, the ordered list of recovery operations (ordered root_op_list), the ordered list of preparatory operations (ordered_prep_oplist), the ordered list of undo operations for the preparatory operations (undo_op_list), the list of operations to be performed immediately prior to active management for goal attainment (p1op_list), and the state of the RS. Next, the policy state is changed to PolicyValidatedAchievable, STEP 1155. Next, in one implementation, if observation mode to capture operation timings is not active for this RS, INQUIRY 1156, then the logic is invoked to activate observation mode, STEP 1157. This concludes the mainline processing for validation of a goal policy.

Build Ordered Dependency List

With reference to FIGS. 12 and 13A-13E, one embodiment of the logic to take a set of operations on resources and construct an ordered set of operations, including any implied dependent operations that are to be incorporated, is described. As an example, this logic is performed by the RS.

Figure 12:
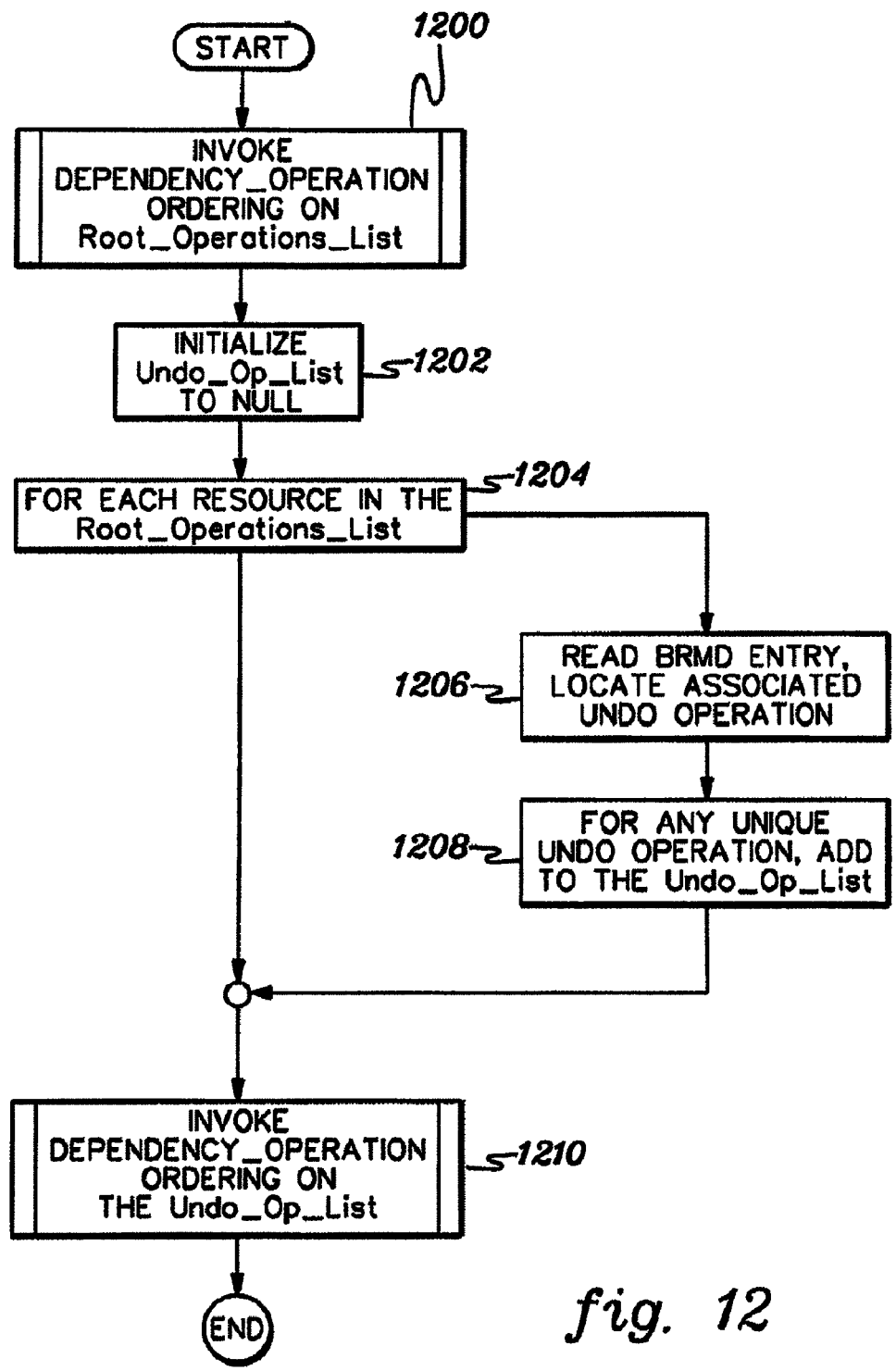
FIG. 12 depicts one embodiment of the logic associated with operation ordering, in accordance with an aspect of the present invention.

FIG. 12 invokes the ordering of operations twice, once for the original set of operations, and again for the set of operations which will undo the original set of operations, in case of failure. In the first step, STEP 1200, the dependency operation ordering logic described in FIGS. 13A-13E is invoked on the input set of operations. This is described further below.

Next, an undo operations list is initialized to null, STEP 1202, and then for each resource in the input operations list, STEP 1204, the BRMD entry for that resource is read to locate the associated undo operation, STEP 1206. Next, any unique undo operation that is not already in the list is added to the undo operations list, STEP 1208. After processing the resources in the input operations list, the dependency operation ordering logic described in FIGS. 13A-13E is invoked on the undo operations list, STEP 1210.

Referring to FIGS. 13A-13E, one embodiment of the dependency operation ordering is described. The input to this logic is a set of operations on resources, some of which may require including other dependent operations. The output is an ordered list of operations, including any dependent operations not originally in the list. In this implementation, the information on dependency of operations is determined using pairing constructs. In other implementations, information on dependencies between operations could be described in a relational table, or other external file. In a further implementation, the priority of operations to consider in chasing the chain of dependent operations can be included in the technique. The processing for dependency operation ordering is, in one example, a three pass process detailed as follows.

Phase 1 finds all operation ordering directives where the operation in the input list being processed has some other operation that is to occur before it. The list_of_ops input list is modified throughout execution of Phase1 to include the complete list of operations, including dependencies. First, the input list_of_ops is accepted, STEP 1300 (FIG. 13A), then the after_op_list is set to NULL, STEP 1302. At the conclusion of Phase1, the after_op_list includes any operation ordering, before constructs found, converted into 'after' type syntax. The output ordered_operations list is also set to NULL, STEP 1304.

For each entry in the input list_of_ops, STEP 1306, BRRD op,order before entries with the resource,op in the resource2 index are returned, and stored in Temp_BRRD, STEP 1308. Next, the resource,op is matched against existing list_of_ops entries, INQUIRY 1310, and if not already there, each PSE that matches the input RS is found, STEP 1312, using, e.g., the RS and PSE database tables. For the given operation being processed, operation execution timings for this operation for each PSE are found, STEP 1314, using the operations tables. In the next step, an additional entry is created in the list_of_ops for the resource,op, STEP 1316, then the entry is updated to include the average of the operation execution timings found, STEP 1318.

Thereafter, or if the resource is already in the list_of_ops, for each entry returned in Temp_BRRD, STEP 1320 (FIG. 13B), the op,order before construct is converted to op,order after, STEP 1322, and the op,order after for the resource,op being processed is stored in the after_op_list part of list_of_ops entry, STEP 1324. By example, to convert op,order before to op,order after if a op,order before pairing existed as—db2_s1.start before cics_r1.start—indicating db2_s1 is to be started before cics_r1d—then converting this to an after pairing would swap resource 1 and resource 2 and change the before condition to an after condition yielding—cics_r1.start after db2_s1.start.

Processing then advances to the next list_of_ops entry, STEP 1326, and cycles back to STEP 1306 (FIG. 13A) to continue. Upon completion of processing the list_of_ops entries, processing continues to Phase2.

Phase2 has three parts. In the first part, operation ordering directives where there is an after relationship and both the first and second operations are in the modified recovery operations list from phase 1 are added to an after_op_list. The logic does this by going through each entry in the revised list_of ops from Phase1. Operation ordering after pairings that are relevant are added to the after_op_list. For each entry in the list_of_ops, STEP 1328, the BRRD op,order after entries with resource,op in resource1 index are found, and stored into Temp_BRRD2, STEP 1330. Next, for each of the returned entries in Temp_BRRD2, STEP 1332, the resource2 resource, op is tested to see if it is in the list_of_ops, INQUIRY 1334. If so, then the op, order after is added to the after_op_list, STEP 1336. Thereafter, or if it is not in the list, processing advances to the next entry in the Temp_BRRD2, STEP 1338, and processing cycles back to complete the entries in Temp_BRRD2, STEP 1332.

When the entries in Temp_BRRD2 are completed, the next entry in the list_of_ops is selected, and processing cycles back to STEP 1328 to continue with the outer loop. Once all list_of_ops entries are processed, the next part of Phase2 begins.

Figure 13A:
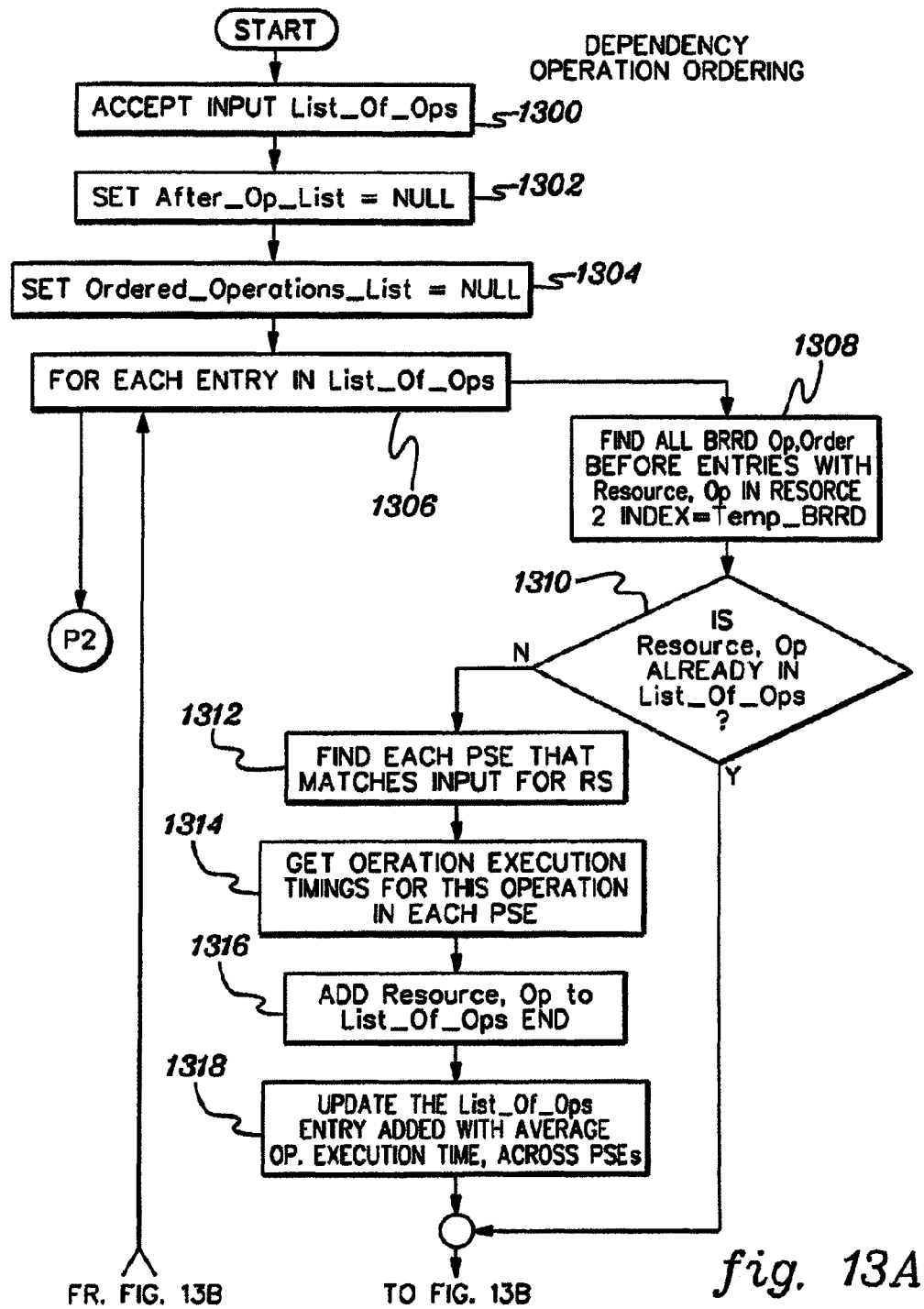
FIGS. 13A-13E depict one embodiment of the logic to create an ordered dependency set of operations, in accordance with an aspect of the present invention.
Figure 13B:
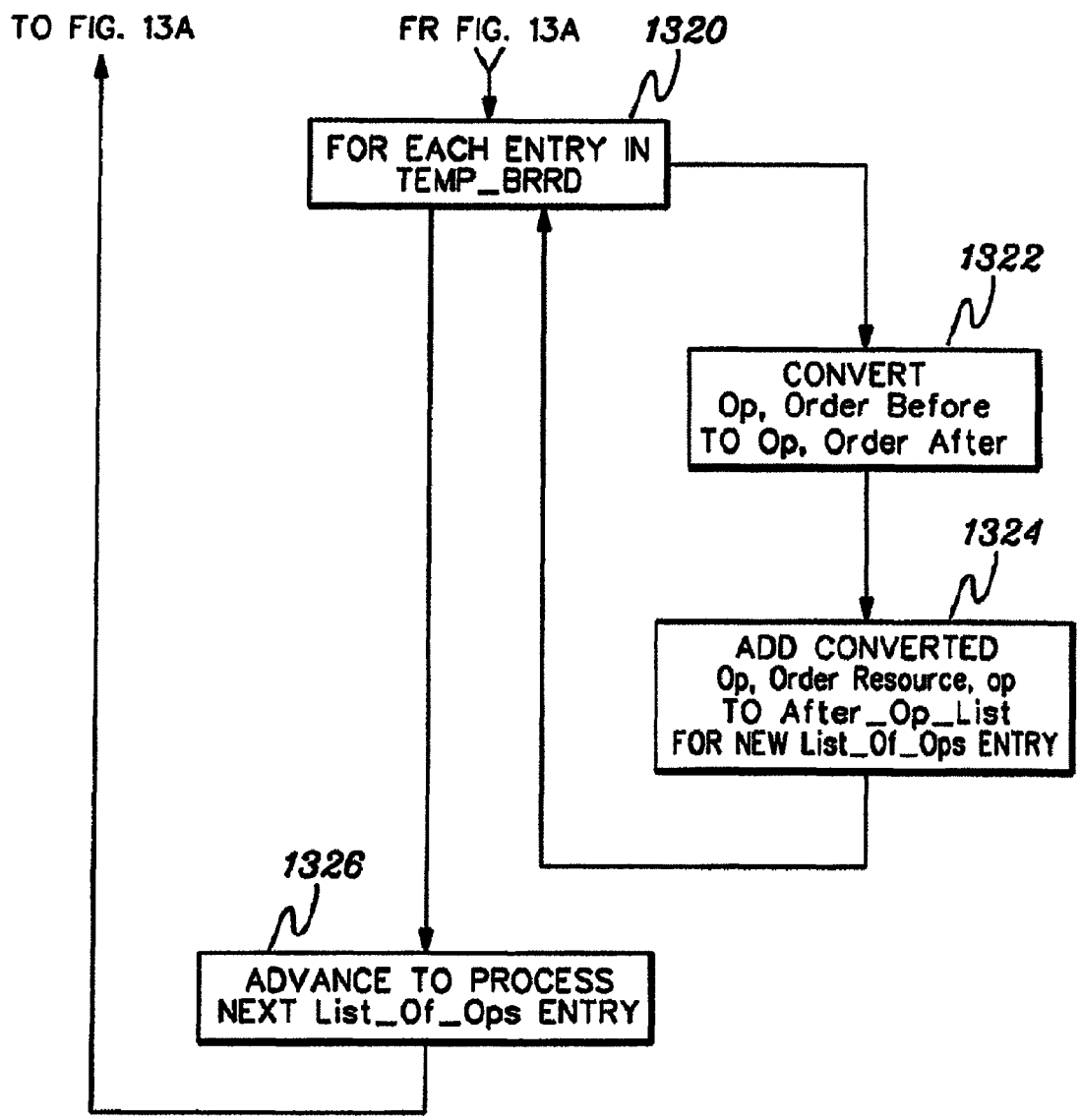
Figure 13C:
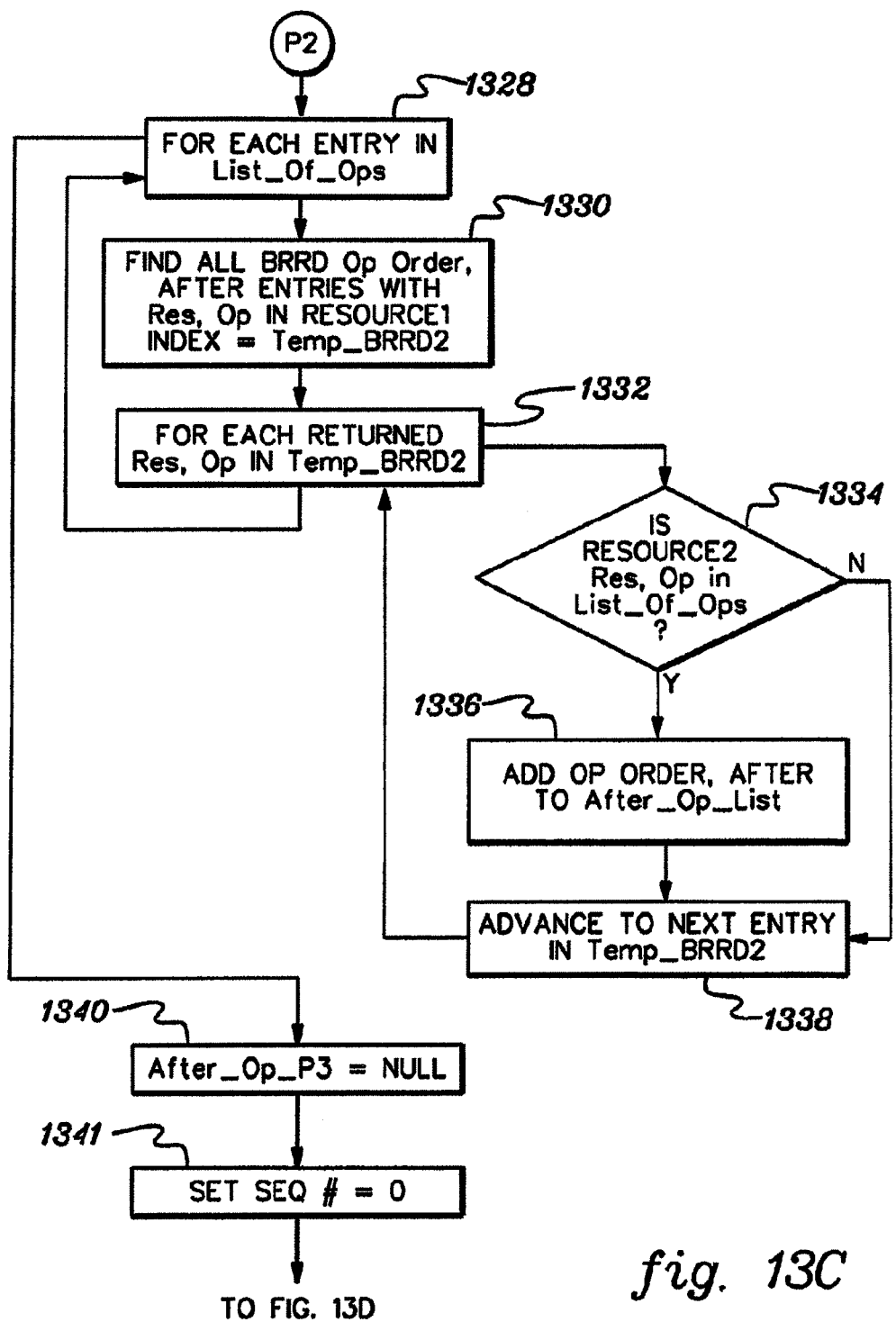
Figure 13D:
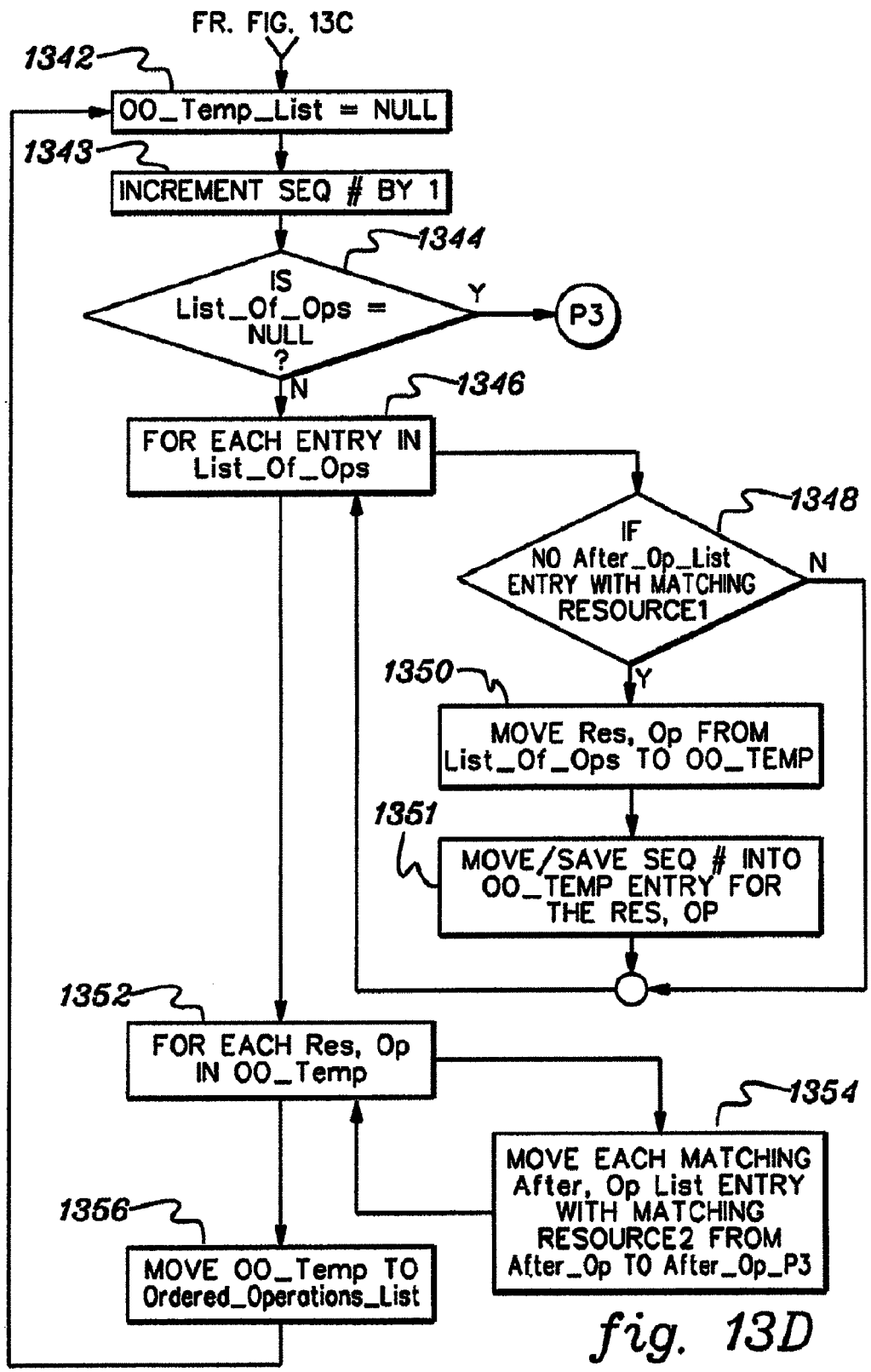
Figure 13E:
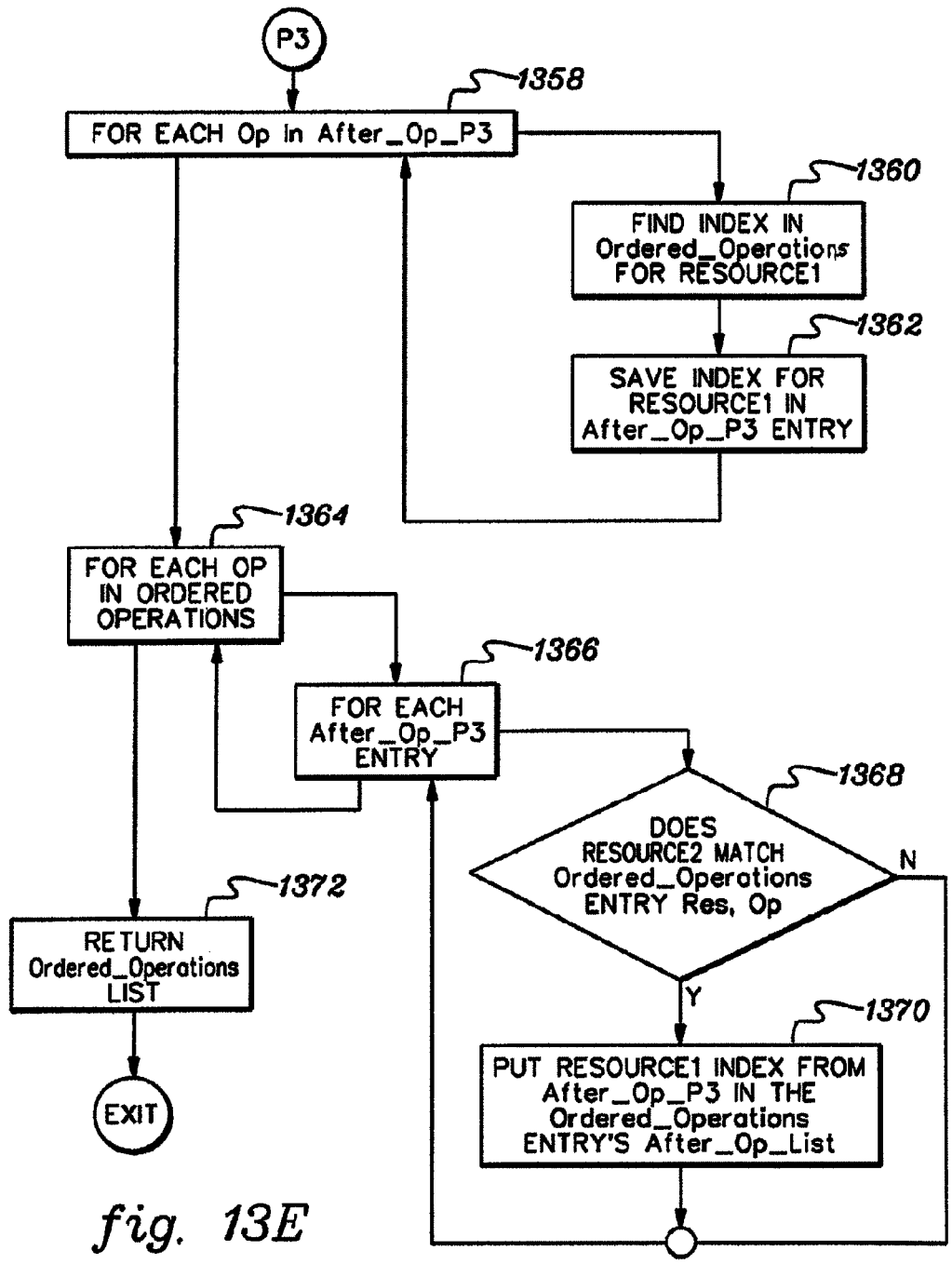

The second part of Phase2 sets after_op_p3 to null, seq# to zero, and a temporary order operation list (oo_temp) to Null, STEPs 1340-1342 (FIG. 13D). Next, the seq# is incremented by 1, STEP 1343, as part of adding each set of Res,Op entries into the Ordered_Operations_List. It then checks if all operations in the input list_of_ops have been ordered, INQUIRY 1344, and if so, processing proceeds to Phase3. If not, then processing continues to STEP 1346, where each resource,op in list_of_ops is used to match any entry in the after_op list with matching resource 1, operation. That is, it looks for any list_of_ops entry for which there is no pairing indicating that the resource,op is to occur after anything else, and those entries found to not be required to be after anything are moved from list_of_ops to the temporary order operation list. For each entry in the list_of_ops, STEP 1346, if there is no after_op list entry with matching resource1, INQUIRY 1348, then the resource,op is moved from list_of_ops to oo_temp, STEP 1350, and the seq# is also saved into the OO_temp entry for the Res,Op being processed, STEP 1351. Notice entries are removed from list_of_ops that can now be performed. After moving the resource,op and saving the seq#, or if there is an after_op list entry with matching resource1, processing continues at STEP 1346 until the entries in the list_of_ops have been processed.

In the third part of Phase2, each entry in the temporary order operations list is processed. For each resource,op in the oo_temp list, STEP 1352, each entry in the after_op list that has the resource,op being processed from the oo_temp list is moved from after_op to after_op_p3, STEP 1354. Processing continues for all resources in oo_temp. Notice after pairings are removed so a new list_of_ops entries can be processed. The moved pairings are saved for Phase3 processing.

An iteration of Phase2 ends by moving the resource and operations from oo_temp to the output ordered_operations list, STEP 1356. The next iteration of Phase2 is started by returning to setting the oo_temp list to NULL, STEP 1342, and searching for the next set of list_of_ops entries now not having to occur after some other op in list_of_ops.

Phase3 has two subsections. In the first subsection, each entry in after_op_p3 is examined to find the index into ordered_operations list matching resource1. This is the resource,operation that is to occur after some other operation in ordered operations list. For each operation in the after_op_p3, STEP 1358 (FIG. 13E), the index in the ordered_operations for resource1 is found, STEP 1360, and that index for resource1,operation is saved in the after_op_p3 entry, STEP 1362.

In the second subsection of Phase3, each entry in the ordered operations list is evaluated, STEP 1364. Each entry in the after_op_p3 list entry is examined, STEP 1366, for a matching resource2,operation to the ordered_operations list entry under evaluation, INQUIRY 1368. For each operation which is to occur after the ordered_operations list entry, the following resource operation index into ordered_operations from the after_op_p3 list is added to the ordered_operations list entry's after list, STEP 1370. Processing cycles back to STEP 1366 until the after_op_p3 list entries are processed.

Finally, the ordered-operations list is returned to the caller of Dependency Order Operations, STEP 1372, and processing exits.

The output of the three pass dependency operation ordering technique is a set of resource,op entries that have as part of the entry: the operation execution time average across the relevant PSEs, an operation sequence number and an after_op list that includes the list of indices for the operations that are to come after the node under consideration, as examples. In the case of validation, the output of this logic is input used to generate a programmatic representation of a Gantt chart for the recovery operations, as described below.

Build Programmatic Representation of a Gantt Chart

The logic to build a programmatic representation of a Gantt chart takes as input a set of data on operations and creates output that includes a matrix of operations and timings along with an overall maximum time for operation execution. Input to the routine includes, for instance, a set of data, ordered_op_list (see 1400 of FIG. 14A), which includes one or more opentry elements 1402, each element including a set of data on an operation. Elements of the set are in required execution order sequence, in this example. Each opentry element 1402 includes, for instance: resource identity 1404, operation 1406, sequence number of operation 1408, operation execution time 1410, and a list of index(s) into the ordered_op_list for operation(s), if any exist, which are to occur after the operation in the element 1416 (e.g., resource, op or operation, seq#, op_exec_time, op_after(n)). The matrix generated by the routine has three columns and one row for each input operation. The first column of each row includes the input data on a resource/operation, the second column is the start time relative to 0 for the operation, and the third column is the end time relative to 0 of the operation. Additionally, a field is returned, maxtime, which is the maximum time for execution of the set of operations.

Figure 15A:
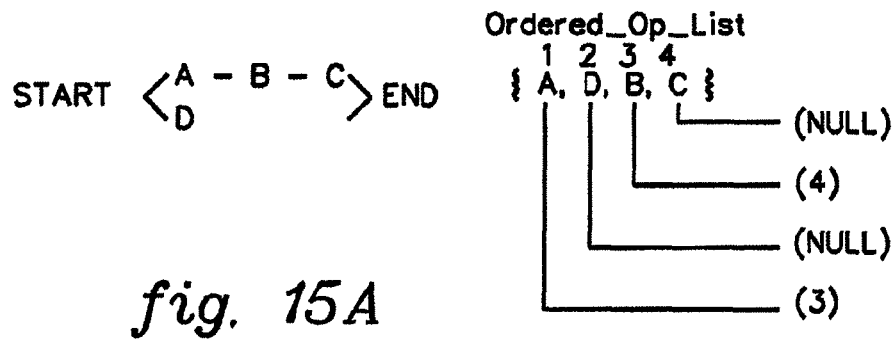
FIGS. 15A, 16A and 17A depict examples of operation ordering, in accordance with an aspect of the present invention.
Figure 16A:
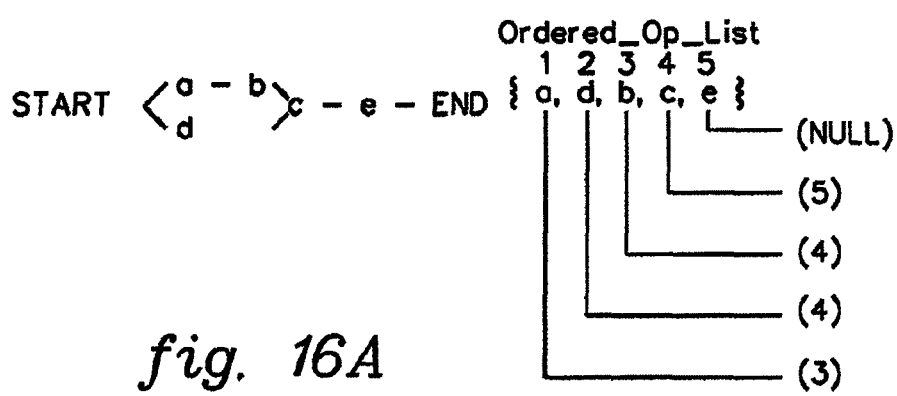
Figure 17A:
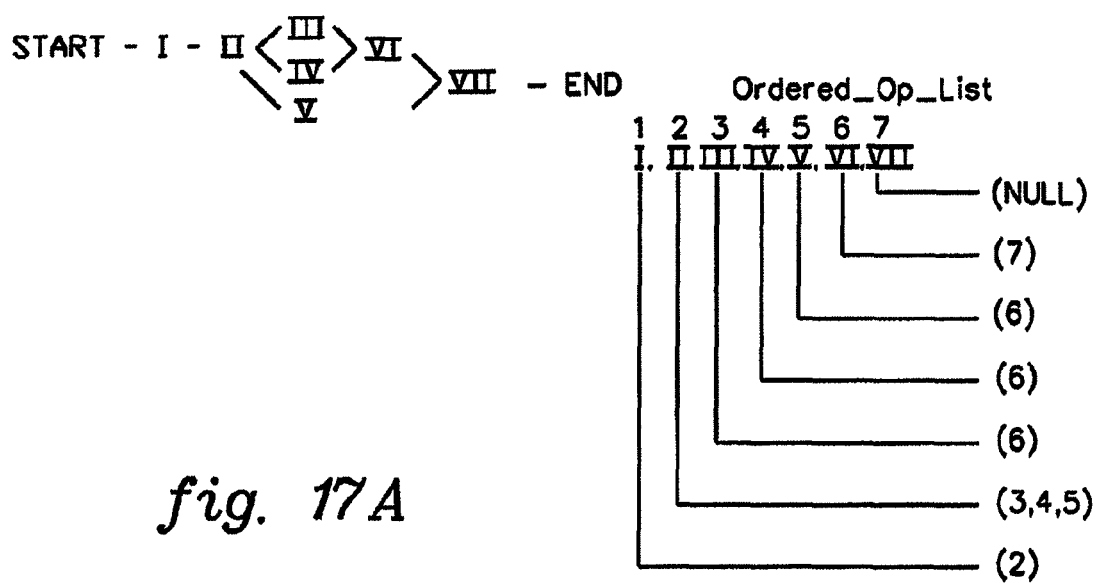

Several examples are utilized in describing the Gantt logic. A first example, depicted in FIG. 15A, has three operations A, B, C which are to occur in order and a fourth operation, D, which may run independently of the A, B, C sequence. In a second example, FIG. 16A, a first sequence of operations, a, b, are to execute before c. Additionally operation d is to execute before operation c. Operation e is to execute after operation c. In a third example, FIG. 17A, operation I is to complete before operation II. The completion of operation II enables operations III, IV and V to begin execution. Operation III and IV are to complete before operation VI. Operation V and operation VI are to complete before the start of operation VII. These examples are intended to demonstrate basic flows for parallel operations, operations which are to occur before and operations which are to occur after other sequences. A given recovery process may have many operations with ordering dependencies or relatively few operations and simple sequences for execution.

Figure 14A:
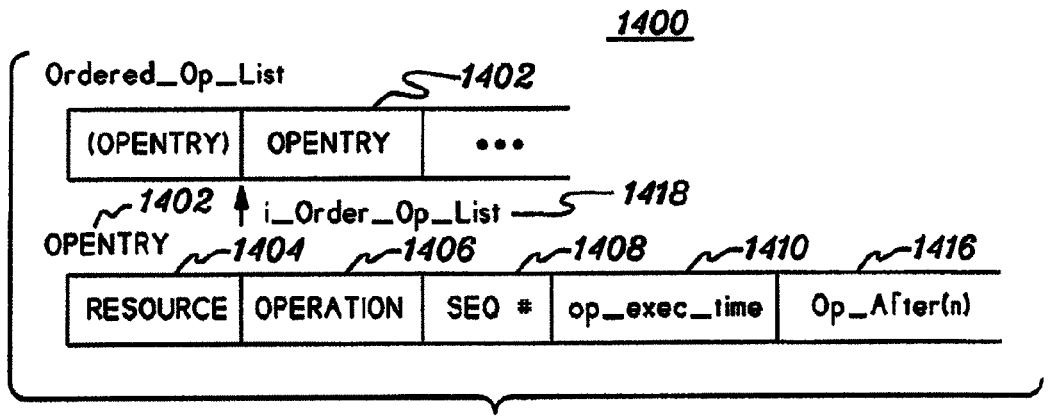
FIG. 14A depicts one example of an ordered_op_list, in accordance with an aspect of the present invention.
Figure 14B:
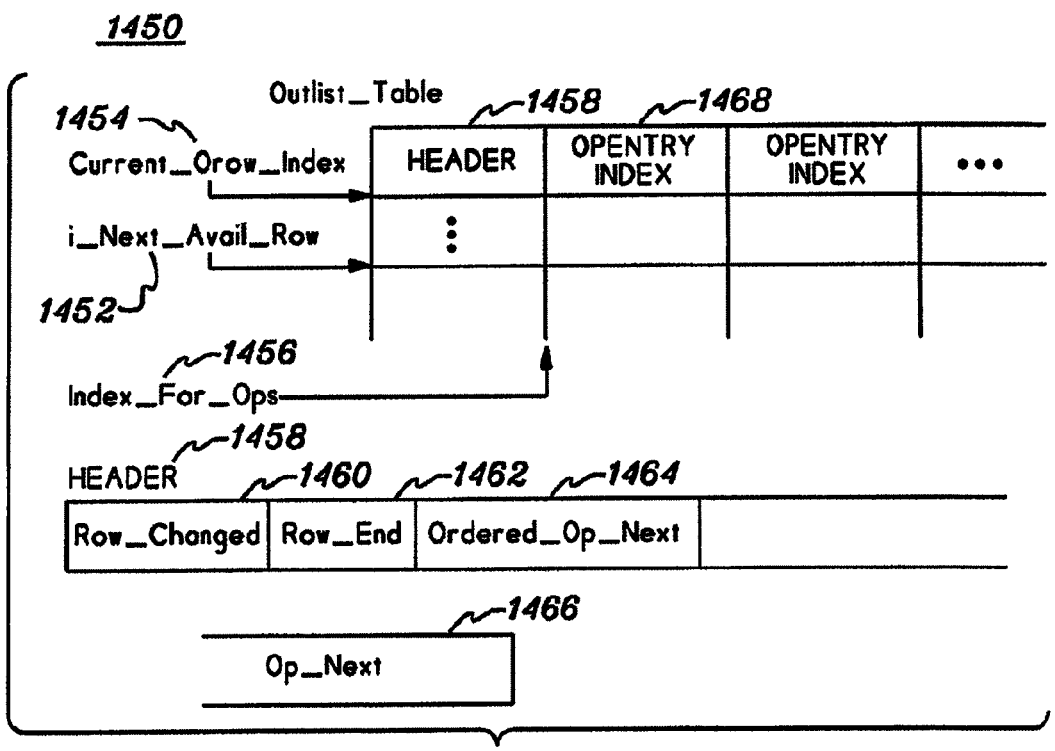
FIG. 14B depicts one embodiment of an outlist_table, in accordance with an aspect of the present invention.

Processing is performed in, for instance, two phases. In the first phase, a table is built containing one row for each unique path through the sequence of operations. The input ordered_op_list is indexed by the variable i_order_op_list 1418 (FIG. 14A). The result of phase one processing is a table, outlist_table, an example of which is depicted in FIG. 14B. An index, i_next_avail_row 1452, indicates the row within outlist_table 1450 where the next unique sequence through the set of operations is to be built. Processing proceeds by locating each input operation with the lowest operations sequence number. Each of these is a root of unique paths through the set of operations. The set of these operations is processed sequentially with unique paths through the set of operations for the first root completing before processing the unique paths through the set of operations for the second root.

Processing for a root begins by assigning the current row in the outlist_table to the index, current_orow_index 1454, and incrementing the i_next_avail_row index 1452. Within the row being processed, an index to the current operation being processed is maintained, index_for_ops 1456. Processing proceeds through the list of operations in the input. A new row is created in outlist_table 1450 when more than one input operation is to occur after the current operation being processed. Two indicators are kept with each row of the outlist_table in, for instance, a header column 1458. Header 1458 includes, for instance, a row_changed indicator 1460 and a row_end indicator 1462. The row_changed indicator is used to cause a copy of the row to be made before a new operation which is to occur later in the sequence is added. Associated with each row are two fields used to save progress in processing the sequence: an ordered_op_next field 1464, which includes an index into the input ordered_op_list for the last operation in the sequence; and an op_next field 1466, which includes an index into the row for the last operation in the sequence. Entries in the row include an index 1468 into the input ordered_op_list for operations comprising the sequence.

When a new row is created, it is initialized with the sequence of operations in the current row that have been accumulated to that point of processing. The second indicator associated with each row, row_end 1462 is used to identify a row which is a complete path through the sequence of operations.

The next row is processed in the same manner as the first row of a root. Processing for a root is determined to have recorded every unique path through the sequence of operations when there were no copied rows made during processing of the current row. When the unique paths through the set of operations for the first root has completed, processing continues with the second and subsequent roots.

The second phase of processing builds the output of the routine, Gantt_table and maxtime. The maximum time for execution of the sequence of operations is set in maxtime. The Gantt_table includes one row for each opentry in the ordered_op_list input. An entry in the Gantt_table includes, for example, the opentry provided as input, a start time relative to 0, and an end time relative to 0 for the operation.

Figure 18A:
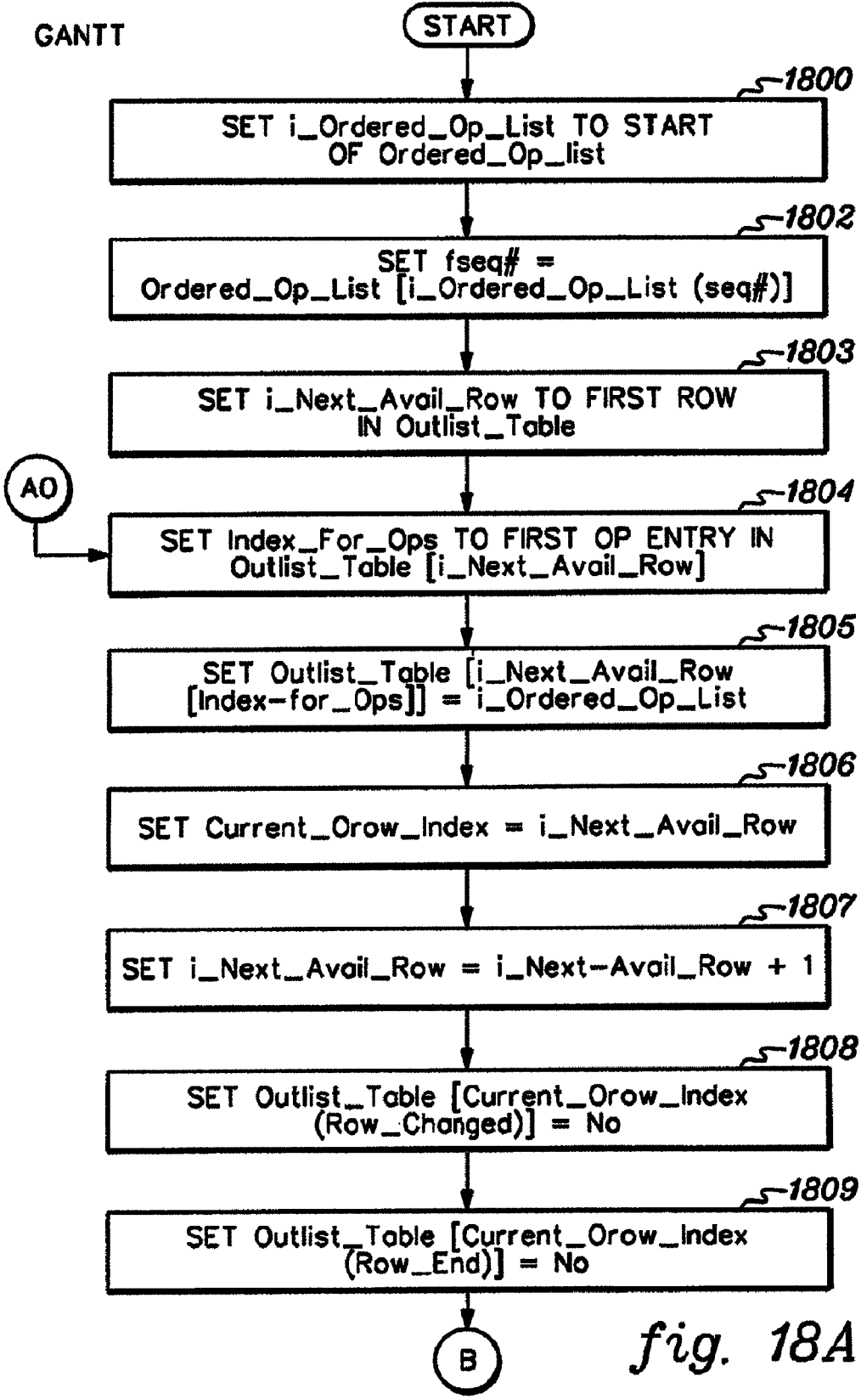
FIGS. 18A-18J depict one embodiment of the logic to create a Gantt chart, in accordance with an aspect of the present invention.
Figure 18B:
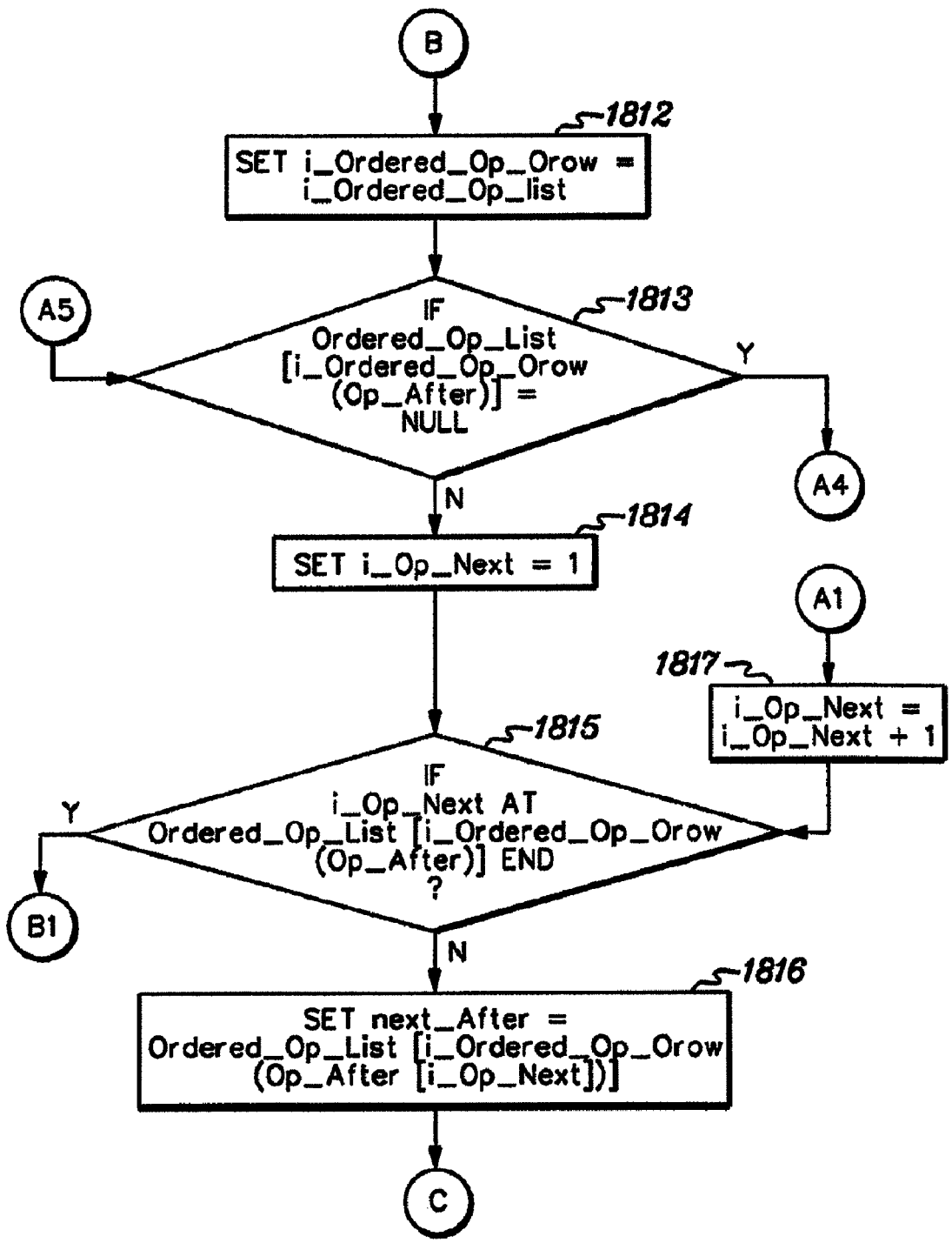

Using the examples provided in FIGS. 15A-17A, initial Gantt processing (e.g., STEPs 1800-1812; FIGS. 18A-18B) would yield results as shown in FIGS. 15B, 16B, 17B. As shown in FIG. 15B, the current_orow_index points to the first row in the outlist_table with the i_next_avail_row pointing to the second row in the outlist_table. The first row in the outlist_table has been populated with: row_changed (row-c)=no and row_end (row-e)=no. Op_next (op-n) and ordered_op_next (ordered) remain null. The first opentry index (e.g., Ai=1) from the input list has been placed as the first operation in the sequence for the first row in the outlist_table. Similar processing is shown in FIGS. 16B and 17B for the other two examples.

Referring to FIG. 18B, the first iteration of STEPs 1813 through 1816 results in processing of the op_after list for A, a and I of FIGS. 15A-17A. The op_after list for opentry A, a and I includes one entry, ordered_op_list index 3 for the example of FIG. 15A (a.k.a., Example 1); ordered_op_list index 3 for the example of FIG. 16A (a.k.a., Example 2); and ordered_op_list index 2 for the example of FIG. 17A (a.k.a., Example 3).

The first iteration of STEPs 1818 through 1822 (FIG. 18C) add the next operation in the sequence for the first row of each of the examples, as shown in FIGS. 15C, 16C and 17C. The first row has changed for each example to indicate: row_changed=yes, row_end=no and op_next=2. For examples 1 and 2, ordered_op_next=3. For example 3, ordered_op_next=2. At completion of the first iteration of STEPs 1813-1822, processing continues at STEPs 1817 and 1815 (FIG. 18B).

In the first example, for operation A, there exists only one operation which is to occur after A, that is B. For the first example, the loop of processing the second execution of STEP 1815 detects the end of the op_after list for A. Processing from STEPs 1830-1833 (FIG. 18E) prepares to continue building the sequence of operations in the first row of outlist_table as reflected in FIG. 1 SD with row_changed=no.

For the first example, in the second iteration of STEPs 1813 through 1822 (FIGS. 18B-18C), operation C is added to the first outlist_table row as shown in FIG. 15E with row_changed=yes, op_next=3, ordered_op_next=4. Processing continues from STEPs 1822-1817, and exhausts the op_after list for B. Processing continues through STEPS 1830 to 1833 (FIG. 18E) preparing to continue building the sequence of operations in the first row of outlist_table. Processing at INQUIRY 1813 determines the op_after list for operation C is null, and continues at STEP 1834 (FIG. 18F) indicating the operation sequence is complete.

Processing at INQUIRY 1835 results in STEPs 1839-1841 (FIG. 18G) executing to find the next root of operations sequences. Locating opentry D with i_ordered_op_list index of 2, control is passed to STEP 1804 (FIG. 18A) with the outlist_table as shown in FIG. 15F. Processing, STEPs 1804-1812 builds the second row in outlist_table with the index of operation D in the first opentry position, row_changed=no and row_end=no as shown in FIG. 15G. INQUIRY 1813 (FIG. 18B) determines there is no operation following operation D directing processing to STEP 1834 (FIG. 18F) which indicates the sequence is complete. Processing at INQUIRY 1835 directs control to STEP 1839 and subsequently INQUIRY 1840 ends the first phase processing for Example 1.

Figure 18C:
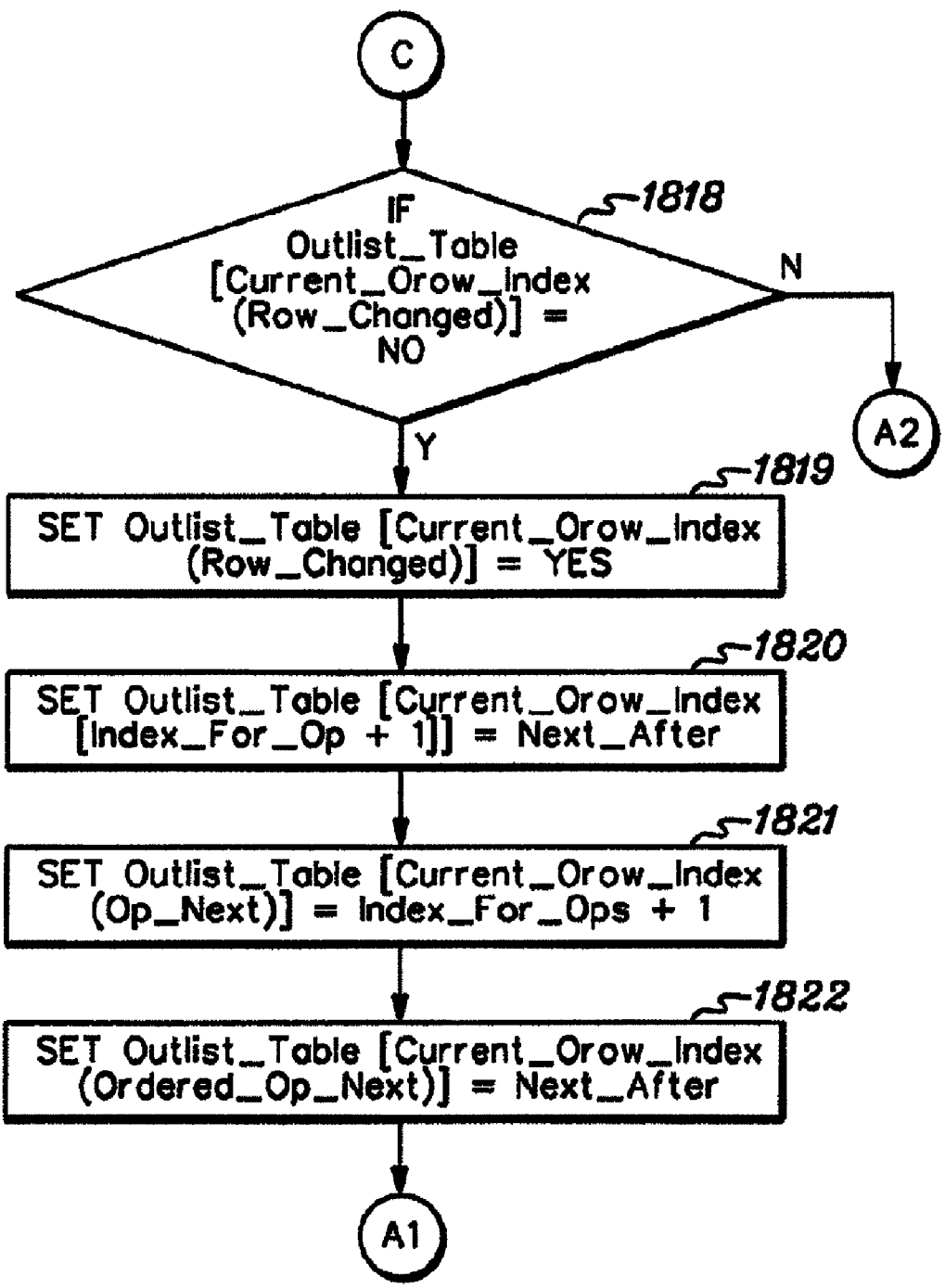

The second example proceeds as the first example up to determining that the first sequence is A, B, C (FIG. 15E) or in the second example, a, b, c. Processing continues from STEPs 1822-1817, then INQUIRY 1815 where the end of the op_after list for C is reached and processing is continued at INQUIRY 1830 (FIG. 18E). Processing STEPs 1831-1833 prepares to continue building the a, b, c sequence by moving the current index_for_ops to entry 3 (set at STEP 1831) in row one of the outlist_table and setting the i_order_op_row index in the input ordered_op_list to 4 (set at STEP 1832) and setting row_changed to no, STEP 1833, as shown in FIG. 16D.

Processing continues through STEPs 1813-1814 (opentry c op_after list not null), and INQUIRY 1815 (not at op_after list end). The next iteration of STEPS 1818-1822 adds opentry e in the fourth element of the first row of outlist_table. Continuing at STEPs 1817-1815 the end of the op_after list for c has been reached directing processing to STEP 1830. Processing STEPs 1831-1833 prepares to continue building the a, b, c, e sequence by moving the current index_for_ops to entry 4 (set at STEP 1831) in row one of the outlist_table and setting the i_order_op_row index in the input ordered_op_list to 5 (set at STEP 1832) and setting row_changed to no, STEP 1833, as shown in FIG. 16E.

Continuing at INQUIRY 1813, opentry e has a null op_after_list directing processing to STEP 1834 where the end of the first sequence is indicated. No new row in the outlist_table was created in building the first sequence so processing continues from STEPs 1835-1839. Processing STEPs 1839-1841 prepares to find the next root of operation sequences in the input ordered_op_list matching input opentry 2 for d with the first sequence number.

Continuing Example 2 at STEP 1804, processing through STEP 1812 prepares the next root sequence to be built in outlist_table as shown in FIG. 16F. STEPs 1813 through 1818 process the op_after list of opentry d reflecting that c is after d. Processing STEPs 1819-1822 adds operation c to the second row of the outlist_table forming the sequence d, c as shown in FIG. 16G. Processing continues at STEPs 1817 and 1815 determining that the last op_after list entry for d has been processed. Continuing at STEPs 1830-1833, the next operation in the sequence d, c is prepared to be processed. Processing from STEPs 1813-1818 determines from the op_after list of opentry c that opentry e is to be added as the next in the d, c, e sequence. Processing STEPs 1830-1833 adds operation e to the second row of the outlist_table forming the sequence d, c, e, as shown in FIG. 16H. Processing continues at STEPs 1817 and 1815 determining that the last op_after list entry for c has been processed. Continuing at STEPs 1830-1833 the next operation in the sequence d, c, e is prepared to be processed. Processing at INQUIRY 1813 determines that opentry e has a null op_after list directing processing to STEP 1834. As no new row in the outlist_table was created (Y from INQUIRY 1835), processing continues at STEP 1839 to STEP 1841 where it is determined that no other ordered_op_list has a matching first sequence number to qualify as a root. Processing continues for Example 2 at phase 2.

For Example 3, execution of the logic is the same as Examples 1 and 2; therefore, abbreviated descriptions follow for the steps building outlist_table following formation of the first sequence I, II as described above. II has been added to the sequence at STEP 1822, as in FIG. 17C:

STEPs 1822 to 1817 to 1815 (Y end of op_after list for I) to STEPs 1830 through 1833 to 1813.

STEPs 1813 through 1822 add III to the first outlist_table row I, II sequence (based on III, IV and V indexes 3, 4, 5 being in the op_after list for opentry II), as shown in FIG. 17D.

STEPs 1822 to 1817 to 1815 (N end of op_after list for II) to STEPs 1816, 1818 to 1823 through 1829 build row two of outlist_table for the sequence I, II, IV, as shown in FIG. 17E.

STEPs 1829 to 1817 to 1815 (N end of op_after list for II) to STEPs 1816, 1818 to 1823 through 1829 build row three of outlist_table for the sequence I, II, V, as shown in FIG. 17F.

STEPs 1829 to 1817 to 1815 (Y end of op_after list for II) to STEPs 1830 through 1833 prepare row 1 of outlist_table to extend the sequence I, II, III. Processing continues at INQUIRY 1813 (N for op_after=null for III) to STEPs 1814, 1815 (N end of op_after list for III) to STEPs 1816 through 1822 adding VI to the first row, as shown in FIG. 17G.

STEPs 1822 to 1817 to 1815 (Y end of op_after list for III) to STEPs 1830 through 1833 prepare row 1 of outlist_table to extend the sequence I, II, III, VI. Processing continues at INQUIRY 1813 (N for op_after=null for VI) to STEPs 1814, 1815 (N end of op_after list for VI) to STEPs 1816 through 1822 adding VII to the first row as shown in FIG. 17H.

STEPs 1822 to 1817 to 18715 (Y end of op_after list for VI) to STEPs 1830 through 1833 prepare row 1 of outlist_table to extend the first sequence. Processing continues at INQUIRY 1813 (Y for op_after=null for VII) to STEPs 1834 to 1835 (N path) through STEP 1838 to prepare to extend the second row of outlist_table as shown in FIG. 17I.

STEPs 1838 to 1813 (N op_after=null for IV) to STEPs 1814, 1815 (N end of op_after list for IV) to STEPs 1816 through 1822 adding VI to the second row of outlist_table as shown in FIG. 17J.

STEPs 1822 to 1817 to 1815 (Y end of op_after list for VI) to STEPs 1830 through 1833 prepare row 2 of outlist_table to extend the second sequence. Processing continues at INQUIRY 1813 (N for op_after=null for VI) to STEPs 1814, 1815 (N end of op_after list for VI) to STEPs 1816 through 1822 adding VII to the second row as shown in FIG. 17K.

STEPs 1822 to 1817 to 1815 (Y end of op_after list for VI) to STEPs 1830 through 1833 prepare row 2 of outlist_table to extend the second sequence. Processing continues at INQUIRY 1813 (Y for op_after=null for VII) to STEPs 1834 to 1835 (N path) through STEP 1838 to prepare to extend the third row of outlist_table as shown in FIG. 17L.

STEPs 1838 to 1813 (N op_after=null for V) to STEPs 1814, 1815 (N end of op_after list for V) to STEPs 1816 through 1822 adding VII to the third row of outlist_table as shown in FIG. 17M.

STEPs 1822 to 1817 to 1815 (Y end of op_after list for V) to STEPs 1830 through 1833 prepare row 3 of outlist_table to extend the third sequence. Processing continues at INQUIRY 1813 (Y for op_after=null for VII) to STEPs 1834 to 1835 (Y path) to 1839. Processing STEPs 1839 through 1841 determines there are no other ordered_op_list entries having a seq# matching the first sequence number. Having no more roots, Example 3 proceeds to phase 2 processing.

One embodiment of the logic to build a Gantt table is described with reference to FIGS. 18A-18J. As an example, this logic is performed by the RS component of the BR system.

Referring to FIG. 18A, the general flow begins by establishing an index through the input list, i_ordered_op_list, STEP 1800. The sequence number of the first operation for the root sequences is established, STEP 1802. An index through the outlist_table is also established, STEP 1803. An index through a new row of the outlist_table is established, STEP 1804. The first operation in a new row is set from the input list opentry having a first sequence number and therefore being a root, STEP 1805. The current row being processed is set, current_orow_index, STEP 1806, and the next available row is indicated as the row after the current processing row, STEP 1807. Indicators for the newly established current row of row_changed and row_end are set to no, STEPs 1808 and 1809. An index to move through the input ordered_op_list for processing of the current row is established, STEP 1812 (FIG. 18B).

A determination is made regarding the end of the current sequence, INQUIRY 1813, by testing the current operation for a null list of operations which occur after it. If the sequence has ended, processing continues to STEP 1834 (FIG. 18F), as described below. Otherwise, processing of the list of operations which occur after the current operations is established, STEP 1814 (FIG. 18B). If the end of the list of operations which occur after the current operations has been reached, INQUIRY 1815, processing continues at INQUIRY 1830 (FIG. 18E). Otherwise, the index into the input ordered_op_list for the next operation is saved, STEP 1816 (FIG. 18B).

If the current row has been modified, INQUIRY 1818, processing continues at STEP 1823 (FIG. 18D), as described below. Otherwise, the next operation in the sequence is added to the current row in STEPs 1819-1822 (FIG. 18C). The current row is indicated as having changed, STEP 1819, the next operation is added to the row, STEP 1820, the index for the row to the operation to be evaluated next in extending the current row is saved in the row, STEP 1821, and the index into the input ordered_op_list for the operation that is to be evaluated next in extending the current row is saved in the row, STEP 1822. Processing continues at STEP 1817 (FIG. 18B), where the index in the list of operations which occur after the current operation is incremented. The loop through the list of operations which occur after the current operation in the current row continues evaluation at INQUIRY 1815.

Figure 18D:
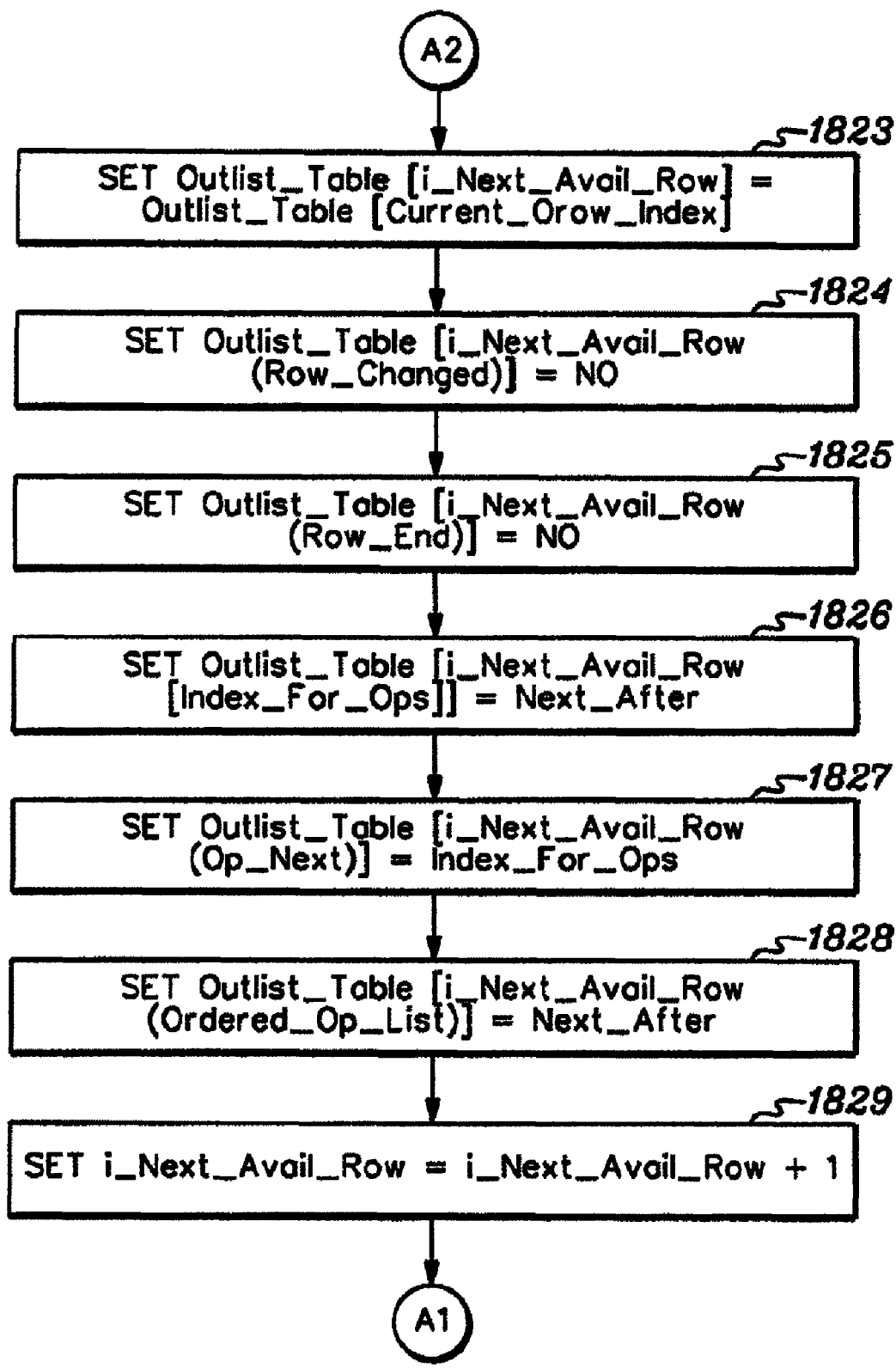
Figure 18E:
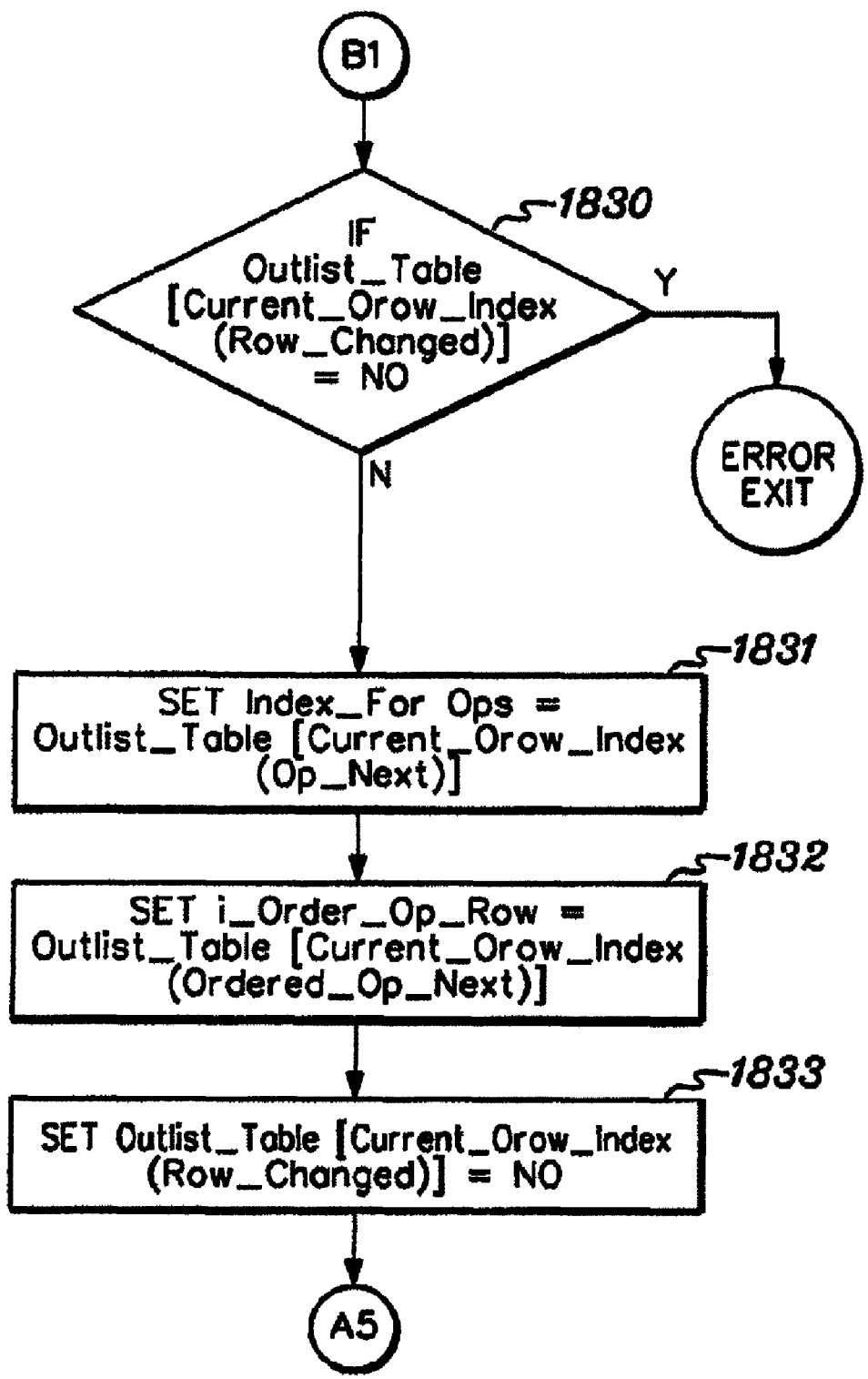

Returning to INQUIRY 1818 (FIG. 18C), if the current row has changed, processing continues to build a new row in the outlist_table using the current sequence as the base sequence to be extended in STEPs 1823-1829 (FIG. 18D). The current sequence is copied to the next available row in the outlist_table, STEP 1823. Indicators for the new row having been changed or having been completed are set to no, e.g., row_changed (STEP 1824), row_end (STEP 1825). The next operation in the new sequence is added to the new row from the input ordered_op_list, STEP 1826. Within the new row, the index in the row for next operation to be evaluated in continuing the sequence is set to the newly added operation, STEP 1827. The index in the input ordered_op_list for the next operation to be evaluated in continuing the sequence is set to the newly added operation, STEP 1828. The next available row is indicated to be the row following the just built row, STEP 1829. Processing continues by progressing through the current operations list of operations which is to occur after it, STEPs 1817-1815 (FIG. 18B).

When the list of operations which are to occur after the current operation have been processed, INQUIRY 1815, processing continues by determining if a new operation was added to the existing sequence, INQUIRY 1830 (FIG. 18E). If no new operation was added to the current sequence, an error is indicated, since the last operation did not specify a null op_after list, but no subsequent operation was added to the sequence. Otherwise, the current row is prepared to extend the sequence in STEPs 1831 through 1833. The last operation in the sequence which is to be evaluated for continuation of the sequence is restored as the current index into the row, STEP 1831. The index into the input ordered_op_list for the last operation is restored as the current ordered_op_list index, STEP 1832. The current row is indicated as not having been changed, STEP 1833. Processing continues by evaluating the current last operation in the sequence to determine if there are operations which occur after it, INQUIRY 1813 (FIG. 18B).

Figure 18F:
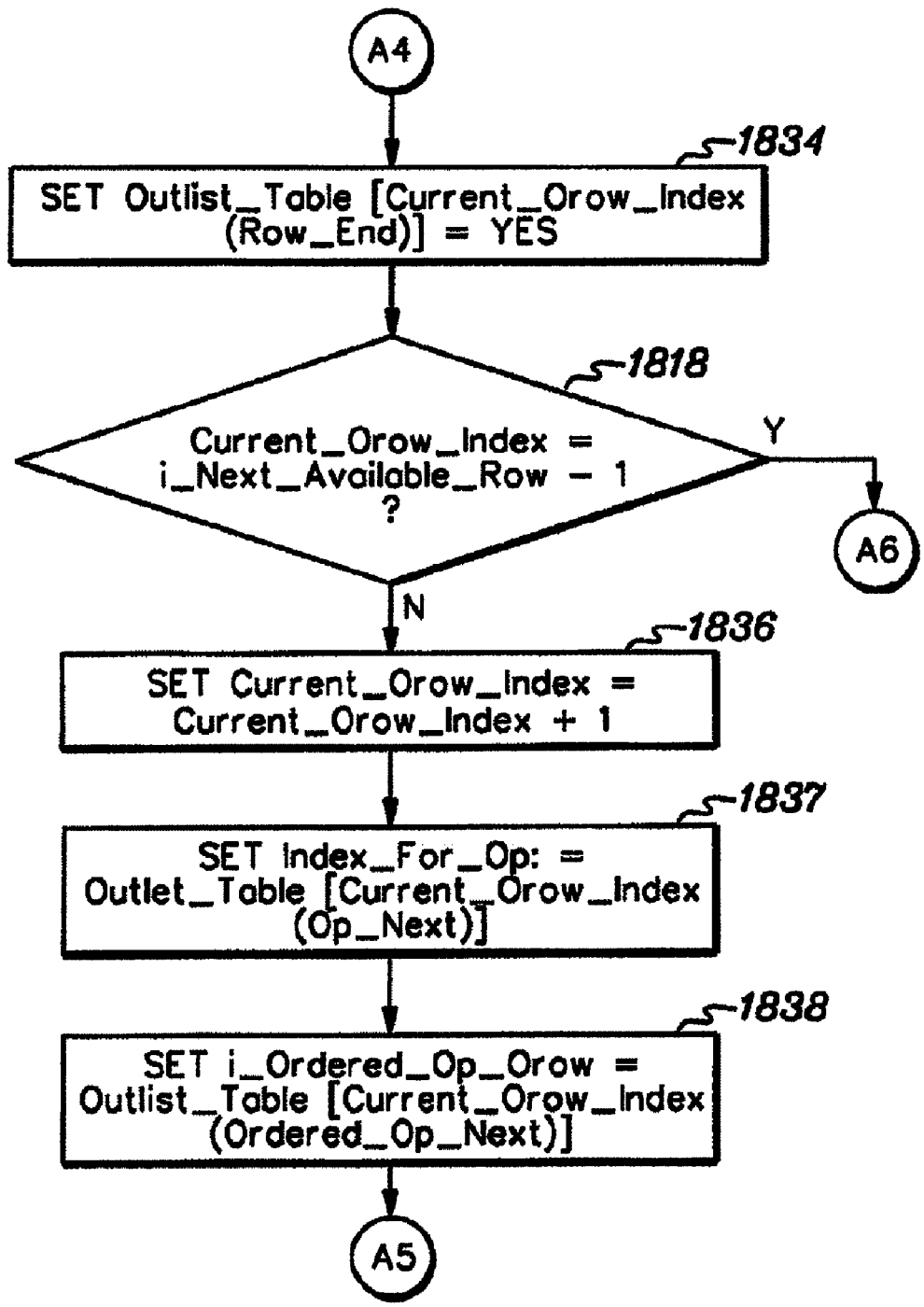

When the last operation in a sequence has been detected, INQUIRY 1813, processing continues by setting the row end indicator to reflect completion, STEP 1834 (FIG. 18F). If new rows were added to the outlist_table, INQUIRY 1835, there are additional paths to be evaluated for the current root. STEPs 1836 to 1838 prepare for processing the next row in the outlist_table for the current root. The current row to be processed is set to the next row, STEP 1836. The current index into the row for the last operation is restored, STEP 1837. The index into the input ordered_op_list for the last operation in the sequence is set, STEP 1838. Processing continues at INQUIRY 1813 (FIG. 18B) to determine if the last operation in the sequence has been reached.

Figure 18G:
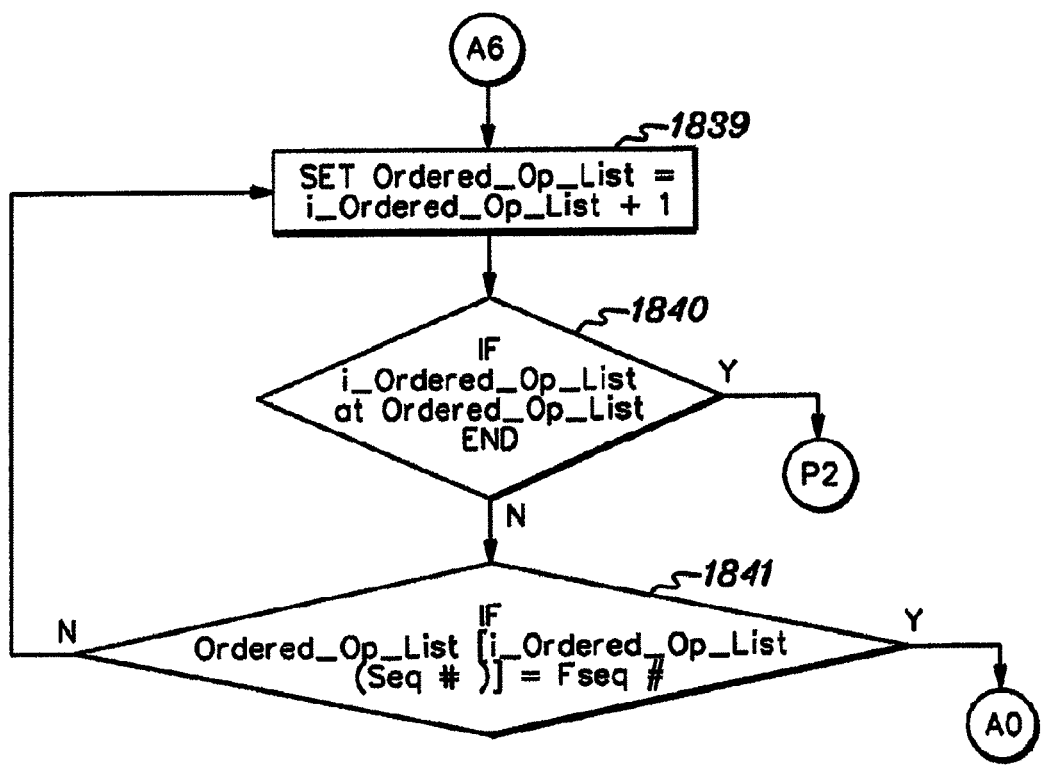

Returning to INQUIRY 1835 (FIG. 18F), when all rows associated with the current root have been processed, the existence of any additional roots is established in STEPs 1839 through 1841 (FIG. 18G). The next operation in the input ordered_op_list is set, STEP 1839, the end of the input list is tested for, INQUIRY 1840, and checking for a new root is performed, INQUIRY 1841. If a new root is located, processing proceeds at STEP 1804 (FIG. 18A). Otherwise, processing continues to STEP 1839. If the end of the input list is reached, INQUIRY 1840, phase 2 processing is initiated, STEP 1842 (FIG. 18H).

Figure 18H:
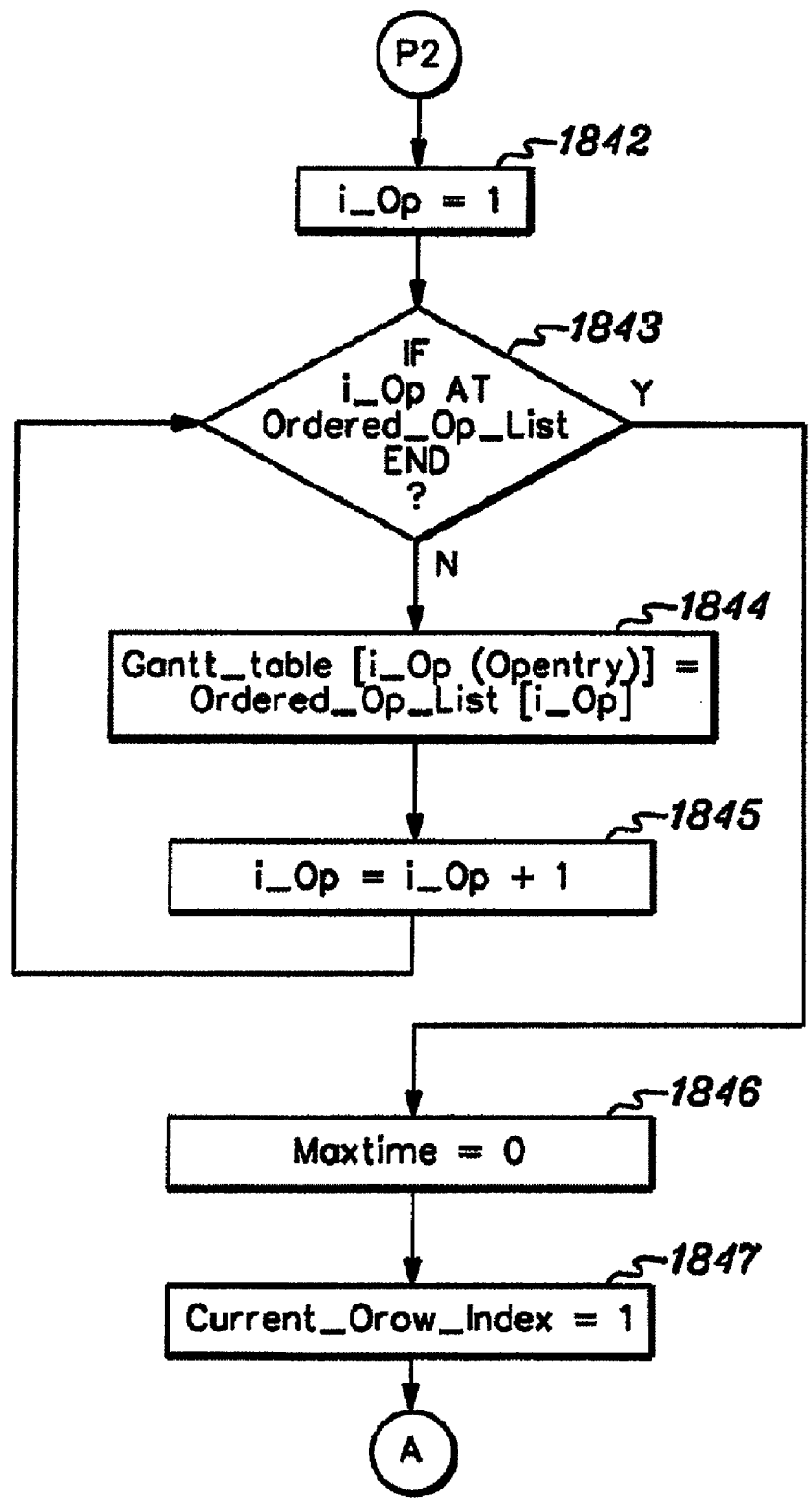

Phase two processing begins by initializing the Gantt_table, STEPs 1842 through 1845 (FIG. 18H). An index to step through the input ordered_op_list, i_op, is initialized, STEP 1842. When the end of the input list has been reached, the Gantt_table has been initialized (Y from INQUIRY 1843). Otherwise, the Gantt_table row is initialized with the opentry from the input ordered_op_list indexed by i_op, STEP 1844, and the index is incremented, STEP 1845.

Following initialization of the Gantt_table, initialization for processing of the operation sequences in outlist_table is performed. The maximum time through the sequences is set to 0, STEP 1846, and the index through the outlist_table rows is set t1, STEP 1847.

Each row in the outlist_table is processed until the first unfilled row is reached, INQUIRY 1848 (FIG. 18I), at which point processing is complete. Initialization processing for each outlist_table row includes setting the relative start time, startt, and relative end time, endtt, for an operation to 0, STEP 1849. An index for stepping through the operations in a row is established, STEP 1850. When the index stepping through operations in a row has reached the end of the row, INQUIRY 1851, the next row in the outlist_table is processed, STEP 1852.

Otherwise, the index into the ordered_op_list table for the next operation in the current row of the outlist_table is saved, STEP 1853. The start time for the next operation is set to the end time of the previous operation, STEP 1854, and the end time for the next operation is set to the end time of the previous operation plus the next operation execution time, STEP 1855.

Figure 18I:
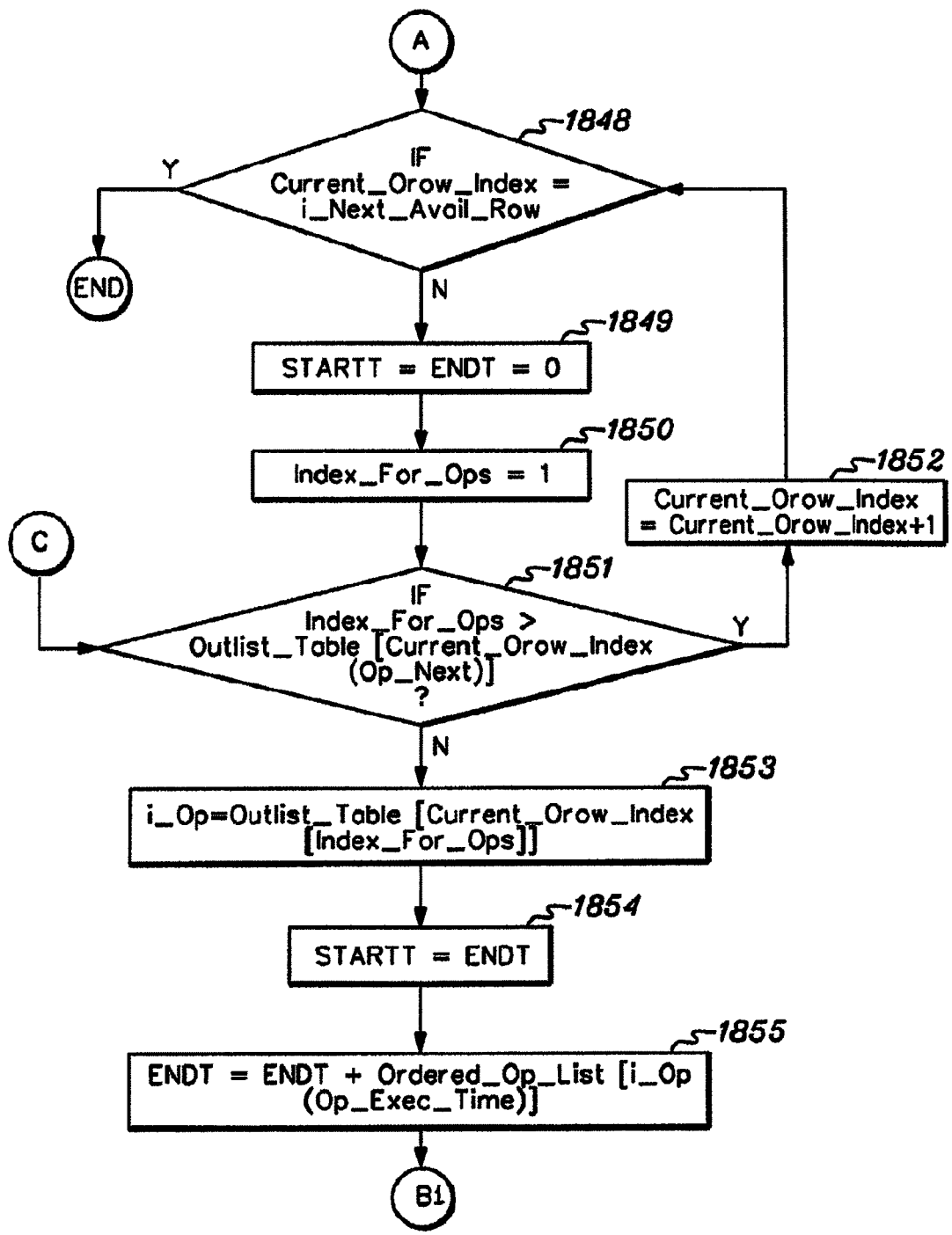
Figure 18J:
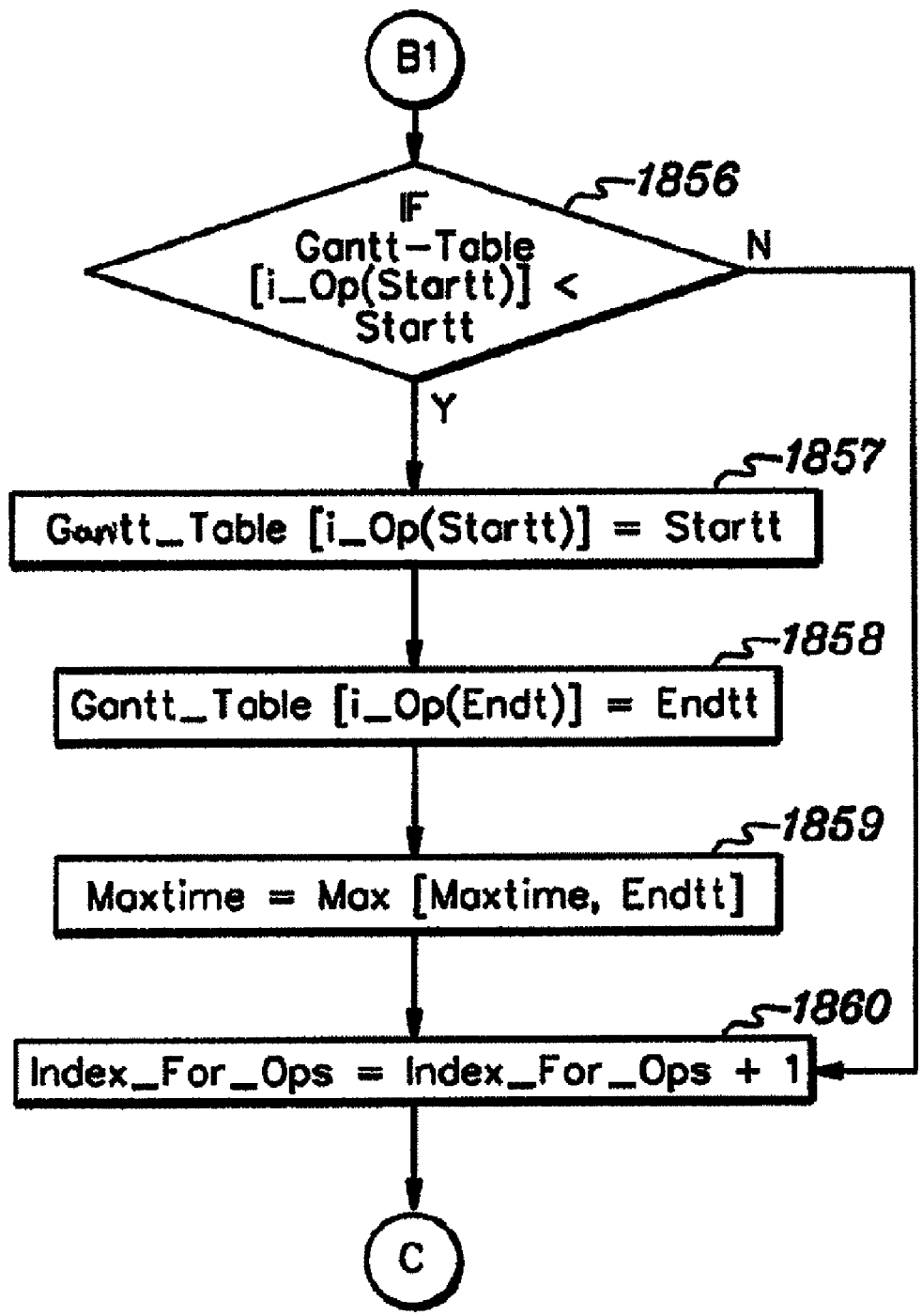

If the current start time for the operation in the Gantt_table is greater than the start time calculated for the current row and operation of the outlist_table, INQUIRY 1856 (FIG. 18J), the index for operations is incremented, STEP 1860, and processing proceeds to INQUIRY 1851 (FIG. 18I). Otherwise, the Gantt_table operation start time, STEP 1857 (FIG. 18J), and operation end time, STEP 1858, are set to the start and end time for the current row sequence. The maximum time through any sequence is set to the greater of either the current maximum time or the current operation end time, STEP 1859. The index for operations in the current row is incremented, STEP 1860, and processing continues with determination if all operations for the current row have been evaluated, INQUIRY 1851 (FIG. 18I). This completes the Gantt logic.

Validating Multiple Goals

In the above sequence of steps used to validate a specific quantified IT management goal, such as RTO, no changes are made to the runtime environment. Rather, the historical information is collected, analyzed, averaged and used in realtime, but the validation of the goal can occur while a system is being actively managed, without disruption. As a result, multiple goals (or other policies) can be validated in this manner, and each result is stored into a separate entry in the goal policy table construct, a part of the RS set of tables used to persist the RS and related data. For example, a customer currently has a running environment using the BR constructs to manage a particular RS to a RTO of 8 minutes, but wishes to reduce RTO due to business reasons. The customer selects a RTO of 5 minutes, and through the validation process and resulting Gantt chart, the actual recovery time is projected to be 7 minutes for the PSE of OnlineTrade. The customer may then wish to determine if 5 minutes is achievable in any PSE that is relevant for the RS, and rerun validation, producing the resulting Gantt chart. A comparison can then be made between the two resulting Gantt outputs to detect what steps are causing the projected RTO to be missed in the OnlineTrade PSE. Multiple validations/projections can occur, all while continuing to manage the current runtime environment at a 8 minute RTO.

Changes in Environment and Validating Multiple Goals

In some cases, quantitative goals that are actively being managed can be impacted by changes in the IT environment. As two examples, a business application may be modified to use additional resources, or resources can be removed from use. In this case, logic is provided to automatically detect the change in relationships between resources and the managed RS (e.g., via comparisons), and to surface to the administrator the need to initiate validation of the goal again. The goal can be revalidated without causing disruption to the current running environment, and is initiated for action based on automatic detection of the change in relationship between resources of any RS that is actively managing to a goal.

Described in detail herein is a capability for programmatically validating service level policies to predict whether the policies can be achieved.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 19:
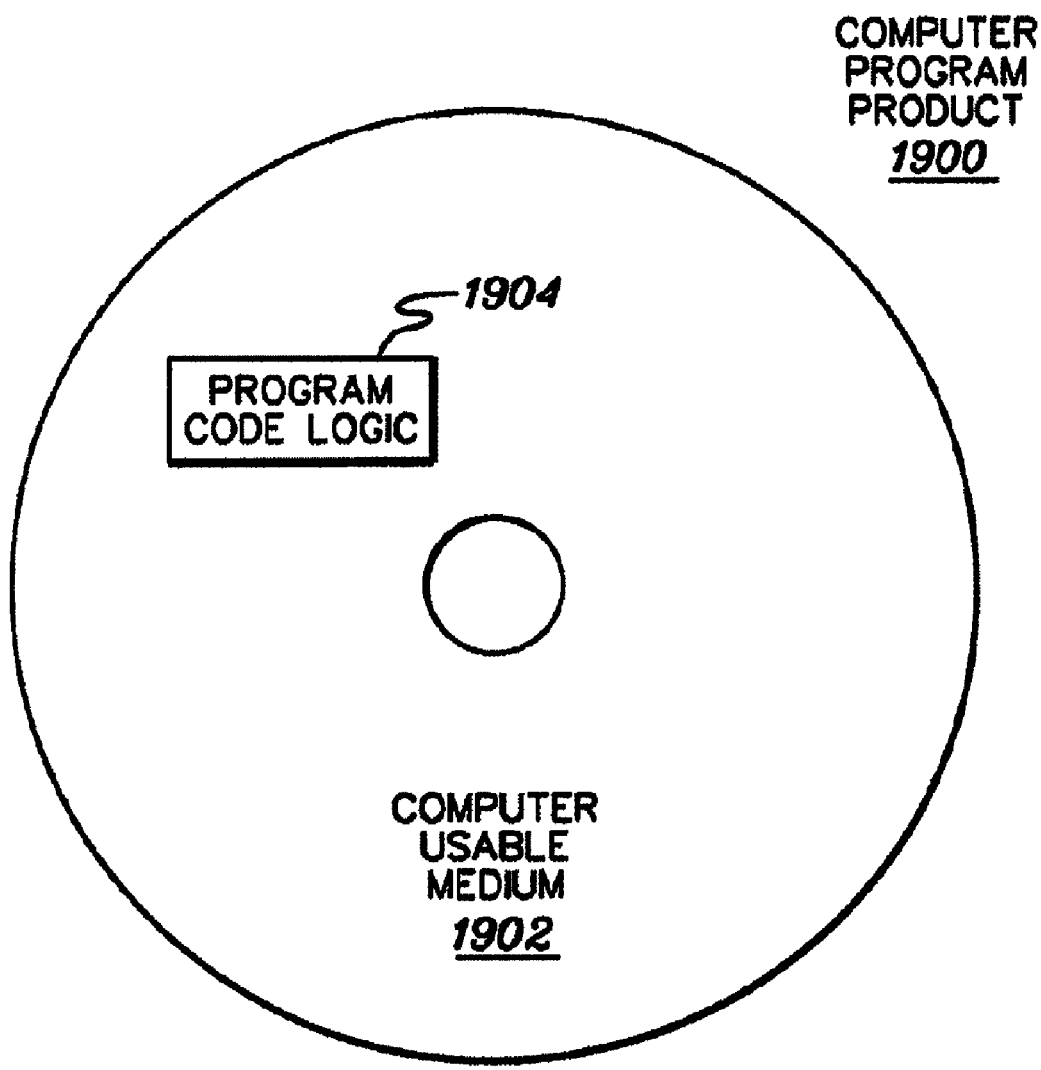
FIG. 19 depicts one embodiment of a computer program product incorporating one or more aspects of the present invention.

One example of an article of manufacture or a computer program product incorporating one or more aspects of the present invention is described with reference to FIG. 19. A computer program product 1900 includes, for instance, one or more computer usable media 1902 to store computer readable program code means or logic 1904 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided for programmatically validating one or more service level policies established for the environment to predict whether the one or more policies are achievable within the environment. Advantageously, this capability predicts whether policies can be achieved without affecting the runtime environment. Many types of policies can be evaluated, including, but not limited to, availability goals and other management goals, or other policies. In one example, an initial set of recovery operations is developed, and the operations selected are chosen because they will contribute optimally to achieve the overall goal (e.g., recovery time) set for the business application. The process performing validation understands the recovery operations, understands how long the operations take and understands the relationships between the operations. It puts together (by program means; i.e., no manual intervention) a view of a complete set of actions to be taken to re-instate a business application.

As used herein, obtaining (e.g., a service level policy) includes, but is not limited to, being defined by the customer; being created by a service provider; being altered; being programmatically input by another program, such as a calendar program, etc; having; receiving; retrieving; being provided; creating; defining; etc.

Although various embodiments are described above, these are only examples. For example, the processing environments described herein are only examples of environments that may incorporate and use one or more aspects of the present invention. Environments may include other types of processing units or servers or the components in each processing environment may be different than described herein. Each processing environment may include additional, less and/or different components than described herein. Further, the types of central processing units and/or operating systems or other types of components may be different than described herein. Again, these are only provided as examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to obtain instructions from memory and to optionally, provide local buffering for the obtained instruction; an instruction decode unit to receive the instruction fetched and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Further, although the environments described herein are related to the management of availability of a customer's environment, one or more aspects of the present invention may be used to manage aspects other than or in addition to availability. Further, one or more aspects of the present invention can be used in environments other than a business resiliency environment.

Yet further, many examples are provided herein, and these examples may be revised without departing from the spirit of the present invention. For example, in one embodiment, the description is described in terms of availability and recovery; however, other goals and/or objectives may be specified in lieu of or in addition thereto. Additionally, the resources may be other than IT resources. Further, there may be references to particular products offered by International Business Machines Corporation or other companies. These again are only offered as examples, and other products may also be used. Additionally, although tables and databases are described herein, any suitable data structure may be used. There are many other variations that can be included in the description described herein and all of these variations are considered a part of the claimed invention.

Further, for completeness in describing one example of an environment in which one or more aspects of the present invention may be utilized, certain components and/or information is described that is not needed for one or more aspects of the present invention. These are not meant to limit the aspects of the present invention in any way.

One or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer usable medium, in which the computer usable medium comprises one or more aspects of the present invention. The code in combination with the computer system is capable of performing one or more aspects of the present invention.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented validation method comprising:
   obtaining a service level policy to be validated for a business application of an information technology environment, the business application comprising a plurality of resources and the service level policy specifying a customer desired level of service for the business application including an overall goal for the business application, wherein the overall goal comprises a quantitative goal; and
   programmatically validating, by a processor, in real-time the service level policy for achievability, wherein the programmatically validating comprises predicting whether the service level policy is achievable, and wherein the programmatically validating comprises:
      identifying multiple recovery actions to be used to recover multiple resources of the plurality of resources of the business application, wherein a recovery action comprises one or more steps to take to restore service to a level acceptable for the service level policy; and
      using historical information of the multiple recovery actions, coordination of the multiple recovery actions, and current runtime conditions of the IT environment to determine achievability of the overall goal for the business application.

2. The computer-implemented method of claim 1, wherein the quantitative goal comprises a quantitative availability goal.

3. The computer-implemented method of claim 1, wherein the quantitative availability goal comprises a recovery time objective specified for a component of the information technology environment.

4. The computer-implemented method of claim 1, wherein the programmatically validating uses relationships between resources of the business application to validate the service level policy.

5. The computer-implemented method of claim 1, wherein the programmatically validating creates a set of operations which alter one or more capabilities of one or more resources supporting the business application, and wherein individual operations included in the set of operations are selected to optimally achieve an overall time period for performing a specified action for the business application.

6. The computer-implemented method of claim 1, further comprising creating a representation of a sequence of operations for the programmatically validated service level policy.

7. The computer-implemented method of claim 6, wherein the representation comprises a Gantt representation.

8. The computer-implemented method of claim 7, wherein the Gantt representation is created prior to a failure for which one or more operations expressed in the Gantt representation are used in recovery of the failure.

9. The computer-implemented method of claim 1, wherein the programmatically validating uses at least one of observed historical data or explicit specification of data values to validate the service level policy.

10. The computer-implemented method of claim 1, further comprising:
    automatically detecting a change in the information technology environment; and
    performing re-validation of the service level policy, in response to detecting the change.

11. The computer-implemented method of claim 1, wherein the programmatically validating comprises validating a plurality of service level policies.

12. A computer system for performing validation, the computer system comprising:
    a memory; and
    a processor in communications with the memory, wherein the computer system is configured to perform a method, said method comprising:
       obtaining a service level policy to be validated for a business application of an information technology environment, the business application comprising a plurality of resources and the service level policy specifying a customer desired level of service for the business application including an overall goal for the business application, wherein the overall goal comprises a quantitative goal; and
       programmatically validating in real-time the service level policy for achievability, wherein the programmatically validating comprises predicting whether the service level policy is achievable, and wherein the programmatically validating comprises:
          identifying multiple recovery actions to be used to recover multiple resources of the plurality of resources of the business application, wherein a recovery action comprises one or more steps to take to restore service to a level acceptable for the service level policy; and
          using historical information of the multiple recovery actions, coordination of the multiple recovery actions, and current runtime conditions of the IT environment to determine achievability of the overall goal for the business application.

13. The computer system of claim 12, wherein the quantitative goal comprises a quantitative availability goal.

14. The computer system of claim 12, wherein one or more operations to be performed to achieve the programmatically validated service level policy are represented in a Gantt representation.

15. The computer system of claim 12, wherein the programmatically validating uses at least one of observed historical data or explicit specification of data values to validate the service level policy.

16. A computer program product for performing validation, said computer program product comprising:
    a non-transitory computer readable storage medium readable by a processor and storing instructions for execution by the processor for performing a method comprising:
       obtaining a service level policy to be validated for a business application of an information technology environment, the business application comprising a plurality of resources and the service level policy specifying a customer desired level of service for the business application including an overall goal for the business application, wherein the overall goal comprises a quantitative goal; and programmatically validating in real-time the service level policy for achievability, wherein the programmatically validating comprises predicting whether the service level policy is achievable, wherein the programmatically validating comprises:

identifying multiple recovery actions to be used to recover multiple resources of the plurality of resources of the business application, wherein a recovery rises one or more steps to take to restore service to a level acceptable for the service level policy; and using historical information of the multiple recovery actions, coordination of the multiple recovery actions, and current runtime conditions of the IT environment to determine achievability of the overall goal for the business application.

17. The computer program product of claim 16, wherein the quantitative goal comprises a quantitative availability goal.

18. The computer program product of claim 16, further comprising creating a representation of a sequence of operations for the programmatically validated service level policy.

19. The computer program product of claim 16, further comprising:

automatically detecting a change in the information technology environment; and performing re-validation of the service level policy, in response to detecting the change.

* * * * *